(12) United States Patent
Kobayashi

(10) Patent No.: US 12,493,419 B2
(45) Date of Patent: *Dec. 9, 2025

(54) MEMORY SYSTEM AND STORAGE SYSTEM MANAGING FIRST AND SECOND ACCOUNT INFORMATION FOR AUTHENTICATION OF FIRST AND SECOND ACCOUNTS

(71) Applicant: Kioxia Corporation, Tokyo (JP)

(72) Inventor: Hirotomo Kobayashi, Yokosuka Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/647,008

(22) Filed: Apr. 26, 2024

(65) Prior Publication Data

US 2024/0272810 A1    Aug. 15, 2024

Related U.S. Application Data

(63) Continuation of application No. 17/546,999, filed on Dec. 9, 2021, now Pat. No. 12,001,690.

(30) Foreign Application Priority Data

Jul. 1, 2021    (JP) .................................. 2021-109919

(51) Int. Cl.
*G06F 3/06*    (2006.01)
*G06F 12/14*    (2006.01)

(52) U.S. Cl.
CPC .......... *G06F 3/0622* (2013.01); *G06F 3/0646* (2013.01); *G06F 3/0673* (2013.01); *G06F 12/1408* (2013.01); *G06F 2212/1052* (2013.01)

(58) Field of Classification Search
None
See application file for complete search history.

(56) References Cited

U.S. PATENT DOCUMENTS

| | | | |
|---|---|---|---|
| 9,608,810 B1 | 3/2017 | Ghetti et al. | |
| 10,783,232 B2 | 9/2020 | Bolotin et al. | |
| 10,902,138 B2 | 1/2021 | Cheung et al. | |
| 11,120,151 B1 | 9/2021 | Allo et al. | |
| 12,001,690 B2 * | 6/2024 | Kobayashi | ............. G06F 21/31 |
| 2015/0172260 A1 | 6/2015 | Brenner | |
| 2016/0344561 A1 | 11/2016 | Grajek | |
| 2017/0372085 A1 | 12/2017 | Howe et al. | |
| 2018/0176417 A1 | 6/2018 | Ando | |
| 2021/0218723 A1 | 7/2021 | Lekov et al. | |
| 2022/0350501 A1 | 11/2022 | Dambal et al. | |
| 2023/0222238 A1 | 7/2023 | Hirota et al. | |

* cited by examiner

*Primary Examiner* — Edward J Dudek, Jr.
*Assistant Examiner* — Ralph A Verderamo, III
(74) *Attorney, Agent, or Firm* — Maier & Maier, PLLC

(57) ABSTRACT

According to one embodiment, a memory system includes a nonvolatile memory and a controller. The controller manages first account information to be used for authentication of a first account and second account information to be used for authentication of a second account. The controller receives third account information from a host device. When the third account information matches the first account information, the controller permits access to at least a partial storage area of the nonvolatile memory based on a request from the host device and transmits first data that includes the second account information to a first memory system.

15 Claims, 29 Drawing Sheets

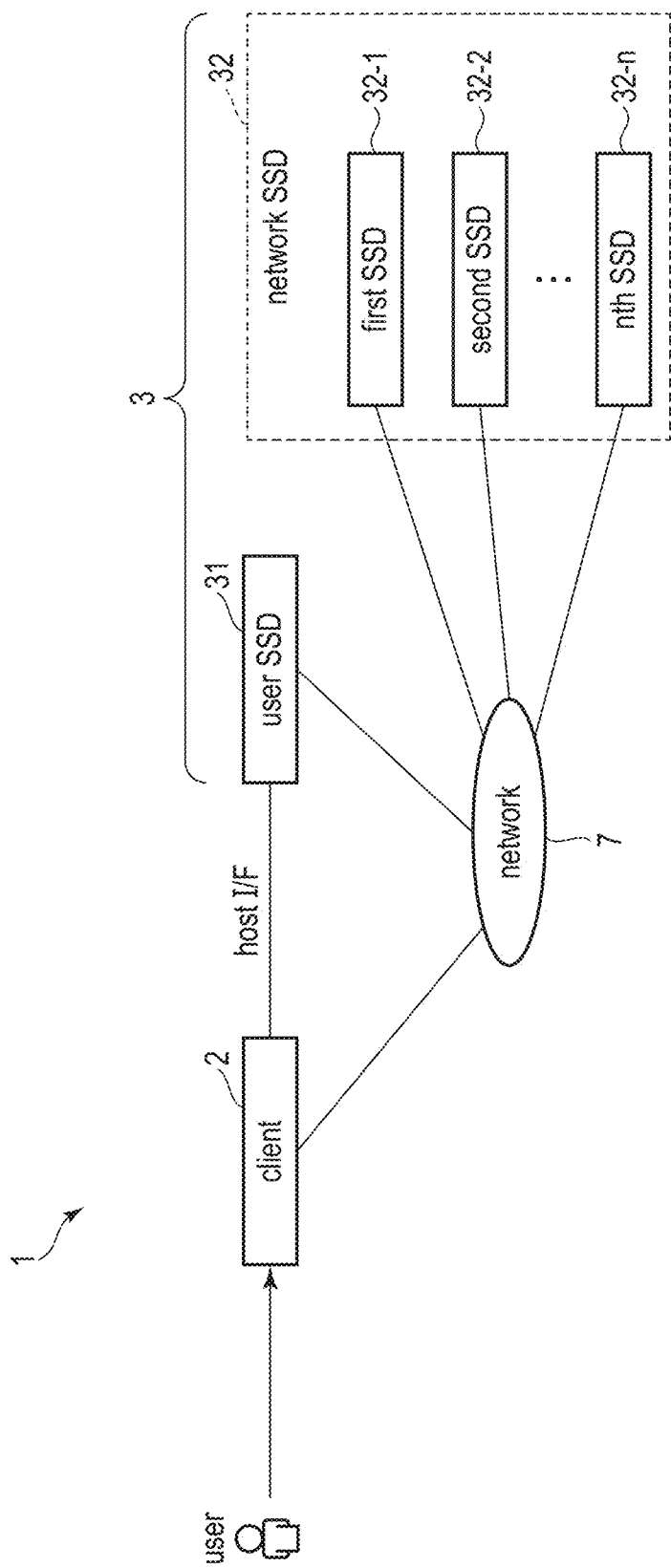
F I G. 1

| SSD identification information | login ID | login password | public key |
|---|---|---|---|
| User's SSD-1 | user-admin | user-admin-password | 111111111··· |
| SSD-A | ssd-a-user-25 | ssd-a-user-25-password | AAAAAAAAA··· |
| SSD-B | ssd-b-user-125 | ssd-b-user-125-password | BBBBBBBBB··· |
| ... | ... | ... | ... |

FIG. 3

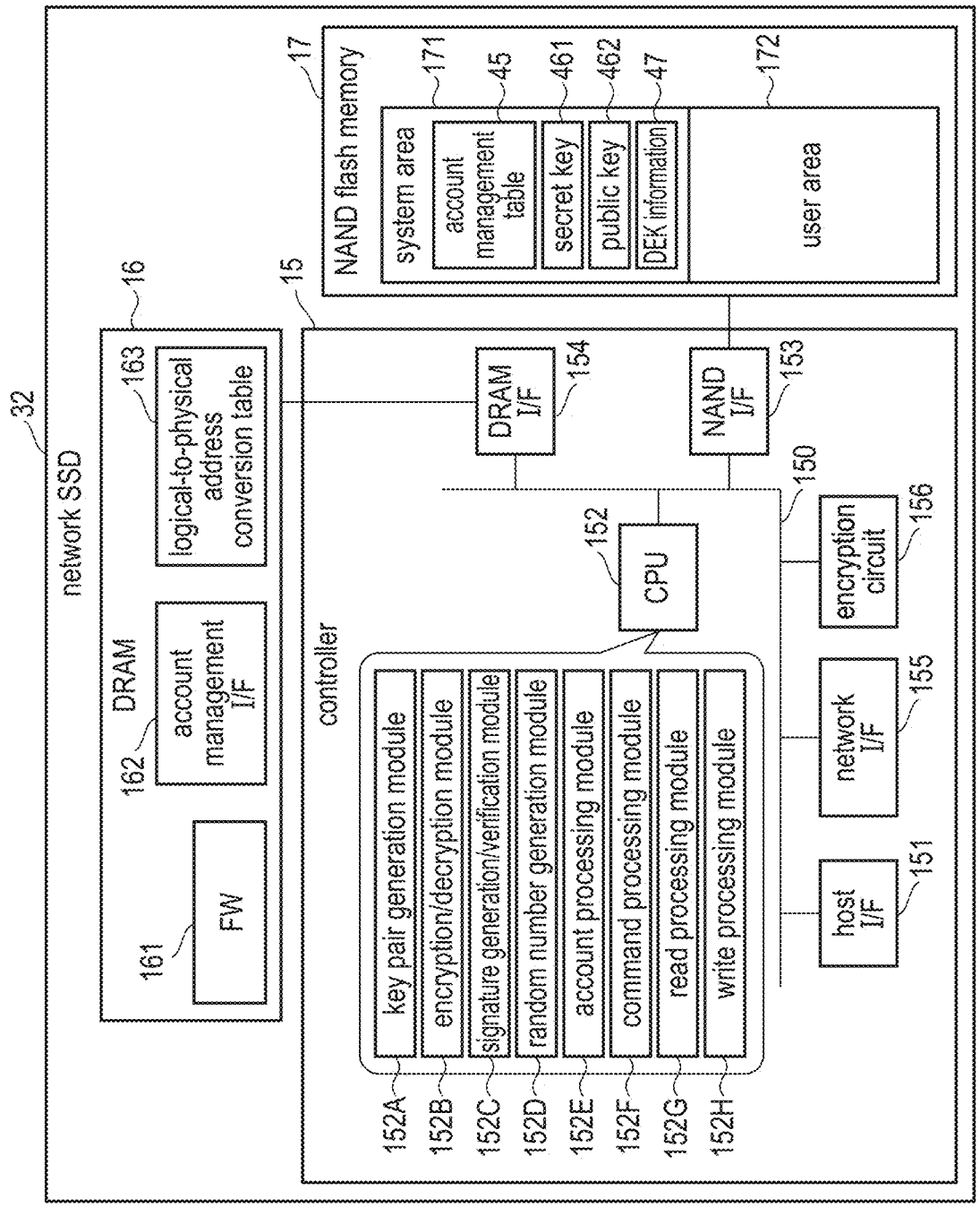
F I G. 4

| SSD identification information | login ID | login password | public key |
|---|---|---|---|
| SSD-A | admin | ad-pwd | AAAAAAAAA··· |
| User's SSD-1 | ssd-a-user-25 | ssd-a-user-25-password | 111111111··· |
| User's SSD-2 | ssd-a-user-100 | ssd-a-user-100-password | 222222222··· |
| ··· | ··· | ··· | ··· |

F I G. 5

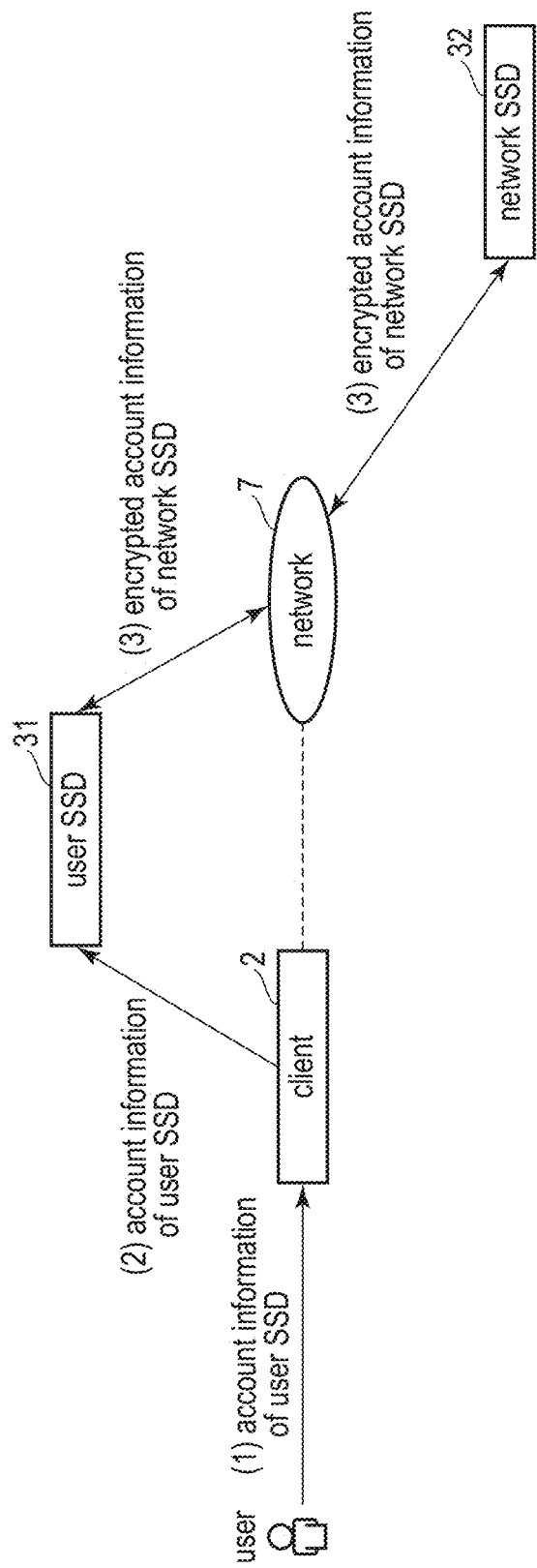
F I G. 6

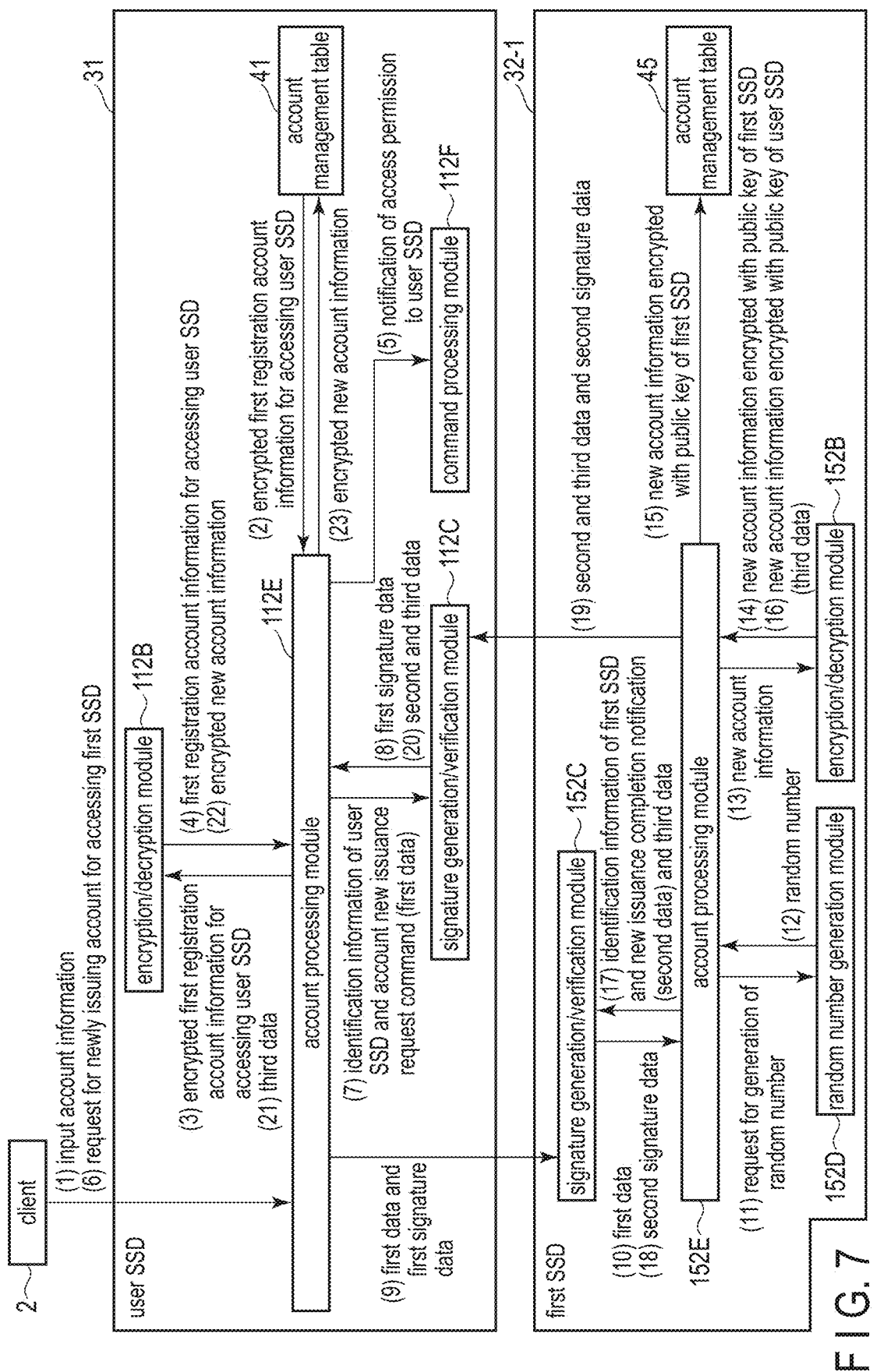
F I G. 7

| SSD identification information | login ID | login password | public key |
|---|---|---|---|
| SSD-A | admin | ad-pwd | AAAAAAAAA··· |
| User's SSD-1 | | | 111111111··· |~451
| ... | ... | ... | ... |

(A)

| SSD identification information | login ID | login password | public key |
|---|---|---|---|
| SSD-A | admin | ad-pwd | AAAAAAAAA··· |
| User's SSD-1 | ssd-a-user-25 | ssd-a-user-25-password | 111111111··· |~451
| ... | ... | ... | ... |

| SSD identification information | login ID | login password | public key |
|---|---|---|---|
| User's SSD-1 | user-admin | user-admin-password | 111111111··· |
| SSD-A | | | AAAAAAAAA··· |~411
| ... | ... | ... | ... |

(A)

| SSD identification information | login ID | login password | public key |
|---|---|---|---|
| User's SSD-1 | user-admin | user-admin-password | 111111111··· |
| SSD-A | ssd-a-user-25 | ssd-a-user-25-password | AAAAAAAAA··· |~411
| ... | ... | ... | ... |

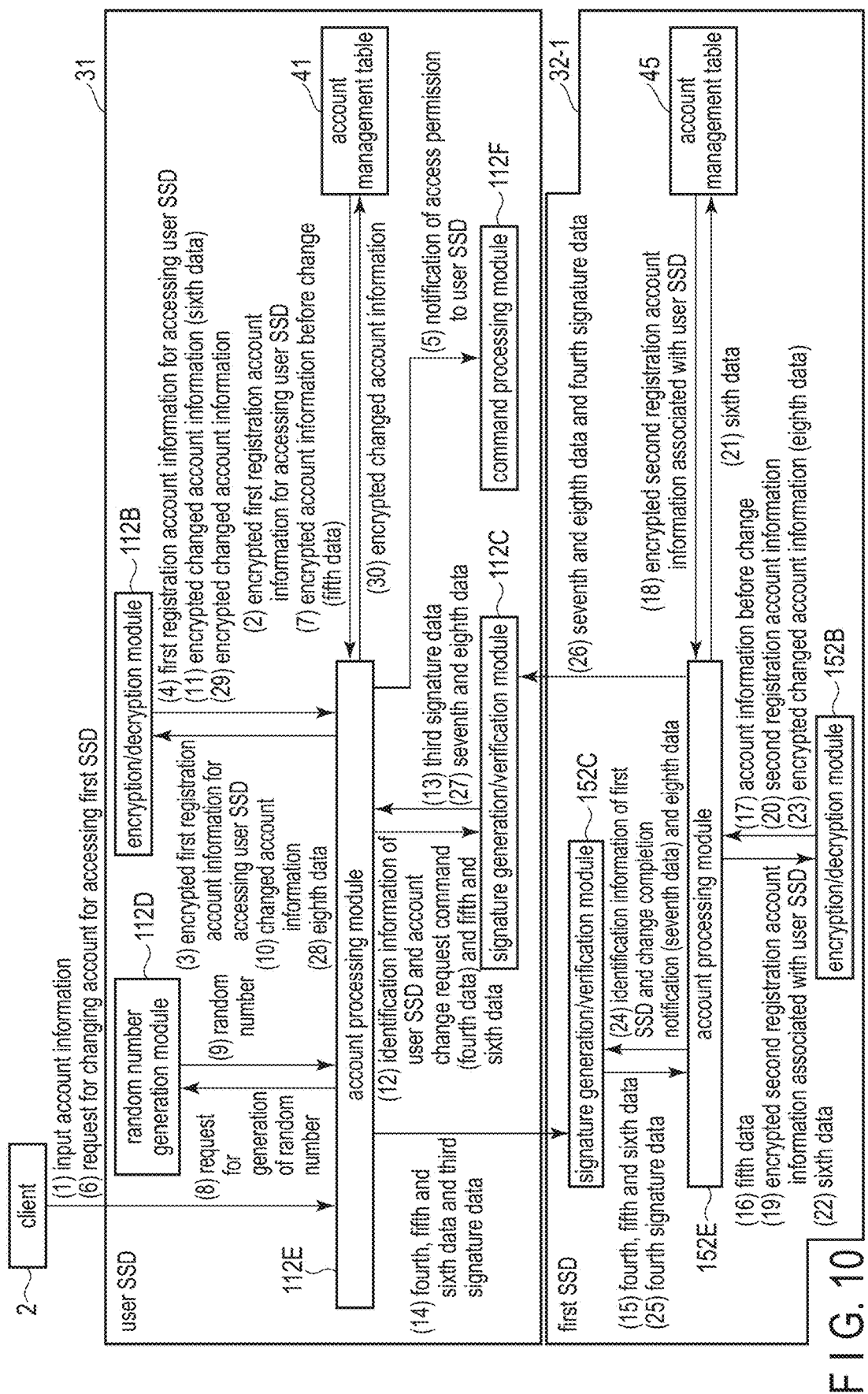
F I G. 10

| SSD identification information | login ID | login password | public key |
|---|---|---|---|
| SSD-A | admin | ad-pwd | AAAAAAAAA··· |
| User's SSD-1 | ssd-a-user-25 | ssd-a-user-25-password | 111111111··· |
| ... | ... | ... | ... |

(A)

| SSD identification information | login ID | login password | public key |
|---|---|---|---|
| SSD-A | admin | ad-pwd | AAAAAAAAA··· |
| User's SSD-1 | ssd-a-user-25-2 | ssd-a-user-25-password-2 | 111111111··· |
| ... | ... | ... | ... |

(B)

~451

F I G. 11

| SSD identification information | login ID | login password | public key |
|---|---|---|---|
| User's SSD-1 | user-admin | user-admin-password | 111111111··· |
| SSD-A | ssd-a-user-25 | ssd-a-user-25-password | AAAAAAAAA··· |
| ... | ... | ... | ... |

(A)

| SSD identification information | login ID | login password | public key |
|---|---|---|---|
| User's SSD-1 | user-admin | user-admin-password | 111111111··· |
| SSD-A | ssd-a-user-25-2 | ssd-a-user-25-password-2 | AAAAAAAAA··· |
| ... | ... | ... | ... |

(B)

~411

F I G. 12

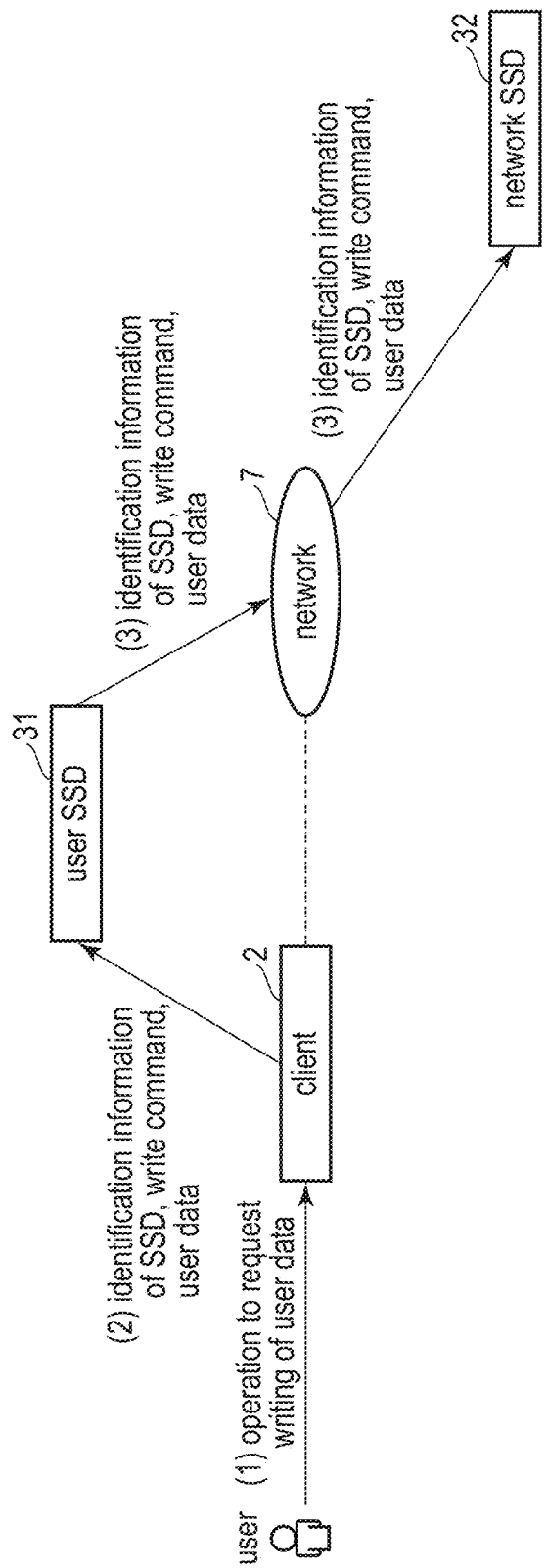
F I G. 16

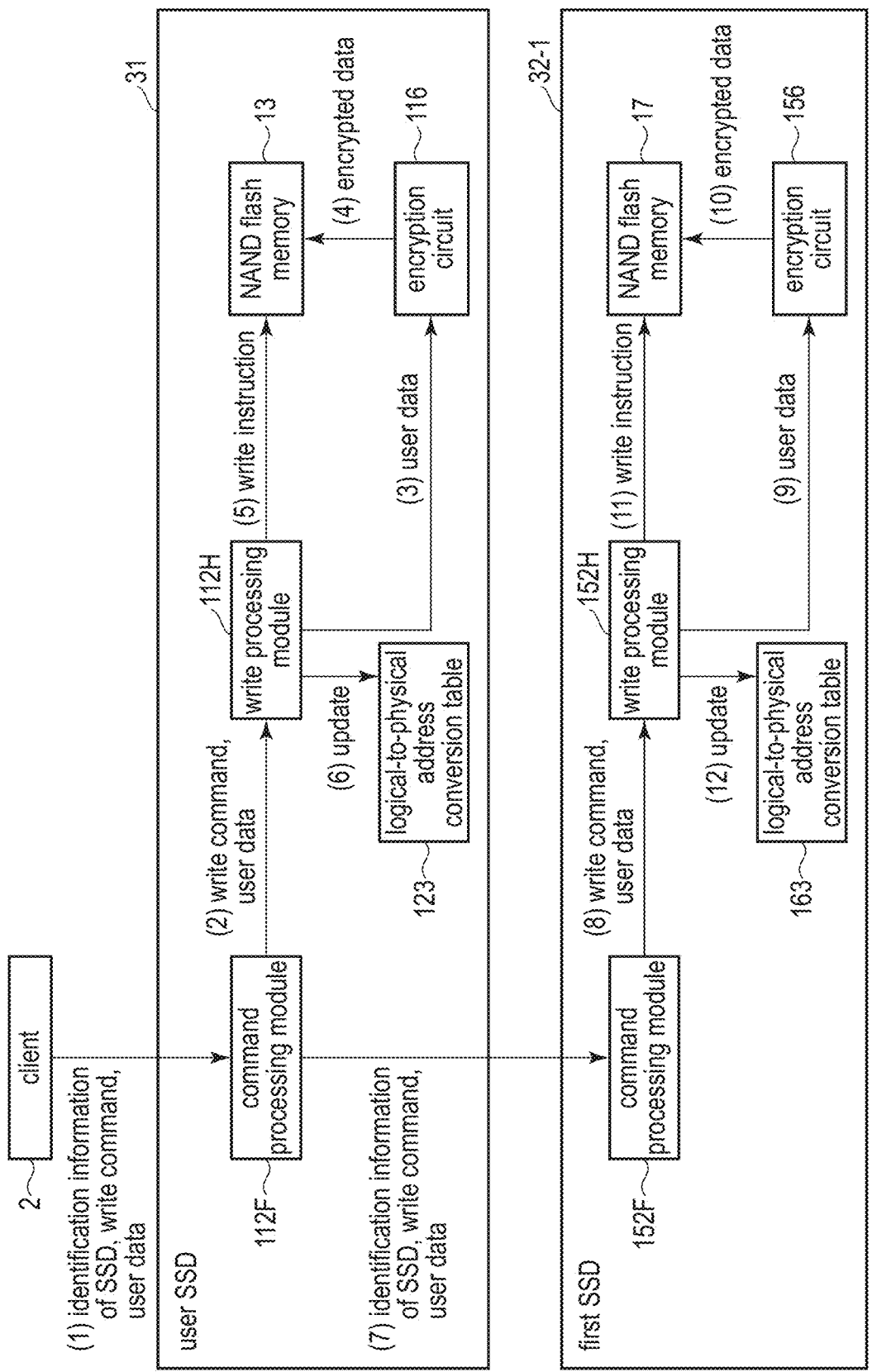
F I G. 17

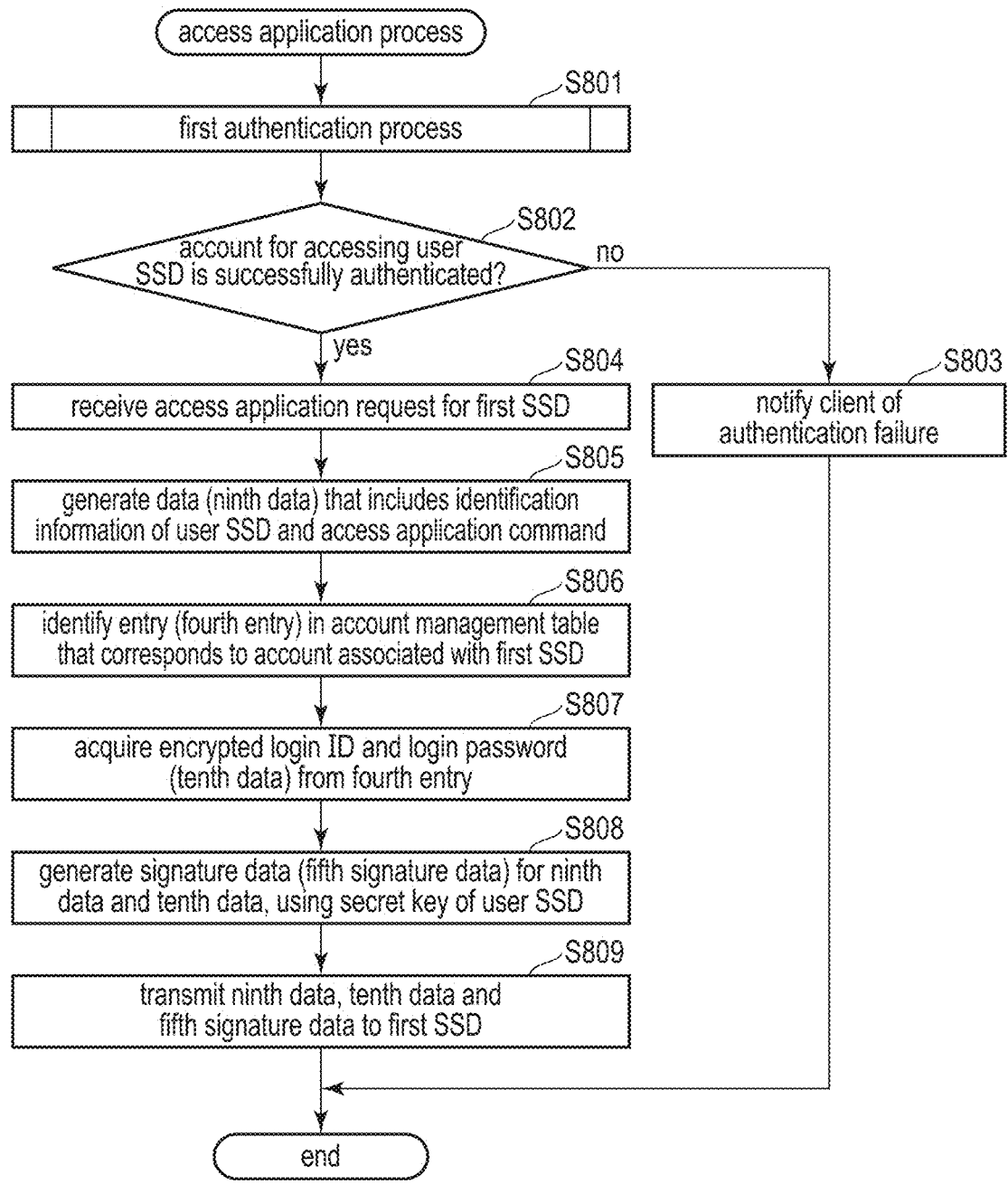
F I G. 25

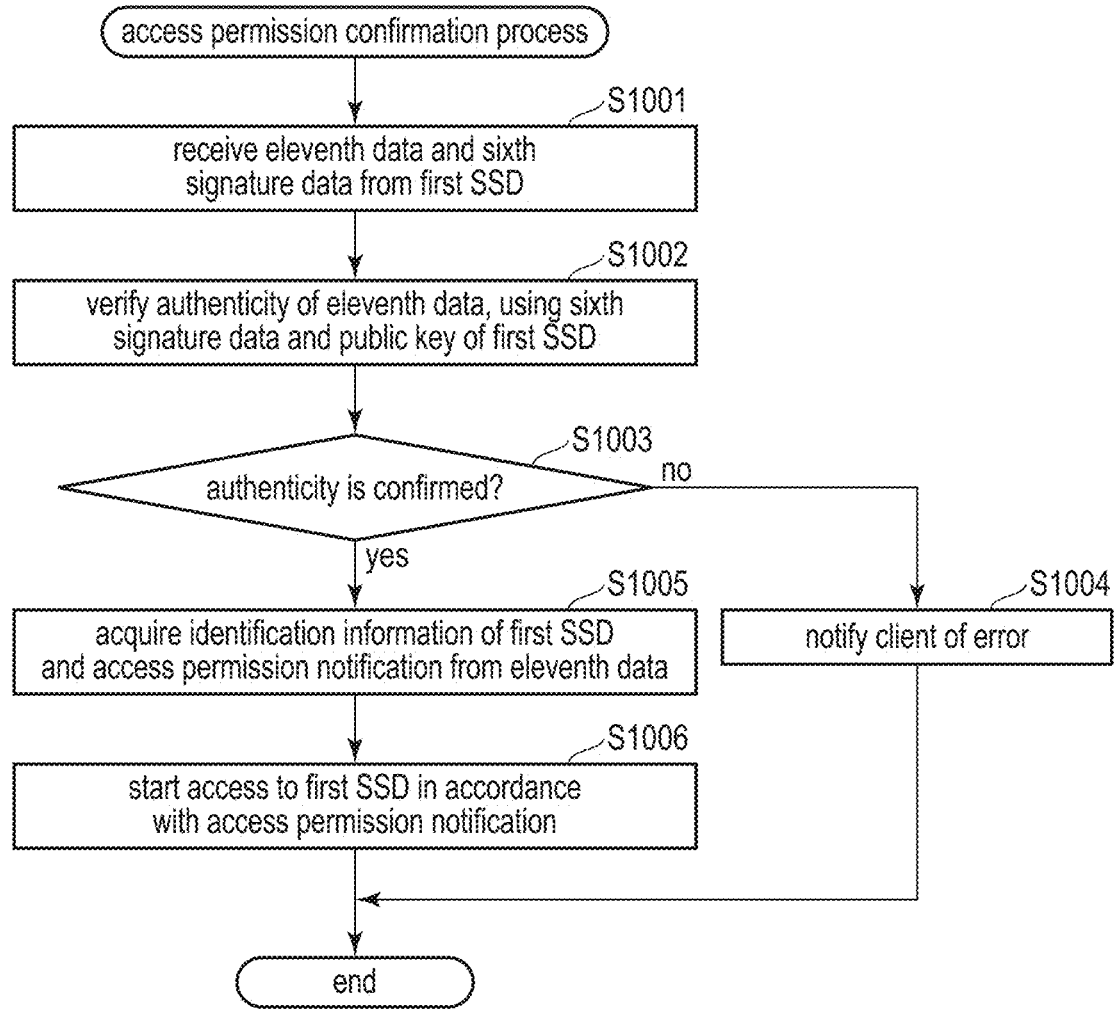
F I G. 27

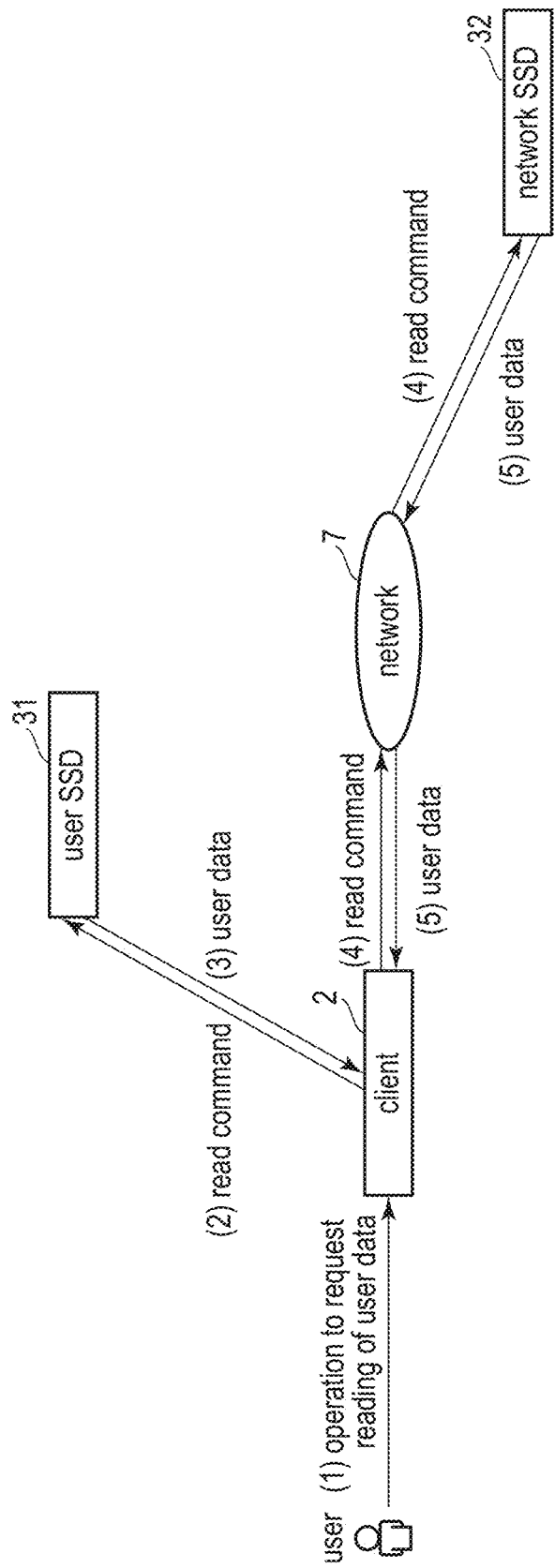
F I G. 29

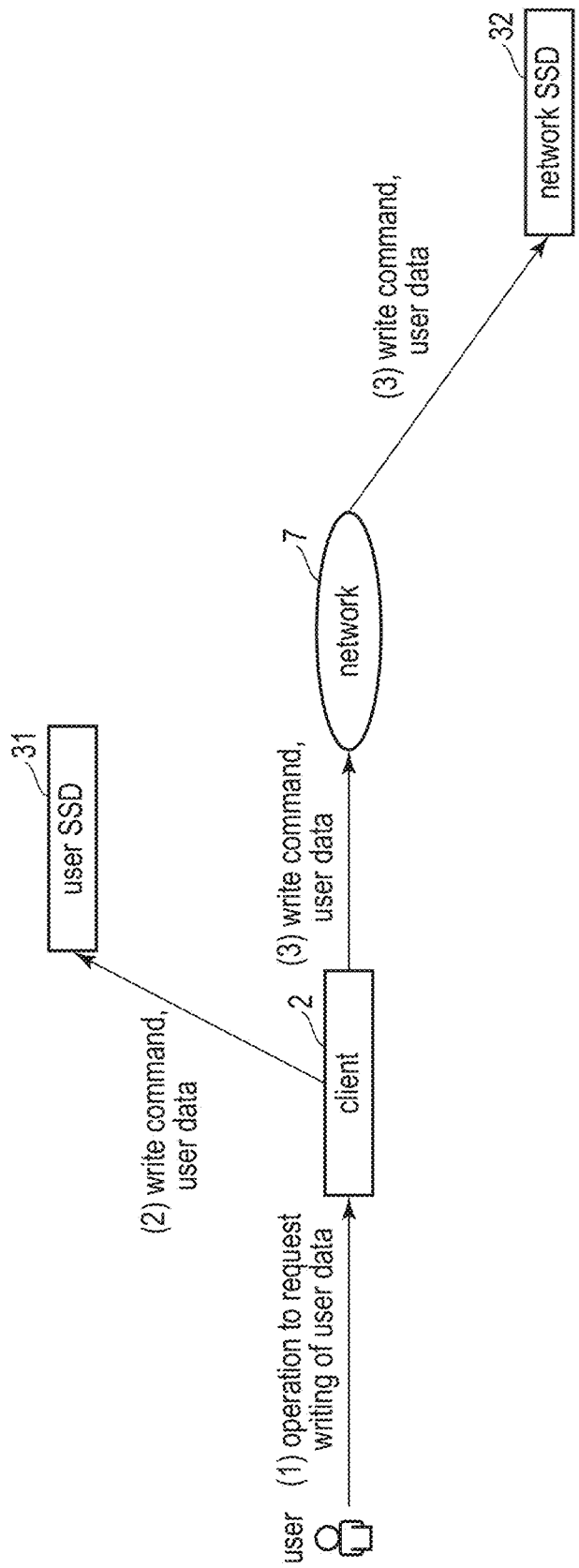
F I G. 30

MEMORY SYSTEM AND STORAGE SYSTEM MANAGING FIRST AND SECOND ACCOUNT INFORMATION FOR AUTHENTICATION OF FIRST AND SECOND ACCOUNTS

CROSS-REFERENCE TO RELATED APPLICATIONS

This application is a continuation of U.S. application Ser. No. 17/546,999, filed on Dec. 9, 2021, which is based upon and claims the benefit of priority from Japanese Patent Application No. 2021-109919, filed Jul. 1, 2021, the entire contents of each of which are incorporated herein by reference.

FIELD

Embodiments described herein relate generally to a technique for controlling a memory system that includes a nonvolatile memory, a storage system, and an information processing system.

BACKGROUND

In recent years, memory systems including a nonvolatile memory are widely used. As one of such memory systems, a solid state drive (SSD) including a NAND flash memory is known. The SSD is used as a main storage for various computing devices.

In order to prevent data leakage, a memory system sometimes has a self-encrypting function of automatically encrypting data at the time of writing. The memory system having the self-encryption function may be referred to as a self-encrypting drive (SED).

One of the security standards to which the SED should conform is Trusted Computing Group (TCG) standard. TCG standard defines, for example, data encryption and access control for each partial area of storage.

Further, the memory system may include not only a host interface (host I/F) for connection to a host but also a network interface (network I/F) for connection to a network.

For example, when the memory system is an SED, a user needs to manage account information used for authentication of an account for accessing the SED. Therefore, when using multiple SEDs on a network from a client device, the user needs to manage multiple pieces of account information in order to access each of the SEDs. It is troublesome for the user to manage the multiple pieces of account information.

BRIEF DESCRIPTION OF THE DRAWINGS

FIG. 1 is a block diagram illustrating an example of a configuration of an information processing system according to an embodiment.

FIG. 3 is a view illustrating an example of a configuration of an account management table used in the first-type memory system according to the embodiment.

FIG. 4 is a block diagram illustrating an example of a configuration of a second-type memory system of the information processing system according to the embodiment.

FIG. 5 is a view illustrating an example of a configuration of an account management table used in the second-type memory system according to the embodiment.

FIG. 6 is a view illustrating an example of a flow of account information in the information processing system according to the embodiment.

FIG. 7 is a view illustrating an example of an account issuance operation in the information processing system according to the embodiment.

FIG. 8 is a view illustrating examples of the account management table before and after new account information is registered in the second-type memory system according to the embodiment.

FIG. 9 is a view illustrating examples of the account management table before and after new account information is registered in the first-type memory system according to the embodiment.

FIG. 10 is a view illustrating an example of an account change operation in the information processing system according to the embodiment.

FIG. 11 is a view illustrating an example in which the account management table is updated according to an account change in the second-type memory system according to the embodiment.

FIG. 12 is a view illustrating an example in which the account management table is updated according to an account change in the first-type memory system according to the embodiment.

FIG. 16 is a view illustrating an example of a flow of data in a case where user data is written in the information processing system according to the embodiment.

FIG. 17 is a view illustrating an example of a write operation in the information processing system according to the embodiment.

FIG. 25 is a flowchart illustrating an example of the procedure of an access application process executed in the first-type memory system according to the embodiment.

FIG. 27 is a flowchart illustrating an example of the procedure of an access permission confirmation process executed in the first-type memory system according to the embodiment.

FIG. 29 is a view illustrating another example of the flow of data in the case where the user data is read in the information processing system according to the embodiment.

FIG. 30 is a view illustrating another example of the flow of data in the case where the user data is written in the information processing system according to the embodiment.

DETAILED DESCRIPTION

Figure 2:
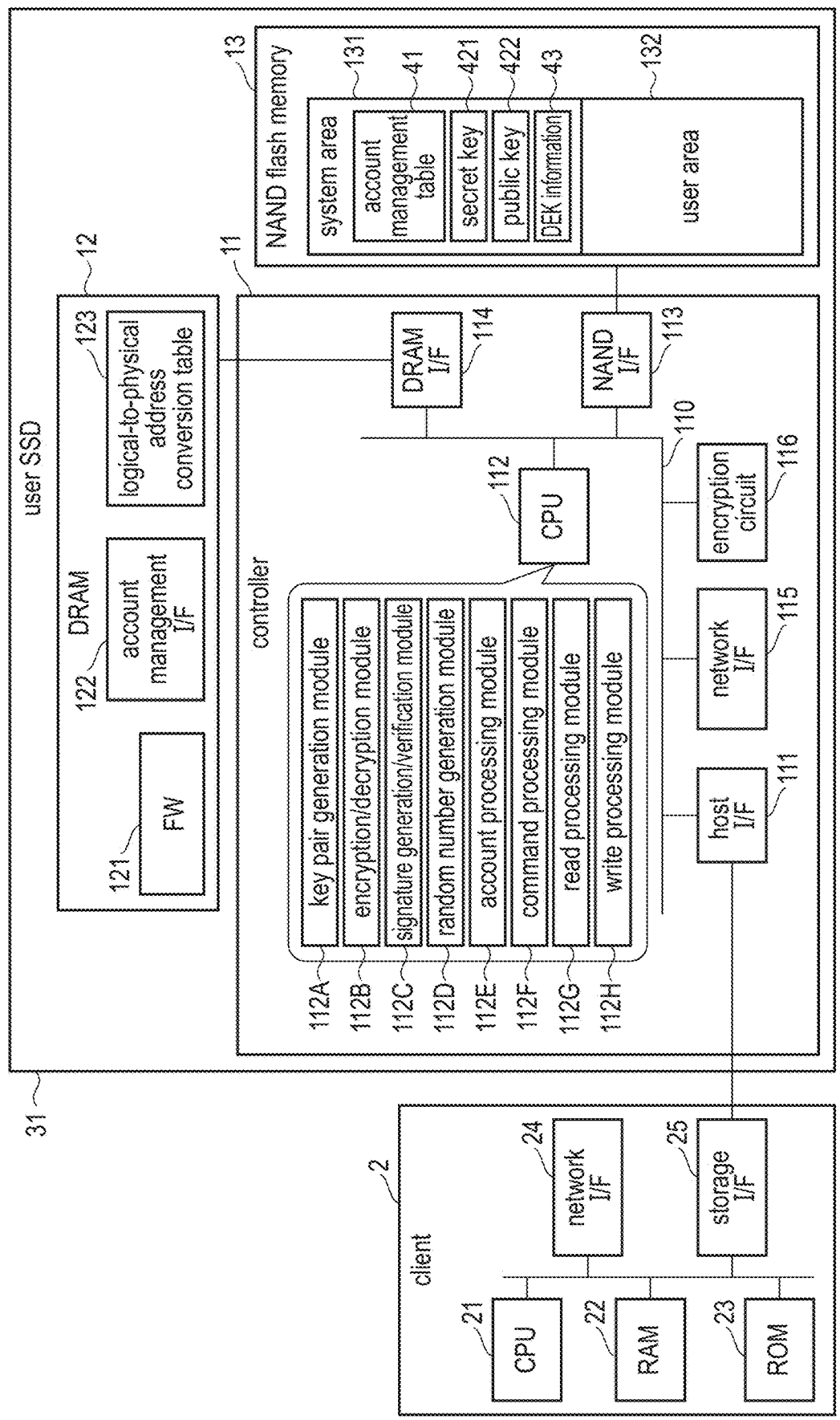
FIG. 2 is a block diagram illustrating an example of a configuration of a client device and a first-type memory system of the information processing system according to the embodiment.

Various embodiments will be described hereinafter with reference to the accompanying drawings.

In general, according to one embodiment, a memory system includes a nonvolatile memory and a controller. The controller communicates with a first memory system via a first interface that conforms to a first standard. The controller communicates with a host device via a second interface that conforms to a second standard different from the first standard. The controller manages first account information to be used for authentication of a first account and second account information to be used for authentication of a second account. The controller receives third account information from the host device. When the third account information matches the first account information, the controller permits access to at least a partial storage area of the nonvolatile memory based on a request from the host device and transmits first data that includes the second account information to the first memory system.

First, an example of a configuration an information processing system 1 according to an embodiment will be described with reference to FIG. 1. The information processing system 1 includes a client device 2 (hereinafter, referred to as a client 2) and a storage system. The storage system includes multiple memory systems 3. The information processing system 1 may include multiple clients 2. The client 2 and the memory systems 3 are connectable to each other via a network 7.

The client 2 is an information processing device used by a user. The client 2 is realized as, for example, a personal computer. The client 2 functions as a host for one of the memory systems 3.

Each of the memory systems 3 is a semiconductor storage device configured to write data to a nonvolatile memory, such as a NAND flash memory, and read data from the nonvolatile memory. Each of the memory systems 3 is also referred to as a storage device.

The memory systems 3 are realized as, for example, solid state drives (SSDs) each including a NAND flash memory. Hereinafter, a case where the memory systems 3 are realized as SSDs will be mainly explained, but the memory systems 3 may be realized as hard disk drives (HDDs).

Each of the memory systems 3 has a self-encryption function of automatically encrypting data at the time of writing in order to prevent data leakage. That is, the memory systems 3 are self-encrypting drives (SEDs) each having the self-encryption function. The memory systems 3 conform to, for example, Trusted Computing Group (TCG) standard, and have the self-encryption function defined by TCG standard. TCG standard defines, for example, data encryption and access control for each partial area of storage.

Each of the memory systems 3 is capable of operating as one of two types of memory systems.

The first-type memory system 3 is a memory system connectable to the client 2 via a host interface (host I/F) and connectable to the second-type memory system 3 via a network interface (network I/F).

The second-type memory system 3 is a memory system connectable to at least one of the client 2 and the first-type memory system 3 via the network I/F.

Hereinafter, the memory system 3 operating as the first type is referred to as a user SSD 31. Further, the memory system 3 operating as the second type is referred to as a network SSD 32.

In the example illustrated in FIG. 1, the information processing system 1 includes at least one user SSD 31. The information processing system 1 may include multiple user SSDs 31. Further, the information processing system 1 includes n network SSDs 32. Here, n is an integer of one or more. The n network SSDs 32 include, for example, a first SSD 32-1, a second SSD 32-2, . . . , and an nth SSD 32-$n$. Hereinafter, one of the n network SSDs 32 may be referred to as a network SSD 32.

The user SSD 31 and the n network SSDs 32 may be used as storages of the client 2.

The user SSD 31 is, for example, an SSD owned by one user who uses the client 2. The user SSD 31 may be provided inside the client 2 or may be connected to the client 2 via a slot provided in the client 2 or a cable. The user SSD 31 may be accessed from the connected client 2.

An interface for connecting the client 2 and the user SSD 31 conforms to standards such as small computer system interface (SCSI), serial attached SCSI (SAS), AT attachment (ATA), serial ATA (SATA), PCI Express (PCIe) (registered trademark), NVM Express (NVMe) (registered trademark), or universal serial bus (USB).

The network SSD 32 is an SSD that may be used by multiple users including the user who uses the client 2. That is, the network SSD 32 may be accessed from multiple client devices including the client 2 through the network 7.

An interface for connecting the client 2 and the network SSD 32 conforms to standards such as Ethernet, Fibre channel, Infiniband, NVMe, or NVMe over Fabrics (NVMe-oF).

When an account for accessing the user SSD 31 is successfully authenticated, the user SSD 31 permits the account to access the user SSD 31. Similarly, when an account for accessing the network SSD 32 is successfully authenticated, the network SSD 32 permits the account to access the network SSD 32.

For example, the accounts are authenticated using account information input by the user using the client 2. In this case, the user needs to manage multiple pieces of account information that correspond to multiple SSDs to be used (for example, the user SSD 31 and the n network SSDs 32), respectively.

In a case where the number of SSDs used by the user is large, it is troublesome for the user to manage a large number of pieces of account information. Further, in a case where the user forgets the account information, there is a possibility that the user is no longer accessible to data stored in the SSD. Further, in a case where the account information is known to a third party, there is a possibility that data stored in the SSD is leaked or tampered with.

Thus, the information processing system 1 of the present embodiment is configured to enable the user to manage account information easily.

Specifically, the user SSD 31 manages first account information to be used for authentication of a first account, and second account information to be used for authentication of a second account. The user SSD 31 receives third account information input by the user from the client 2 and then authenticates the first account. When the first account is successfully authenticated, that is, when the third account information matches the first account information, the user SSD 31 permits access to the user SSD 31 (more specifically, at least a partial storage area of its NAND flash memory) based on a request from the client 2, and transmits data including the managed second account information to the network SSD 32.

The network SSD 32 receives the data including the second account information transmitted from the user SSD 31, and then authenticates the second account. The network SSD 32 manages fourth account information to be used for authentication of the second account. When the second account is successfully authenticated, that is, when the second account information matches the fourth account information, the network SSD 32 permits access to the network SSD 32 (more specifically, at least a partial storage area of its NAND flash memory).

In this manner, when the first account is successfully authenticated, the user SSD 31 permits access to the user SSD 31 and transmits the managed second account information of the network SSD 32 to the network SSD 32. Therefore, the user does not need to manage the second account information. That is, the user can access the user SSD 31 and the network SSD 32 only by managing the account information of the user SSD 31. Therefore, it is possible to enable the user to manage the account information easily.

FIG. 2 is a block diagram illustrating an example of a configuration of the client 2 and the user SSD 31.

(Client)

The client 2 includes, for example, a central processing unit (CPU) 21, a random access memory (RAM) 22, a read-only memory (ROM) 23, a network I/F 24, and a storage interface (storage I/F) 25. The RAM 22 is, for example, a static random access memory (SRAM). The ROM 23 is, for example, a NOR flash memory.

The CPU 21 is a processor that controls operations of various components of the client 2. The CPU 21 executes various programs loaded from the ROM 23 to the RAM 22, for example. These programs include a basic input/output system (BIOS), an operating system (OS), and various application programs. The BIOS is a program for hardware control.

The network I/F 24 controls communication through the network 7. The network I/F 24 is realized as, for example, a circuit. The network I/F 24 includes, for example, a transmission unit that transmits signal and a reception unit that receives signal. The network I/F 24 performs communication through the network 7 using, for example, combinations of an internet protocol address (IP address) and a media access control address (MAC address) that are assigned to the client 2, the user SSD 31 and the network SSD 32, respectively.

The storage I/F 25 controls communication with the user SSD 31. The storage I/F 25 is realized as a circuit, for example.

(User SSD)

The user SSD 31 includes, for example, a controller 11, a DRAM 12 and a NAND flash memory 13. The controller 11 may be realized with a circuit such as a system-on-a-chip (SoC). The controller 11 may include an SRAM. Alternatively, the DRAM 12 may be provided inside the controller 11.

The DRAM 12 includes, for example, storage areas for a firmware (FW) 121 and an account management interface (account management I/F) 122, and a cache area of a logical-to-physical address conversion table 123. The storage area of the DRAM 12 may be allocated as buffer areas used as a read buffer and a write buffer.

The FW 121 is a program for controlling an operation of the controller 11. The FW 121 is loaded from the NAND flash memory 13 to the DRAM 12, for example.

The account management I/F 122 is a software interface that manages an account for accessing the user SSD 31 and an account for accessing the network SSD 32. The account management I/F 122 includes a program including instructions for enabling a CPU 112 of the controller 11 to execute a process for managing an account. The account management I/F 122 may be included in the FW 121. The account management I/F 122 is loaded from the NAND flash memory 13 to the DRAM 12, for example.

The logical-to-physical address conversion table 123 contains information for managing mapping between each logical address and each physical address of the NAND flash memory 13.

The logical address is used by the client 2 for addressing the user SSD 31 and the network SSD 32. The logical address is, for example, a logical block address (LBA).

The NAND flash memory 13 includes multiple blocks. Each of the blocks includes multiple pages. The blocks each function as a minimum unit of a data erase operation. The block may also be referred to as an erase block or a physical block. Each of the pages includes memory cells connected to a single word line. The pages each function as a unit of a data write operation and a data read operation. Note that a word line may function as a unit of a data write operation and a data read operation.

The tolerable maximum number of program/erase cycles (maximum number of P/E cycles) for each of the blocks is limited. One P/E cycle of a block includes a data erase operation to erase data stored in all memory cells in the block and a data write operation to write data in each page of the block.

The controller 11 functions as a memory controller configured to control the NAND flash memory 13.

The controller 11 may function as a flash translation layer (FTL) configured to execute data management and block management of the NAND flash memory 13. The data management executed by the FTL includes (1) management of mapping data indicative of relationship between each logical address and each physical address of the NAND flash memory 13, and (2) process to hide a difference between read/write operations executed in units of page and erase operations executed in units of block. The block management includes management of defective block, wear leveling, and garbage collection (GC).

Management of mapping between each logical address and each physical address is executed using the logical-to-physical address conversion table 123. The controller 11 uses the logical-to-physical address conversion table 123 to manage the mapping between each logical address and each physical address with a certain management size. A physical address corresponding to a logical address indicates a physical memory location in the NAND flash memory 13 to which data of the logical address is written. The logical-to-physical address conversion table 123 may be loaded from the NAND flash memory 13 to the DRAM 12 when the user SSD 31 boots up.

Data write into one page is executable only once in a single P/E cycle. Thus, the controller 11 writes updated data corresponding to a logical address not to an original physical memory location in which previous data corresponding to the logical address is stored but to a different physical memory location. Then, the controller 11 updates the logical-to-physical address conversion table 123 to associate the logical address with the different physical memory location than the original physical memory location and to invalidate the previous data.

Data to which the logical-to-physical address conversion table 123 refers (that is, data associated with a logical address) will be referred to as valid data. Furthermore, data not associated with any logical address will be referred to as invalid data. The valid data is data to possibly be read by the client 2 later. The invalid data is data not to be read by the client 2 anymore.

The controller 11 manages at least one storage area obtained by logically dividing the storage area of the NAND flash memory 13. The storage area of the NAND flash memory 13 is allocated as, for example, a system area 131 and a user area 132.

In the system area 131, for example, an account management table 41, a secret key 421, a public key 422, and data encryption key (DEK) information 43 are stored.

The account management table 41 manages account information that is used for authentication of an account for accessing the user SSD 31 and account information that is used for authentication of an account for accessing the network SSD 32. The account information includes, for example, a login identification (ID) and a login password. The login ID is identification information used for authentication of the corresponding account. The login password is a password used for authentication of the corresponding account.

Hereinafter, the account information used for authentication of the account for accessing the user SSD 31 is also referred to as account information for accessing the user SSD 31. The account information used for authentication of the account for accessing the network SSD 32 is also referred to as account information for accessing the network SSD 32.

The account information for accessing the user SSD 31 is information for verifying the validation of account information that is input by the user using the client 2.

The account information for accessing the network SSD 32 is information to be transmitted to the network SSD 32 to request authentication of an account. That is, the account information for accessing the network SSD 32 is information whose validation is verified by the network SSD 32.

An example of a specific configuration of the account management table 41 will be described later with reference to FIG. 3.

The secret key 421 and the public key 422 are a pair of keys managed in the user SSD 31. The secret key 421 and the public key 422 are also referred to as a master key pair of the user SSD 31. The secret key 421 is kept confidential inside the user SSD 31. The public key 422 is published to the outside of the user SSD 31. The public key 422 is published with a certificate from a certificate authority (CA), for example. The certificate from the CA proves the validity of the public key 422. In a case where data is encrypted with the secret key 421, the encrypted data is decrypted only with the public key 422. Further, in a case where data is encrypted with the public key 422, the encrypted data is decrypted only with the secret key 421. The secret key 421 and the public key 422 are used, for example, for encryption and decryption of data managed in the account management table 41 (for example, account information).

The DEK information 43 includes information about a DEK. The DEK is used for encryption of data to be written into the NAND flash memory 13 and decryption of data read from the NAND flash memory 13. Note that the DEK is not used for encryption and decryption of data managed in the account management table 41. The DEK information 43 may include, for example, one or more DEKs that are associated with one or more accounts for accessing the NAND flash memory 13, respectively. The DEK information 43 may include an encrypted DEK obtained by encrypting a DEK. The encrypted DEK is obtained, for example, by encrypting the DEK with a key encryption key (KEK) that is generated using the account information for accessing the user SSD 31.

The secret key 421 and the public key 422 (master key pair), and a DEK are, for example, management information associated with an account of a certain user.

The account management table 41, the secret key 421, the public key 422, and the DEK information 43 may be loaded from the NAND flash memory 13 to the DRAM 12, for example, when the user SSD 31 boots up.

The user area 132 is an area where access by the user is controlled using the account management table 41. For example, at least a partial storage area of the user area 132 is associated with each of one or more accounts for accessing the user SSD 31. When an account is successfully authenticated, access to the associated storage area is permitted.

The controller 11 may include a host I/F 111, the CPU 112, a NAND interface (NAND I/F) 113, a DRAM interface (DRAM I/F) 114, a network I/F 115, and an encryption circuit 116. The host I/F 111, the CPU 112, the NAND I/F 113, the DRAM I/F 114, the network I/F 115, and the encryption circuit 116 may be connected via a bus 110.

The host I/F 111 functions as a circuit that receives various commands, for example, input/output (I/O) commands, control commands and TCG commands from the client 2. The I/O commands may include a write command and a read command. The control commands may include an unmap command (trim command) and a format command. The format command is a command for unmapping all the logical addresses in the user SSD 31 entirely. Further, the TCG commands may include commands for requesting the user SSD 31 to perform authentication, a change of setting related to access to the NAND flash memory 13, and the like.

Further, the host I/F 111 functions as a circuit that transmits a response, data, and the like to the client 2 in accordance with a received command.

The NAND I/F 113 electrically connects the controller 11 and the NAND flash memory 13. The NAND I/F 113 supports an interface standard such as toggle double data rate (DDR) and an open NAND flash interface (ONFI).

The NAND I/F 113 functions as a NAND control circuit configured to control the NAND flash memory 13. The NAND I/F 113 may be connected to memory chips in the NAND flash memory 13 via multiple channels. By operating the memory chips in parallel, it is possible to broaden an access bandwidth between the controller 11 and the NAND flash memory 13.

The DRAM I/F 114 functions as a DRAM control circuit configured to control access to the DRAM 12. The storage area of the DRAM 12 is allocated to areas for storing the FW 121, the account management I/F 122, and the logical-to-physical address conversion table 123, and a buffer area used as a read/write buffer.

The network I/F 115 functions as a communication control circuit configured to control communication through the network 7. The network I/F 115 includes, for example, a transmission unit that transmits signal and a reception unit that receives signal. The network I/F 115 performs communication through the network 7 using, for example, combinations of an IP address and a MAC address that are assigned to the client 2, the user SSD 31, and the network SSD 32, respectively.

The encryption circuit 116 performs encryption and decryption of user data. The encryption circuit 116 encrypts user data that is to be written into the NAND flash memory 13 via the NAND I/F 113. The encryption circuit 116 decrypts user data that has read from the NAND flash memory 13 via the NAND I/F 113. The encryption circuit 116 uses, for example, a DEK set by the CPU 112 for the encryption and decryption.

The CPU 112 is a processor configured to control the respective units of the controller 11. The CPU 112 executes various programs loaded from the NAND flash memory 13 to the DRAM 12. These programs include the FW 121 and the account management I/F 122. The operation of the CPU 112 is controlled by the FW 121 and the account management I/F 122 executed by the CPU 112.

The FW 121 is a program including instructions for enabling the CPU 112 to execute various processes. The FW 121 includes, for example, instructions for enabling the CPU 112 to execute command processes to process various commands from the client 2.

Processes realized by the CPU 112 executing the account management I/F 122 include, for example, a process of authenticating an account, a process of requesting new issuance of an account, a process of requesting a change of an account, and a process of applying for access.

The process of authenticating an account is a process of verifying the validation of the account information (for example, a login ID and a login password) for accessing the user SSD 31 when the account information is received from the client 2.

The process of requesting new issuance of an account is a process of requesting the network SSD 32 to issue an account for accessing the network SSD 32.

The process of requesting a change of an account is a process of requesting the network SSD 32 to change account information used for authentication of an account issued by the network SSD 32. The change of the account information is, for example, a change of at least one of a login ID and a login password.

The process of applying for access is a process of applying for access to the network SSD 32 using an account issued by the network SSD 32.

The function of the respective units in the controller 11 may be realized by a dedicated hardware in the controller 11, may be realized by the CPU 112 executing the FW 121 and the account management I/F 122, or may be realized by a combination thereof.

The CPU 112 functions as, for example, a key pair generation module 112A, an encryption/decryption module 112B, a signature generation/verification module 112C, a random number generation module 112D, an account processing module 112E, a command processing module 112F, a read processing module 112G, and a write processing module 112H. The CPU 112 functions as the command processing module 112F, the read processing module 112G, and the write processing module 112H by executing the FW 121, for example. The CPU 112 functions as the key pair generation module 112A, the encryption/decryption module 112B, the signature generation/verification module 112C, the random number generation module 112D, and the account processing module 112E by executing the account management I/F 122, for example.

The key pair generation module 112A generates the secret key 421 and the public key 422. For example, the key pair generation module 112A generates the secret key 421 and the public key 422 after the shipment of the user SSD 31 before the user starts practical use of the user SSD 31. The key pair generation module 112A stores the generated secret key 421 and public key 422 in the system area 131.

Specific operations of the encryption/decryption module 112B, the signature generation/verification module 112C, the random number generation module 112D, and the account processing module 112E will be described later with reference to FIGS. 7 to 13. Specific operations of the command processing module 112F, the read processing module 112G, and the write processing module 112H will be described later with reference to FIGS. 15 and 17.

FIG. 3 illustrates an example of a configuration of the account management table 41 used in the user SSD 31. The account management table 41 may manage multiple accounts for accessing multiple SSDs, respectively. The multiple accounts may include an account for accessing the user SSD 31 and an account for accessing the network SSD 32. The account for accessing the user SSD 31 is an account to be authenticated by the user SSD 31. The account for accessing the network SSD 32 is an account to be authenticated by the network SSD 32.

The account management table 41 includes entries that correspond to accounts, respectively. Each of the entries includes, for example, an SSD identification information field, a login ID field, a login password field, and a public key field.

In an entry corresponding to an account, the SSD identification information field indicates identification information of an SSD associated with the account. The SSD associated with the account is an SSD that should perform authentication of the account. The identification information of the SSD is information capable of identifying one SSD of the information processing system 1. For example, a MAC address assigned to the SSD is used as the identification information of the SSD.

The login ID field indicates data obtained by encrypting identification information (login ID) to be used for authentication of the corresponding account. For example, a random number is used as the login ID. Further, a character string generated on the basis of a specific naming convention may be used as the login ID. The data set in the login ID field is, for example, a login ID encrypted with a public key of an SSD which should perform authentication of the corresponding account. The data set in the login ID field is, for example, the login ID encrypted with the public key 422 of the user SSD 31. Alternatively, the data set in the login ID field may be the login ID encrypted with a specific encryption key managed in the user SSD 31.

The login password field indicates a password (login password) to be used for authentication of the corresponding account. For example, a random number is used as the login password. The data set in the login password field is, for example, a login password encrypted with a public key of an SSD which should perform authentication of the corresponding account. The data set in the login password field is, for example, the login password encrypted with the public key 422 of the user SSD 31. Alternatively, the data set in the login password field may be the login password encrypted with a specific encryption key managed in the user SSD 31.

The public key field indicates a public key published by an SSD that is associated with the corresponding account. That is, the public key field indicates the public key published by the SSD which should perform authentication of the corresponding account.

Specifically, for example, in a case where the identification information of the user SSD 31 ("User's SSD-1" in the example illustrated in FIG. 3) is set in the SSD identification information field, the public key 422 published by the user SSD 31 is set in the public key field.

Further, for example, in a case where the identification information of the first SSD 32-1 ("SSD-A" in the example illustrated in FIG. 3) is set in the SSD identification information field, the public key 462 published by the first SSD 32-1 is set in the public key field.

Further, for example, in a case where the identification information of the second SSD 32-2 ("SSD-B" in the example illustrated in FIG. 3) is set in the SSD identification information field, the public key 462 published by the second SSD 32-2 is set in the public key field.

In the example illustrated in FIG. 3, a login ID "user-admin", a login password "user-admin-password", and a public key "111111111 . . . " are associated with an account that is associated with the user SSD 31 whose SSD identification information is "User's SSD-1".

A login ID "ssd-a-user-25", a login password "ssd-a-user-25-password", and a public key "AAAAAAAAA . . . " are associated with an account that is associated with the first SSD 32-1 whose SSD identification information is "SSD-A".

A login ID "ssd-b-user-125", a login password "ssd-b-user-125-password", and a public key "BBBBBBBBB . . . " are associated with an account that is associated with the second SSD 32-2 whose SSD identification information is "SSD-B".

(Network SSD)

FIG. 4 is a block diagram illustrating an example of a configuration of the network SSD 32.

The network SSD 32 includes, for example, a controller 15, a DRAM 16, and a NAND flash memory 17. The controller 15 may be realized with a circuit such as an SoC. The controller 15 may include an SRAM. Alternatively, the DRAM 16 may be provided inside the controller 15.

The DRAM 16 includes, for example, storage areas of a FW 161 and an account management I/F 162, and a cache area of a logical-to-physical address conversion table 163. The storage area of the DRAM 16 may be allocated as buffer areas used as a read buffer and a write buffer.

The FW 161 is a program for controlling an operation of the controller 15. The FW 161 is loaded from the NAND flash memory 17 to the DRAM 16, for example.

The account management I/F 162 is a software interface that manages an account for accessing the network SSD 32. The account management I/F 162 includes a program including instructions for enabling a CPU 152 of the controller 15 to execute a process for managing an account. The account management I/F 162 may be included in the FW 161. The account management I/F 162 is loaded from the NAND flash memory 17 to the DRAM 16, for example.

The logical-to-physical address conversion table 163 contains information for managing mapping between each logical address and each physical address of the NAND flash memory 17.

The configuration of the NAND flash memory 17 is similar to the configuration of the NAND flash memory 13 described above with reference to FIG. 2.

The controller 15 functions as a memory controller configured to control the NAND flash memory 17. The control of the NAND flash memory 17 by the controller 15 is similar to the control of the NAND flash memory 13 by the controller 11 described above with reference to FIG. 2.

The controller 15 manages at least one storage area obtained by logically dividing the storage area of the NAND flash memory 17. The storage area of the NAND flash memory 17 is allocated as, for example, a system area 171 and a user area 172.

In the system area 171, for example, an account management table 45, a secret key 461, a public key 462, and DEK information 47 are stored.

The account management table 45 manages account information that is used for authentication of an account for accessing the network SSD 32 (i.e., account information for accessing the network SSD 32).

The account information for accessing the network SSD 32 is information for verifying the validation of account information received from the user SSD 31 when the user SSD 31 requests authentication of an account. Note that the account information for accessing the network SSD 32 may include information for verifying the validation of account information input by the user using the client 2. For example, when the client 2 is connected to the network SSD 32 via a host I/F 151 of the controller 15, the account information for accessing the network SSD 32 includes information for verifying the validation of the account information input by the user using the client 2.

An example of a specific configuration of the account management table 45 will be described later with reference to FIG. 5.

The secret key 461 and the public key 462 are a pair of keys managed in the network SSD 32. The secret key 461 and the public key 462 are also referred to as a master key pair of the network SSD 32. The secret key 461 is kept confidential inside the network SSD 32. The public key 462 is published to the outside of the network SSD 32. The public key 462 is published with a certificate from a CA, for example. The certificate from the CA proves the validity of the public key 462. In a case where data is encrypted with the secret key 461, the encrypted data is decrypted only with the public key 462. Further, in a case where data is encrypted with the public key 462, the encrypted data is decrypted only with the secret key 461. The secret key 461 and the public key 462 are used, for example, for encryption and decryption of data managed in the account management table 45.

The DEK information 47 includes information about a DEK. The DEK is used for encryption of data to be written into the NAND flash memory 17 and decryption of data read from the NAND flash memory 17. Note that the DEK is not used for encryption and decryption of data managed in the account management table 45. The DEK information 47 may include, for example, one or more DEKs that are associated with one or more accounts for accessing the network SSD 32 (more specifically, the user area 172 of the NAND flash memory 17), respectively. The DEK information 47 may include an encrypted DEK obtained by encrypting a DEK. The encrypted DEK is obtained, for example, by encrypting the DEK with a KEK that is generated using the account information for accessing the network SSD 32.

The secret key 461 and the public key 462 (master key pair), and a DEK are, for example, management information associated with an account of a specific user.

The account management table 45, the secret key 461, the public key 462, and the DEK information 47 may be loaded from the NAND flash memory 17 to the DRAM 16, for example, when the network SSD 32 boots up.

The user area 172 is an area where access by the user is controlled using the account management table 45. For example, at least a partial storage area of the user area 172 is associated with each of one or more accounts for accessing the network SSD 32. When an account is successfully authenticated, access to the associated storage area is permitted.

The controller 15 may include the host I/F 151, the CPU 152, a NAND I/F 153, a DRAM I/F 154, a network I/F 155, and an encryption circuit 156. The host I/F 151, the CPU 152, the NAND I/F 153, the DRAM I/F 154, the network I/F 155, and the encryption circuit 156 may be connected via a bus 150. The host I/F 151, the CPU 152, the NAND I/F 153, the DRAM I/F 154, the network I/F 155, and the encryption circuit 156 have the same configuration and function as the host I/F 111, the CPU 112, the NAND I/F 113, the DRAM I/F 114, the network I/F 115, and the encryption circuit 116 in the user SSD 31, respectively, that are described above with reference to FIG. 2. Hereinafter, differences from the user SSD 31 will be mainly described.

The CPU 152 is a processor configured to control the respective units of the controller 15. The CPU 152 executes various programs loaded from the NAND flash memory 17 to the DRAM 16. These programs include the FW 161 and the account management I/F 162. The operation of the CPU 152 is controlled by the FW 161 and the account management I/F 162 executed by the CPU 152.

The FW 161 is a program including instructions for enabling the CPU 152 to execute various processes. The FW 161 includes, for example, instructions for enabling the CPU 152 to execute command processes to process various commands from the client 2 or the user SSD 31.

Processes realized by the CPU 152 executing the account management I/F 162 include, for example, a process of authenticating an account, a process of newly issuing an account, a process of changing an account, and a process of controlling access.

The process of authenticating an account is a process of verifying the validation of the account information for accessing the network SSD 32 when the account information is received from the user SSD 31. The process of newly issuing an account is a process of issuing an account for accessing the network SSD 32.

The process of changing an account is a process of changing account information to be used for authentication of an issued account. The change of the account information is, for example, a change of at least one of a login ID and a login password.

The process of controlling access is a process of verifying the validation of account information received together with an access application and permitting access to the network SSD 32 when the validation is confirmed.

The function of the respective units in the controller 15 may be realized by a dedicated hardware in the controller 15, may be realized by the CPU 152 executing the FW 161 and the account management I/F 162, or may be realized by a combination thereof.

The CPU 152 functions as, for example, a key pair generation module 152A, an encryption/decryption module 152B, a signature generation/verification module 152C, a random number generation module 152D, an account processing module 152E, a command processing module 152F, a read processing module 152G, and a write processing module 152H. The CPU 152 functions as the command processing module 152F, the read processing module 152G, and the write processing module 152H by executing the FW 161, for example. The CPU 152 functions as the key pair generation module 152A, the encryption/decryption module 152B, the signature generation/verification module 152C, the random number generation module 152D, and the account processing module 152E by executing the account management I/F 162, for example.

The key pair generation module 152A generates the secret key 461 and the public key 462. For example, the key pair generation module 152A generates the secret key 461 and the public key 462 after the shipment of the network SSD 32 before the user starts practical use of the network SSD 32. The key pair generation module 152A stores the generated secret key 461 and public key 462 in the system area 171.

Specific operations of the encryption/decryption module 152B, the signature generation/verification module 152C, the random number generation module 152D, and the account processing module 152E will be described later with reference to FIGS. 7 to 13. Specific operations of the command processing module 152F, the read processing module 152G, and the write processing module 152H will be described later with reference to FIGS. 15 and 17.

FIG. 5 illustrates an example of a configuration of the account management table 45 used in the network SSD 32. Hereinafter, a case where the network SSD 32 is the first SSD 32-1 will be explained for easy understanding. Note that the account management tables 45 that are used by the second SSD 32-2, . . . , and the nth SSD 32-n, respectively, have the same configuration as the account management table 45 of the first SSD 32-1.

The account management table 45 of the first SSD 32-1 may manage multiple accounts for accessing the first SSD 32-1. The multiple accounts are accounts issued by the first SSD 32-1. The multiple accounts may include, for example, an account for accessing the first SSD 32-1 from the client 2 that is connected to the first SSD 32-1, and an account for accessing the first SSD 32-1 from the user SSD 31.

The account management table 45 includes entries that correspond to accounts, respectively. Each of the entries includes, for example, an SSD identification information field, a login ID field, a login password field, and a public key field.

In an entry corresponding to an account, the SSD identification information field indicates identification information of an SSD associated with the account. The SSD associated with the account is either the first SSD 32-1 or an SSD that requests the first SSD 32-1 to authenticate the account. The SSD that requests the first SSD 32-1 to authenticate the account is, for example, the user SSD 31.

The login ID field indicates data obtained by encrypting identification information (login ID) to be used for authentication of the corresponding account. For example, a random number is used as the login ID. Further, a character string generated on the basis of a specific naming convention may be used as the login ID. The data set in the login ID field is, for example, the login ID encrypted with the public key 462 of the first SSD 32-1. Alternatively, the data set in the login ID field may be the login ID encrypted with a specific encryption key managed in the first SSD 32-1.

The login password field indicates a password (login password) to be used for authentication of the corresponding account. For example, a random number is used as the login password. The data set in the login password field is, for example, the login password encrypted with the public key 462 of the first SSD 32-1. Alternatively, the data set in the login password field may be the login password encrypted with a specific encryption key managed in the first SSD 32-1. The public key field indicates a public key published by an SSD that is associated with a corresponding account.

Specifically, for example, in a case where the identification information of the first SSD 32-1 ("SSD-A" in the example illustrated in FIG. 5) is set in the SSD identification information field, the public key 462 published by the first SSD 32-1 is set in the public key field.

Further, for example, in a case where the identification information of the user SSD 31 ("User's SSD-1" in the example illustrated in FIG. 5) is set in the SSD identification information field, the public key 422 published by the user SSD 31 is set in the public key field.

Further, for example, in a case where the identification information of another user SSD 31 ("User's SSD-2" in the example illustrated in FIG. 5) is set in the SSD identification information field, the public key 422 published by said another user SSD 31 is set in the public key field.

In the example illustrated in FIG. 5, a login ID "admin", a login password "ad-pwd", and a public key "AAAAAAAAA . . . " are associated with an account that is associated with the first SSD 32-1 whose SSD identification information is "SSD-A".

A login ID "ssd-a-user-25", a login password "ssd-a-user-25-password", and a public key "111111111 . . . " are associated with an account that is associated with the user SSD 31 whose SSD identification information is "User's SSD-1".

A login ID "ssd-a-user-100", a login password "ssd-a-user-100-password", and a public key "222222222 . . . " are associated with an account that is associated with the user SSD 31 whose SSD identification information is "User's SSD-2".

Next, transfer of account information in the information processing system 1 will be described.

FIG. 6 illustrates an example of a flow of account information in the information processing system 1. Here, a case where the user SSD 31 is connected to the client 2 via the host I/F 111 and is connected to the network 7 via the network I/F 115 will be explained.

The user inputs account information to be used for authentication of an account for accessing the user SSD 31 by an operation using the client 2 ((1) in FIG. 6).

The client 2 transmits the account information input by the user to the user SSD 31 ((2) in FIG. 6). The account information is transmitted from the client 2 to the user SSD 31 in plain text.

Further, the user SSD 31 and the network SSD 32 transfer account information to be used for authentication of an account for accessing the network SSD 32 through the network 7 ((3) in FIG. 6). The user SSD 31 and the network SSD 32 encrypt the account information and transfer the encrypted account information. The encrypted account information used for authentication of the account for accessing the network SSD 32 is referred to as encrypted account information of the network SSD 32.

Specifically, for example, when an account has been newly issued, the network SSD 32 transmits encrypted account information of the network SSD 32 to the user SSD 31 through the network 7. Further, for example, when requesting authentication of an account, the user SSD 31 transmits encrypted account information of the network SSD 32 to the network SSD 32 through the network 7.

In this manner, the account information for accessing the user SSD 31 is transmitted from the client 2 to the user SSD 31 in plain text. On the other hand, the account information for accessing the network SSD 32 is encrypted and transmitted through the network 7. Since the account information transferred through the network 7 is encrypted, it is possible to prevent leakage and tampering of the account information.

The transfer of the account information through the network 7 is performed in, for example, an operation for newly issuing an account for accessing the network SSD 32, an operation for changing an account for accessing the network SSD 32, and an operation for applying for access to the network SSD 32.

The operation for newly issuing an account for accessing the network SSD 32 is also referred to as an account issuance operation. The operation for changing an account for accessing the network SSD 32 is also referred to as an account change operation. The operation for applying for access to the network SSD 32 is also referred to as an access application operation. Examples of the account issuance operation, the account change operation, and the access application operation will be described below.

(Account Issuance Operation)

An example of the account issuance operation in the information processing system 1 will be described with reference to FIGS. 7 to 9. Here, as an example, a case where an account for accessing the first SSD 32-1 is issued to the user SSD 31 will be described.

FIG. 7 illustrates the example of the account issuance operation in the information processing system 1.

First, the client 2 transmits account information that is input according to the user's operation, to the user SSD 31 ((1) in FIG. 7). The account information input according to the user's operation is referred to as input account information. As described above with reference to FIG. 6, the input account information is sent in plain text. The input account information is used for authentication of an account (hereinafter, referred to as a first account) for accessing the user SSD 31. Note that, for example, the user performs an operation of requesting new issuance of an account for accessing the first SSD 32-1 together with the operation of inputting the account information. The client 2 may transmit, to the user SSD 31, a request for newly issuing the account for accessing the first SSD 32-1 together with the input account information.

In the user SSD 31, the account processing module 112E receives the input account information that is transmitted from the client 2, via the host I/F 111. The account processing module 112E verifies the validation of the input account information, using the account management table 41.

More specifically, the account processing module 112E identifies an entry in the account management table 41 in which identification information of the user SSD 31 is set in the SSD identification information field. The identified entry is an entry corresponding to the first account for accessing the user SSD 31. The account processing module 112E acquires account information from the identified entry ((2) in FIG. 7). As described above with reference to FIG. 3, this account information is encrypted with the public key 422 of the user SSD 31. The acquired encrypted account information is referred to as encrypted first registration account information. The encrypted first registration account information includes, for example, an encrypted login ID and an encrypted login password.

The account processing module 112E sends the encrypted first registration account information to the encryption/decryption module 112B ((3) in FIG. 7).

The encryption/decryption module 112B decrypts the encrypted first registration account information, using the secret key 421 of the user SSD 31, thereby acquiring first registration account information. Then, the encryption/decryption module 112B sends the first registration account information to the account processing module 112E ((4) in FIG. 7).

The account processing module 112E verifies the validation of the input account information, using the first registration account information. When the input account information matches the first registration account information, the account processing module 112E determines that the validation of the input account information is confirmed. When the input account information is different from the first registration account information, the account processing module 112E determines that the validation of the input account information is not confirmed.

A case where the account information includes a login ID and a login password will be described more specifically. The login ID included in the input account information is referred to as an input login ID. The login password included in the input account information is referred to as an input login password. The login ID included in the first registration account information is referred to as a first registration login ID. The login password included in the first registration account information is referred to as a first registration login password.

When the input login ID matches the first registration login ID, and the input login password matches the first registration login password, the account processing module 112E determines that the validation of the input account information is confirmed. Further, when the input login ID is different from the first registration login ID, or when the input login password is different from the first registration login password, the account processing module 112E determines that the validation of the input account information is not confirmed.

When the validation of the input account information is not confirmed, the account processing module 112E notifies the client 2 of failure of the authentication of the first account for accessing the user SSD 31 via the host I/F 111.

When the validation of the input account information is confirmed, the account processing module 112E notifies the command processing module 112F that the access to the user SSD 31 with the first account that corresponds to the input account information is permitted ((5) in FIG. 7).

This notification enables the command processing module 112F to receive an access command to the user SSD 31 with the first account. The access command is, for example, a read command or a write command. The access command may be another command that requests access to the NAND flash memory 13, such as an unmap command, a format command, or a verify command.

Note that, for example, at least a partial storage area of the user area 132 of the NAND flash memory 13 is associated with the first account. Permitting access to the user SSD 31 with an account means permitting access to the at least partial storage area of the user area 132 associated with the account.

More specifically, the account processing module 112E sets a DEK that is associated with the first account with which access has been permitted, in the encryption circuit 116 by using the DEK information 43. The set DEK is used for encryption of data to be written into the user area 132 and decryption of data read from the user area 132.

Further, when the validation of the input account information is confirmed, the account processing module 112E receives a request for newly issuing an account for accessing the first SSD 32-1 from the client 2 ((6) in FIG. 7).

The account processing module 112E generates data (hereinafter, referred to as first data) including the identification information of the user SSD 31 and an account new issuance request command in accordance with the received request. The account processing module 112E sends the first data to the signature generation/verification module 112C ((7) in FIG. 7).

The signature generation/verification module 112C generates signature data for the first data (hereinafter, referred to as first signature data). The first signature data is data for guaranteeing the authenticity of the first data. The signature generation/verification module 112C transmits the first signature data to the account processing module 112E ((8) in FIG. 7).

Here, an operation example in which the signature generation/verification module 112C generates signature data will be described. Data as a target for which signature data needs to be generated is referred to as target data.

First, the signature generation/verification module 112C calculates a hash value of the target data using a specific hash function. The specific hash function is, for example, a hash function defined in advance in the information processing system 1. The signature generation/verification module 112C encrypts the calculated hash value with the secret key 421 of the user SSD 31. The encrypted hash value is used as signature data for the target data.

With such an operation, the signature generation/verification module 112C generates the first signature data for the first data.

The account processing module 112E transmits the first data and the first signature data to the first SSD 32-1 via the network I/F 115 ((9) in FIG. 7).

In the first SSD 32-1, the signature generation/verification module 152C receives the first data and the first signature data that are transmitted from the user SSD 31, via the network I/F 155. The signature generation/verification module 152C verifies the authenticity of the first data, using the first signature data.

Here, an operation example in which the signature generation/verification module 152C verifies the authenticity of data will be described. Data whose authenticity needs to be verified using signature data is referred to as target data.

First, the signature generation/verification module 152C calculates a hash value of the target data (hereinafter, referred to as a first hash value) using a specific hash function. The signature generation/verification module 152C decrypts the signature data with the public key of an SSD that has generated the signature data, thereby acquiring a hash value (hereinafter, referred to as second hash value). When the first hash value matches the second hash value, the signature generation/verification module 152C determines that the authenticity of the target data is confirmed. When the first hash value is different from the second hash value, the signature generation/verification module 152C determines that the authenticity of the target data is not confirmed.

With such an operation, the signature generation/verification module 152C verifies the authenticity of the first data, using the first signature data.

Note that the signature generation/verification module 152C may generate signature data for target data by using the secret key 461 of the first SSD 32-1 similarly to the operation performed by the signature generation/verification module 112C of the user SSD 31 described above. Further, the signature generation/verification module 112C may verify the authenticity of target data by using signature data similarly to the operation performed by the signature generation/verification module 152C.

When the authenticity of the first data is not confirmed, the signature generation/verification module 152C notifies the user SSD 31 of an error via the network I/F 155, for example.

When the authenticity of the first data is confirmed, the signature generation/verification module 152C sends the first data to the account processing module 152E ((10) in FIG. 7).

The account processing module 152E acquires the identification information of the user SSD 31 and the account new issuance request command from the first data. The account processing module 152E works with the random number generation module 152D, the encryption/decryption module 152B, and the signature generation/verification module 152C to newly issue an account (hereinafter, referred to as a second account) for accessing the first SSD 32-1 to the user SSD 31 on the basis of the acquired account new issuance request command.

Specifically, the account processing module 152E requests the random number generation module 152D to generate a random number ((11) in FIG. 7). The random number is used for the account information of the second account. More specifically, the account processing module 152E requests the random number generation module 152D to generate a random number to be used as a login password of the second account. The account processing module 152E may further request the random number generation module 152D to generate a random number to be used as a login ID of the second account.

Alternatively, the account processing module 152E may generate a character string based on a specific naming convention as the login ID. Hereinafter, it is assumed that the account processing module 152E requests the random number generation module 152D to generate a random number to be used as the login ID and generate a random number to be used as the login password.

The random number generation module 152D generates a random number to be used as the login ID and a random number to be used as the login password in accordance with the request from the account processing module 152E. The random number generation module 152D sends the generated two random numbers to the account processing module 152E ((12) in FIG. 7).

The account processing module 152E generates the account information of the second account using the generated two random numbers. The generated account information is referred to as new account information. The new account information includes the random number as the login ID and the random number as the login password. The account processing module 152E sends the new account information to the encryption/decryption module 152B ((13) in FIG. 7).

The encryption/decryption module 152B encrypts the new account information with the public key 462 of the first SSD 32-1. That is, the encryption/decryption module 152B encrypts the login ID and the login password included in the new account information, using the public key 462 of the first SSD 32-1. The encryption/decryption module 152B sends the encrypted new account information to the account processing module 152E ((14) in FIG. 7).

The account processing module 152E registers the new account information that is encrypted with the public key 462 of the first SSD 32-1, in the account management table 45 ((15) in FIG. 7). The encrypted new account information includes the encrypted login ID and the encrypted login password.

More specifically, the account processing module 152E identifies an entry in which the identification information of the user SSD 31 is set in the SSD identification information field in the account management table 45 by using the identification information of the user SSD 31 that is acquired from the first data. The account processing module 152E sets the encrypted login ID in the login ID field of the identified entry. Further, the account processing module 152E sets the encrypted login password in the login password field of the identified entry.

FIG. 8 illustrates examples of the account management table 45 before and after encrypted new account information is registered by the account processing module 152E. More specifically, FIG. 8(A) illustrates an example of the account management table 45 before the encrypted new account information is registered. FIG. 8(B) illustrates an example of the account management table 45 after the encrypted new account information is registered.

As illustrated in FIG. 8(A), the account management table 45 includes an entry 451 that corresponds to an account associated with the user SSD 31. In the entry 451, the identification information of the user SSD 31 ("User's SSD-1" in FIG. 8(A)) is set in the SSD identification information field. The public key 422 of the user SSD 31 ("111111111 . . ." in FIG. 8(A)) is set in the public key field.

For example, the account processing module 152E receives the identification information and public key 422 of the user SSD 31 from the user SSD 31 before performing an operation of newly issuing an account to the user SSD 31. The identification information and public key 422 of the user SSD 31 are transferred from the user SSD 31 to the first SSD 32-1 with, for example, encrypted communication using Secure Socket Layer (SSL)/Transport Layer Security (TLS).

The account processing module 152E generates the entry 451 using the received identification information and public key 422 of the user SSD 31. The account processing module 152E adds the generated entry 451 to the account management table 45.

As a result, as illustrated in FIG. 8(A), the entry 451, in which values are set in the SSD identification information field and the public key field, and values are not set in the login ID field and the login password field, is added to the account management table 45.

The account processing module 152E registers the encrypted new account information in the entry 451.

The account management table 45 of FIG. 8(B) illustrates the entry 451 after the encrypted new account information is registered. In the entry 451, the encrypted login ID ("ssd-a-user-25" in FIG. 8(B)) is set in the login ID field. The encrypted login password ("ssd-a-user-25-password" in FIG. 8(B)) is set in the login password field.

The description will continue by returning to FIG. 7. The account processing module 152E generates data that includes the identification information of the first SSD 32-1 and a notification (new issuance completion notification) indicating that new issuance of an account is completed. The data that includes the identification information of the first SSD 32-1 and the new issuance completion notification is referred to as second data.

The encryption/decryption module 152B encrypts the new account information with the public key 422 of the user SSD 31. The new account information encrypted with the public key 422 of the user SSD 31 is referred to as third data. The encryption/decryption module 152B sends the third data to the account processing module 152E ((16) in FIG. 7).

The account processing module 152E sends the second data and the third data to the signature generation/verification module 152C ((17) in FIG. 7).

The signature generation/verification module 152C generates signature data (hereinafter, referred to as second signature data) for the second data and the third data. The signature generation/verification module 152C transmits the generated second signature data to the account processing module 152E ((18) in FIG. 7).

The account processing module 152E transmits the second data, the third data, and the second signature data to the user SSD 31 via the network I/F 155 ((19) in FIG. 7).

In the user SSD 31, the signature generation/verification module 112C receives the second data, the third data, and the second signature data transmitted from the first SSD 32-1, via the network I/F 115. The signature generation/verification module 112C verifies the authenticity of the second data and the third data, using the second signature data.

When the authenticity of the second data and the third data is not confirmed, the signature generation/verification module 112C notifies the client 2 of an error via the host I/F 111, for example. Alternatively, the signature generation/verification module 112C may request the first SSD 32-1 to retransmit the data via the network I/F 115.

When the authenticity of the second data and the third data is confirmed, the signature generation/verification module 112C sends the second data and the third data to the account processing module 112E ((20) in FIG. 7).

The account processing module 112E acquires the identification information of the first SSD 32-1 and the new issuance completion notification from the second data. The account processing module 112E sends the third data to the encryption/decryption module 112B on the basis of the acquired new issuance completion notification ((21) in FIG. 7). The third data includes the new account information encrypted with the public key 422 of the user SSD 31.

The encryption/decryption module 112B decrypts the third data with the secret key 421 of the user SSD 31, thereby acquiring the new account information. The encryption/decryption module 112B encrypts the new account information with the public key 462 of the first SSD 32-1. That is, the encryption/decryption module 112B encrypts the login ID and the login password included in the new account information, using the public key 462 of the first SSD 32-1. Note that the encryption/decryption module 112B may encrypt the new account information with the public key 422 of the user SSD 31. The encryption/decryption module 112B sends the encrypted new account information to the account processing module 112E ((22) in FIG. 7).

The account processing module 112E registers the encrypted new account information in the account management table 41 ((23) in FIG. 7). Specifically, the account processing module 112E identifies an entry in which the identification information of the first SSD 32-1 is set in the SSD identification information field in the account management table 41 by using the identification information of the first SSD 32-1 that is acquired from the second data. The account processing module 112E sets the encrypted login ID in the login ID field of the identified entry. Further, the account processing module 112E sets the encrypted login password in the login password field of the identified entry.

FIG. 9 illustrates examples of the account management table 41 before and after encrypted new account information is registered by the account processing module 112E. More specifically, FIG. 9(A) illustrates an example of the account management table 41 before the encrypted new account information is registered. FIG. 9(B) illustrates an example of the account management table 41 after the encrypted new account information is registered.

As illustrated in FIG. 9(A), the account management table 41 includes an entry 411 that corresponds to an account associated with the first SSD 32-1. In the entry 411, the identification information of the first SSD 32-1 ("SSD-A" in FIG. 9(A)) is set in the SSD identification information field. The public key 462 of the first SSD 32-1 ("AAAAAAAAA . . . " in FIG. 9(A)) is set in the public key field.

For example, the account processing module 112E receives the identification information and public key 462 of the first SSD 32-1 from the first SSD 32-1 before performing an operation of requesting the first SSD 32-1 to newly issue an account. The identification information and public key 462 of the first SSD 32-1 are transmitted from the first SSD 32-1 to the user SSD 31 with encrypted communication using SSL/TLS, for example.

The account processing module 112E generates the entry 411 using the received identification information and public key 462 of the first SSD 32-1. The account processing module 112E adds the generated entry 411 to the account management table 41.

As a result, as illustrated in FIG. 9(A), the entry 411, in which values are set in the SSD identification information field and the public key field, and values are not set in the login ID field and the login password field, is added to the account management table 41.

The account processing module 112E registers the encrypted new account information in the entry 411.

The account management table 41 of FIG. 9(B) illustrates the entry 411 after the encrypted new account information is registered. In the entry 411, an encrypted login ID ("ssd-a-user-25" in FIG. 9(B)) is set in the login ID field. An encrypted login password ("ssd-a-user-25-password" in FIG. 9(B)) is set in the login password field.

Note that the account processing module 112E may register the new account information that is encrypted with the public key 422 of the user SSD 31, in the account management table 41.

Through the account issuance operation as described above, the first SSD 32-1 can register the new account information for accessing the first SSD 32-1 in the account management table 45. Then, the user SSD 31 can register the new account information in the account management table 41.

More specifically, when the first account for accessing the user SSD 31 from the client 2 is successfully authenticated, the user SSD 31 transmits the first data and the first signature data to the first SSD 32-1. The first data includes the account new issuance request command.

When the authenticity of the first data is confirmed using the first signature data, the first SSD 32-1 registers the encrypted new account information in the account management table 45. Then, the first SSD 32-1 transmits the second data, the third data, and the second signature data to the user SSD 31. The second data includes the notification indicating that the new issuance of the account is completed. The third data includes the encrypted new account information.

When the authenticity of the second data and the third data is confirmed using the second signature data, the user SSD 31 registers the encrypted new account information in the account management table 41.

As a result, the user SSD 31 can request the first SSD 32-1 to authenticate the second account for accessing the first SSD 32-1 by using the encrypted new account information registered in the account management table 41. Further, the first SSD 32-1 can perform authentication of the second account for accessing the first SSD 32-1 by using the encrypted new account information registered in the account management table 45.

As described above, the new account information transmitted from the first SSD 32-1 to the user SSD 31 is encrypted. Further, the account information stored in each of the account management tables 41 and 45 is also encrypted. As a result, it is possible to prevent leakage of the account information in plain text.

(Account Change Operation)

With reference to FIGS. 10 to 12, an example of the account change operation in the information processing system 1 will be described. Here, as an example, a case where an account for accessing the first SSD 32-1, which is associated with the user SSD 31, is changed will be described.

FIG. 10 illustrates the example of the account change operation in the information processing system 1. Operations from (1) to (4) in FIG. 10 are similar to the operations from (1) to (4) in FIG. 7. That is, the account processing module 112E and the encryption/decryption module 112B of the user SSD 31 verify the validation of the account information input on the client 2 (input account information), using the account management table 41. Note that, for example, the user performs an operation of requesting a change of the second account for accessing the first SSD 32-1 together with an operation of inputting the account information. The client 2 may transmit, to the user SSD 31, the request for changing the second account for accessing the first SSD 32-1 together with the input account information.

When the validation of the input account information is not confirmed, the account processing module 112E notifies the client 2 of failure of authentication of the first account for accessing the user SSD 31 via the host I/F 111.

When the validation of the input account information is confirmed, the account processing module 112E notifies the command processing module 112F that the access to the user SSD 31 with the first account that corresponds to the input account information is permitted ((5) in FIG. 10). This notification enables the command processing module 112F to receive an access command to the user SSD 31 with the first account.

Further, when the validation of the input account information is confirmed, the account processing module 112E receives, from the client 2, the request for changing the second account for accessing the first SSD 32-1 ((6) in FIG. 10). The account processing module 112E generates data that includes the identification information of the user SSD 31 and an account change request command (hereinafter, referred to as fourth data) in accordance with the received request.

Then, the account processing module 112E acquires the encrypted account information of the second account from the account management table 41 ((7) in FIG. 10). The encrypted account information of the second account is referred to as fifth data.

More specifically, the account processing module 112E identifies an entry in which the identification information of the first SSD 32-1 is set in the SSD identification information field in the account management table 41. The account processing module 112E acquires an encrypted login ID from the login ID field of the identified entry. The account processing module 112E acquires an encrypted login password from the login password field of the identified entry. These login ID and login password are also referred to as account information before the change.

Next, the account processing module 112E requests the random number generation module 112D to generate a random number ((8) in FIG. 10). The random number is used for changed account information of the second account. More specifically, the account processing module 112E requests the random number generation module 112D to generate a random number to be used as a changed login password. The account processing module 112E may further request the random number generation module 112D to generate a random number to be used as a changed login ID. Alternatively, the account processing module 112E may generate a character string based on a specific naming convention as the login ID. The account information (the login ID and login password) before the change is information that was generated by the first SSD 32-1, and is not information determined by the user. Therefore, here, it is assumed a case where the user desires to change the account information before the change, which was generated by the first SSD 32-1, to account information (login ID and login password) determined by the user SSD 31. Hereinafter, it is assumed that the account processing module 112E requests the random number generation module 112D to generate a random number to be used as the changed login ID and generate a random number to be used as the changed login password.

The random number generation module 112D generates a random number to be used as the changed login ID and a random number to be used as the changed login password in accordance with the request from the account processing module 112E. The random number generation module 112D sends the generated two random numbers to the account processing module 112E ((9) in FIG. 10).

The account processing module 112E generates the changed account information using the generated two random numbers. The changed account information includes the random number as the changed login ID and the random number as the changed login password. The account processing module 112E sends the changed account information to the encryption/decryption module 112B ((10) in FIG. 10).

The encryption/decryption module 112B encrypts the changed account information with the public key 462 of the first SSD 32-1. That is, the encryption/decryption module 112B encrypts the changed login ID and the changed login password, using the public key 462 of the first SSD 32-1. The encrypted changed account information is referred to as sixth data. The encryption/decryption module 112B sends the sixth data to the account processing module 112E ((11) in FIG. 10).

The account processing module 112E sends the fourth data, the fifth data, and the sixth data to the signature generation/verification module 112C ((12) in FIG. 10).

The signature generation/verification module 112C generates signature data for the fourth data, the fifth data, and the sixth data (hereinafter, referred to as third signature data) by using the secret key 421 of the user SSD 31. The signature generation/verification module 112C transmits the generated third signature data to the account processing module 112E ((13) in FIG. 10).

The account processing module 112E transmits the fourth data, the fifth data, the sixth data, and the third signature data to the first SSD 32-1 via the network I/F 115 ((14) in FIG. 10).

In the first SSD 32-1, the signature generation/verification module 152C receives the fourth data, the fifth data, the sixth data, and the third signature data that are transmitted from the user SSD 31, via the network I/F 155. The signature generation/verification module 152C verifies the authenticity of the fourth data, the fifth data, and the sixth data, using the third signature data.

When the authenticity of the fourth data, the fifth data, and the sixth data is not confirmed, the signature generation/verification module 152C notifies the user SSD 31 of an error via the network I/F 155, for example. Alternatively, the signature generation/verification module 152C may request the user SSD 31 to retransmit the data.

When the authenticity of the fourth data, the fifth data, and the sixth data is confirmed, the signature generation/verification module 152C sends the fourth data, the fifth data, and the sixth data to the account processing module 152E ((15) in FIG. 10).

The account processing module 152E acquires the identification information of the user SSD 31 and the account change request command from the fourth data. The account processing module 152E sends the fifth data to the encryption/decryption module 152B in accordance with the acquired account change request command ((16) in FIG. 10). The fifth data includes the account information before the change encrypted with the public key 462 of the first SSD 32-1.

The encryption/decryption module 152B decrypts the fifth data with the secret key 461 of the first SSD 32-1, thereby acquiring the account information before the change. The encryption/decryption module 152B sends the account information before the change to the account processing module 152E ((17) in FIG. 10).

The account processing module 152E verifies the validation of the account information before the change, using the account management table 45.

More specifically, the account processing module 152E identifies an entry in which the identification information of the user SSD 31 is set in the SSD identification information field in the account management table 45. The identified entry is an entry that corresponds to the second account for accessing the first SSD 32-1, which is associated with the user SSD 31.

The account processing module 152E acquires the account information encrypted with the public key 462 of the first SSD 32-1 from the identified entry ((18) in FIG. 10). The acquired encrypted account information is referred to as encrypted second registration account information. The encrypted second registration account information includes, for example, an encrypted login ID and an encrypted login password.

The account processing module 152E sends the encrypted second registration account information to the encryption/decryption module 152B ((19) in FIG. 10).

The encryption/decryption module 152B decrypts the encrypted second registration account information with the secret key 461 of the first SSD 32-1, thereby acquiring second registration account information. Then, the encryption/decryption module 152B sends the second registration account information to the account processing module 152E ((20) in FIG. 10).

The account processing module 152E verifies the validation of the account information before the change, using the second registration account information. When the account information before the change matches the second registration account information, the account processing module 152E determines that the validation of the account information before the change is confirmed. When the account information before the change is different from the second registration account information, the account processing module 152E determines that the validation of the account information before the change is not confirmed.

A case where the account information includes a login ID and a login password will be described more specifically. The login ID included in the account information before the change is referred to as a login ID before the change. The login password included in the account information before the change is referred to as a login password before the change. The login ID included in the second registration account information is referred to as a second registration login ID. The login password included in the second registration account information is referred to as a second registration login password.

When the login ID before the change matches the second registration login ID, and the login password before the change matches the second registration login password, the account processing module 152E determines that the validation of the account information before the change is confirmed. Further, when the login ID before the change is different from the second registration login ID, or when the login password before the change is different from the second registration login password, the account processing module 152E determines that the validation of the account information before the change is not confirmed.

When the validation of the account information before the change is not confirmed, the account processing module 152E notifies the user SSD 31 of failure of the authentication of the second account that is associated with the user SSD 31 via the network I/F 155.

When the validation of the account information before the change is confirmed, the account processing module 152E registers the sixth data in the account management table 45 ((21) in FIG. 10). That is, the account processing module 152E replaces the account information before the change registered in the account management table 45 with the changed account information. The sixth data includes the changed login ID and login password encrypted with the public key 462 of the first SSD 32-1.

Specifically, the account processing module 152E identifies an entry in which the identification information of the user SSD 31 is set in the SSD identification information field in the account management table 45 by using the identification information of the user SSD 31 acquired from the fourth data.

In the identified entry, the account processing module 152E replaces the encrypted login ID before the change in the login ID field with the encrypted changed login ID in the sixth data. In the identified entry, the account processing module 152E replaces the encrypted login password before the change in the login password field with the encrypted changed login password in the sixth data.

FIG. 11 illustrates examples of the account management table 45 before and after the encrypted changed account information is registered by the account processing module 152E. More specifically, FIG. 11(A) illustrates an example of the account management table 45 before the encrypted changed account information is registered. FIG. 11(B) illustrates an example of the account management table 45 after the encrypted changed account information is registered.

As illustrated in FIG. 11(A), the account management table 45 includes the entry 451 that corresponds to the account for accessing the first SSD 32-1, which is associated with the user SSD 31. In the entry 451, the identification information of the user SSD 31 ("User's SSD-1" in FIG. 11(A)) is set in the SSD identification information field. The encrypted login ID ("ssd-a-user-25" in FIG. 11(A)) is set in the login ID field. The encrypted login password ("ssd-a-user-25-password" in FIG. 11(A)) is set in the login password field. The public key 422 ("111111111 . . . " in FIG. 11(A)) of the user SSD 31 is set in the public key field.

As described above, as illustrated in FIG. 11(A), the encrypted login ID and login password before the change are registered in the entry 451 of the account management table 45.

The account processing module 152E registers the encrypted changed account information in the entry 451.

The account management table 45 of FIG. 11(B) illustrates the entry 451 after the encrypted changed account information is registered. In the entry 451, the encrypted changed login ID ("ssd-a-user-25-2" in FIG. 11(B)) is set in the login ID field. The encrypted changed login password ("ssd-a-user-25-password-2" in FIG. 11(B)) is set in the login password field.

The description will continue by returning to FIG. 10. After the encrypted changed account information is registered in the account management table 45, the account processing module 152E generates data that includes the identification information of the first SSD 32-1 and a notification (change completion notification) indicating that the change of an account is completed. The data that includes the identification information of the first SSD 32-1 and the change completion notification is referred to as seventh data. Further, the account processing module 152E sends the sixth data to the encryption/decryption module 152B ((22) in FIG. 10).

The encryption/decryption module 152B decrypts the sixth data with the secret key 461 of the first SSD 32-1, thereby acquiring the changed account information. That is, the encryption/decryption module 152B decrypts the changed account information that is encrypted with the public key 462 of the first SSD 32-1, using the secret key 461 of the first SSD 32-1, thereby acquiring the changed account information. The encryption/decryption module 152B encrypts the changed account information with the public key 422 of the user SSD 31. The changed account information encrypted with the public key 422 of the user SSD 31 is also referred to as eighth data. The encryption/decryption module 152B sends the eighth data to the account processing module 152E ((23) in FIG. 10).

The account processing module 152E sends the seventh data and the eighth data to the signature generation/verification module 152C ((24) in FIG. 10).

The signature generation/verification module 152C generates signature data (hereinafter, referred to as fourth signature data) for the seventh data and the eighth data. The signature generation/verification module 152C transmits the generated fourth signature data to the account processing module 152E ((25) in FIG. 10).

The account processing module 152E transmits the seventh data, the eighth data, and the fourth signature data to the user SSD 31 via the network I/F 155 ((26) in FIG. 10).

In the user SSD 31, the signature generation/verification module 112C receives the seventh data, the eighth data, and the fourth signature data transmitted from the first SSD 32-1 via the network I/F 115. The signature generation/verification module 112C verifies the authenticity of the seventh data and the eighth data, using the fourth signature data.

When the authenticity of the seventh data and the eighth data is not confirmed, the signature generation/verification module 112C notifies the client 2 of an error via the host I/F 111, for example. Alternatively, the signature generation/verification module 112C may request the first SSD 32-1 to retransmit the data via the network I/F 115.

When the authenticity of the seventh data and the eighth data is confirmed, the signature generation/verification module 112C sends the seventh data and the eighth data to the account processing module 112E ((27) in FIG. 10).

The account processing module 112E acquires the identification information of the first SSD 32-1 and the change completion notification from the seventh data. The account processing module 112E sends the eighth data to the encryption/decryption module 112B in accordance with the acquired change completion notification ((28) in FIG. 10). The eighth data includes the changed account information encrypted with the public key 422 of the user SSD 31.

The encryption/decryption module 112B decrypts the eighth data with the secret key 421 of the user SSD 31, thereby acquiring the changed account information. The encryption/decryption module 112B encrypts the changed account information with the public key 462 of the first SSD 32-1. That is, the encryption/decryption module 112B encrypts the login ID and the login password included in the changed account information. Note that the encryption/decryption module 112B may encrypt the changed account information with the public key 422 of the user SSD 31. Then, the encryption/decryption module 112B sends the encrypted changed account information to the account processing module 112E ((29) in FIG. 10).

The account processing module 112E registers the encrypted changed account information in the account management table 41 ((30) in FIG. 10). That is, the account processing module 112E replaces the account information before the change registered in the account management table 41 with the encrypted changed account information.

More specifically, the account processing module 112E identifies an entry in which the identification information of the first SSD 32-1 is set in the SSD identification information field in the account management table 41 by using the identification information of the first SSD 32-1 acquired from the seventh data.

In the identified entry, the account processing module 112E replaces the encrypted login ID before the change set in the login ID field with the encrypted changed login ID. In the identified entry, the account processing module 112E replaces the encrypted login password before the change set in the login password field with the encrypted changed login password.

FIG. 12 illustrates examples of the account management table 41 before and after the encrypted changed account information is registered by the account processing module 112E. More specifically, FIG. 12(A) illustrates an example of the account management table 41 before the encrypted changed account information is registered. FIG. 12(B) illustrates an example of the account management table 41 after the encrypted changed account information is registered.

As illustrated in FIG. 12(A), the account management table 41 includes the entry 411 corresponding to the account for accessing the first SSD 32-1. In the entry 411, the identification information of the first SSD 32-1 ("SSD-A" in FIG. 12(A)) is set in the SSD identification information field. The encrypted login ID ("ssd-a-user-25" in FIG. 12(A)) is set in the login ID field. The encrypted login password ("ssd-a-user-25-password" in FIG. 12(A)) is set in the login password field. The public key 462 of the first SSD 32-1 ("AAAAAAAAA . . . " in FIG. 12(A)) is set in the public key field.

As described above, as illustrated in FIG. 12(A), the encrypted login ID and login password before the change are registered in the entry 411 of the account management table 41.

The account processing module 112E registers the encrypted changed account information in the entry 411.

The account management table 45 of FIG. 12(B) illustrates the entry 411 after the encrypted changed account information is registered. In the entry 411, the encrypted changed login ID ("ssd-a-user-25-2" in FIG. 12(B)) is set in the login ID field. The encrypted changed login password ("ssd-a-user-25-password-2" in FIG. 12(B)) is set in the login password field.

Note that the account processing module 112E may register the changed account information that is encrypted with the public key 422 of the user SSD 31, in the account management table 41.

Through the account change operation as described above, the user SSD 31 and the first SSD 32-1 can change the account information for accessing the first SSD 32-1.

More specifically, when the first account for accessing the user SSD 31 from the client 2 is successfully authenticated, the user SSD 31 transmits the fourth data, the fifth data, the sixth data, and the third signature data to the first SSD 32-1. The fourth data includes the account change request command. The fifth data includes the encrypted account information before the change. The sixth data includes the encrypted changed account information.

When the authenticity of the fourth data, the fifth data, and the sixth data is confirmed using the third signature data and the second account for accessing the first SSD 32-1 is successfully authenticated using the account information before the change, the first SSD 32-1 registers the encrypted changed account information in the account management table 45. Then, the first SSD 32-1 transmits the seventh data, the eighth data, and the fourth signature data to the user SSD 31. The seventh data includes the notification indicating that the change of the account is completed. The eighth data includes the encrypted changed account information.

When the authenticity of the seventh data and the eighth data is confirmed using the fourth signature data, the user SSD 31 registers the encrypted changed account information in the account management table 41.

As a result, the user SSD 31 can request the first SSD 32-1 to authenticate the second account for accessing the first SSD 32-1 by using the encrypted changed account information registered in the account management table 41. Further, the first SSD 32-1 can perform authentication of the second account for accessing the first SSD 32-1 by using the encrypted changed account information registered in the account management table 45.

As described above, the account information before the change and the changed account information that are transmitted from the user SSD 31 to the first SSD 32-1 are encrypted, and the changed account information that is transmitted from the first SSD 32-1 to the user SSD 31 is encrypted. Further, the account information stored in each of the account management tables 41 and 45 is also encrypted. As a result, it is possible to prevent leakage of the account information in plain text.

(Access Application Operation)

Figure 13:
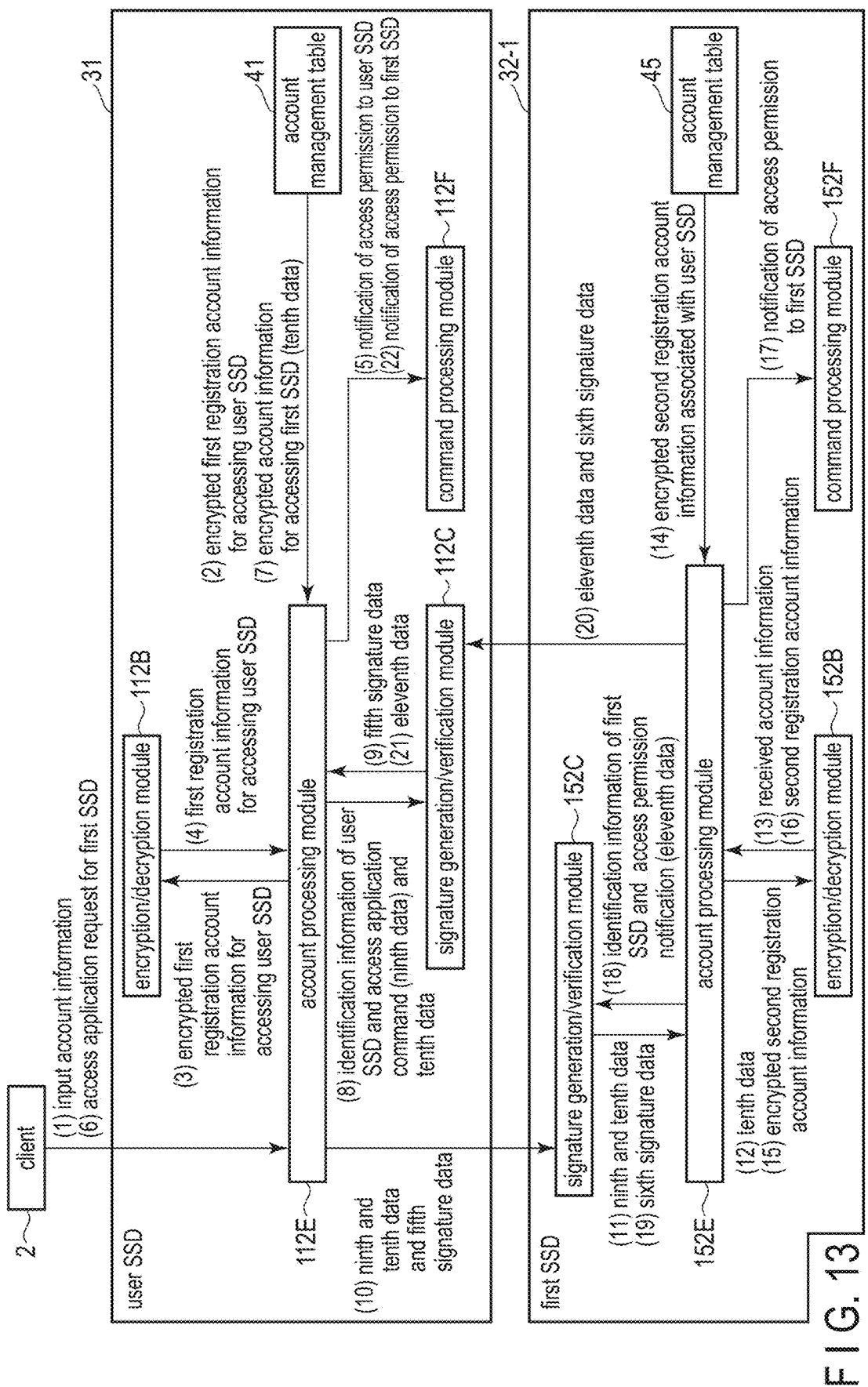
FIG. 13 is a view illustrating an example of an access application operation in the information processing system according to the embodiment.

FIG. 13 illustrates an example of the access application operation in the information processing system 1. The account management table 41 of the user SSD 31 includes account information used for authentication of the first account for accessing the user SSD 31. The account management table 41 of the user SSD 31 also includes the account information used for authentication of the second account for accessing the first SSD 32-1. The account information used for authentication of the second account is registered in the account management table 41 by the above-described account issuance operation or the account change operation.

The account management table 45 of the first SSD 32-1 includes the account information used for authentication of the second account for accessing the first SSD 32-1. The account information used for authentication of the second account is registered in the account management table 45 by the above-described account issuance operation or the account change operation.

Operations from (1) to (4) in FIG. 13 are similar to the operations from (1) to (4) in FIG. 7. That is, the account processing module 112E and the encryption/decryption module 112B of the user SSD 31 verify the validation of the account information input on the client 2 (input account information), using the account management table 41. Note that, for example, the user performs an operation of requesting an access application for the first SSD 32-1 together with an operation of inputting the account information. The client 2 may transmit, to the user SSD 31, an access application request for the first SSD 32-1 together with the input account information.

When the validation of the input account information is not confirmed, the account processing module 112E notifies the client 2 of failure of authentication of the first account for accessing the user SSD 31 via the host I/F 111.

When the validation of the input account information is confirmed, the account processing module 112E notifies the command processing module 112F that the access to the user SSD 31 with the first account that corresponds to the input account information is permitted ((5) in FIG. 13). This notification enables the command processing module 112F to receive an access command to the user SSD 31 with the first account.

When the validation of the input account information is confirmed, the account processing module 112E receives the access application request for the first SSD 32-1 from the client 2 ((6) in FIG. 13). The account processing module 112E generates data (hereinafter, referred to as ninth data) that includes the identification information of the user SSD 31 and an access application command in accordance with the received request.

Then, the account processing module 112E acquires the encrypted account information of the second account for accessing the first SSD 32-1 from the account management table 41 ((7) in FIG. 13). The encrypted account information of the second account for accessing the first SSD 32-1 is referred to as tenth data.

More specifically, the account processing module 112E identifies an entry in which the identification information of the first SSD 32-1 is set in the SSD identification information field in the account management table 41. The account processing module 112E acquires an encrypted login ID from the login ID field of the identified entry. The account processing module 112E acquires an encrypted login password from the login password field of the identified entry. These encrypted login ID and encrypted login password constitute the tenth data.

The account processing module 112E sends the ninth data and the tenth data to the signature generation/verification module 112C ((8) in FIG. 13).

The signature generation/verification module 112C generates signature data (hereinafter, referred to as fifth signature data) for the ninth data and the tenth data by using the secret key 421 of the user SSD 31. The signature generation/verification module 112C transmits the generated fifth signature data to the account processing module 112E ((9) in FIG. 13).

The account processing module 112E transmits the ninth data, the tenth data, and the fifth signature data to the first SSD 32-1 via the network I/F 115 ((10) in FIG. 13).

In the first SSD 32-1, the signature generation/verification module 152C receives the ninth data, the tenth data, and the fifth signature data that are transmitted from the user SSD 31, via the network I/F 155. The signature generation/verification module 152C verifies the authenticity of the ninth data and the tenth data, using the fifth signature data.

When the authenticity of the ninth data and the tenth data is not confirmed, the signature generation/verification module 152C notifies the user SSD 31 of an error via the network I/F 155, for example. Alternatively, the signature generation/verification module 152C may request the user SSD 31 to retransmit the data.

In a case where the authenticity of the ninth data and the tenth data is confirmed, the signature generation/verification module 152C sends the ninth data and the tenth data to the account processing module 152E ((11) in FIG. 13).

The account processing module 152E acquires the identification information of the user SSD 31 and the access application command from the ninth data. The account processing module 152E sends the tenth data to the encryption/decryption module 152B in accordance with the acquired access application command ((12) in FIG. 13). The tenth data includes the account information encrypted with the public key 462 of the first SSD 32-1.

The encryption/decryption module 152B decrypts the tenth data with the secret key 461 of the first SSD 32-1, thereby acquiring the account information. The acquired account information is also referred to as received account information. The encryption/decryption module 152B sends the received account information to the account processing module 152E ((13) in FIG. 13).

The account processing module 152E verifies the validation of the received account information, using the account management table 45.

More specifically, the account processing module 152E identifies an entry in which the identification information of the user SSD 31 is set in the SSD identification information field in the account management table 45. The identified entry is an entry that corresponds to the account for accessing the first SSD 32-1, which is associated with the user SSD 31.

The account processing module 152E acquires the account information encrypted with the public key 462 of the first SSD 32-1 (that is, encrypted second registration account information) from the identified entry ((14) in FIG. 13). The account processing module 152E sends the encrypted second registration account information to the encryption/decryption module 152B ((15) in FIG. 13).

The encryption/decryption module 152B decrypts the encrypted second registration account information with the secret key 461 of the first SSD 32-1, thereby acquiring the second registration account information. Then, the encryption/decryption module 152B sends the second registration account information to the account processing module 152E ((16) in FIG. 13).

The account processing module 152E verifies the validation of the received account information by using the second registration account information. When the received account information matches the second registration account information, the account processing module 152E determines that the validation of the received account information is confirmed. When the received account information is different from the second registration account information, the account processing module 152E determines that the validation of the received account information is not confirmed.

A case where the account information includes a login ID and a login password will be described more specifically. A login ID included in the received account information is referred to as a received login ID. A login password included in the received account information is referred to as a received login password. Further, the second registration account information includes a second registration login ID and a second registration login password.

When the received login ID matches the second registration login ID, and the received login password matches the second registration login password, the account processing module 152E determines that the validation of the received account information is confirmed. Further, when the received login ID is different from the second registration login ID, or when the received login password is different from the second registration login password, the account processing module 152E determines that the validation of the received account information is not confirmed.

When the validation of the received account information is not confirmed, the account processing module 152E notifies the user SSD 31 of failure of authentication of the second account for accessing the first SSD 32-1, via the network I/F 155.

When the validation of the received account information is confirmed, the account processing module 152E notifies the command processing module 152F that the access to the first SSD 32-1 with the second account that corresponds to the received account information is permitted ((17) in FIG. 13). This notification enables the command processing module 152F to receive an access command to the first SSD 32-1 with the second account.

For example, at least a partial storage area of the user area 172 of the NAND flash memory 17 is associated with the second account. Permitting access to the first SSD 32-1 using an account means permitting access to the at least partial storage area of the user area 172 associated with the account.

More specifically, when the validation of the received account information is confirmed, the account processing module 152E generates data that includes the identification information of the first SSD 32-1 and a notification (access permission notification) indicating that access to the first SSD 32-1 is permitted. The data that includes the identification information of the first SSD 32-1 and the access permission notification is referred to as eleventh data.

The account processing module 152E sends the eleventh data to the signature generation/verification module 152C ((18) in FIG. 13). Further, the account processing module 152E sets a DEK that is associated with an account with which the access has been permitted, in the encryption circuit 156 by using the DEK information 47. The set DEK is used for encryption of data to be written into the user area 172 and decryption of data read from the user area 172.

The signature generation/verification module 152C generates signature data for the eleventh data (hereinafter, referred to as sixth signature data). The signature generation/verification module 152C transmits the generated sixth signature data to the account processing module 152E ((19) in FIG. 13).

The account processing module 152E transmits the eleventh data and the sixth signature data to the user SSD 31 via the network I/F 155 ((20) in FIG. 13).

In the user SSD 31, the signature generation/verification module 112C receives the eleventh data and the sixth signature data that are transmitted from the first SSD 32-1, via the network I/F 115. The signature generation/verification module 112C verifies the authenticity of the eleventh data by using the sixth signature data.

When the authenticity of the eleventh data is not confirmed, the signature generation/verification module 112C notifies the client 2 of an error via the host I/F 111, for example. Alternatively, the signature generation/verification module 112C may request the first SSD 32-1 to retransmit the data, via the network I/F 115.

When the authenticity of the eleventh data is confirmed, the signature generation/verification module 112C sends the eleventh data to the account processing module 112E ((21) in FIG. 13).

The account processing module 112E acquires the identification information of the first SSD 32-1 and the access permission notification from the eleventh data. The account processing module 112E notifies the command processing module 112F that the access to the first SSD 32-1 is permitted on the basis of the access permission notification ((22) in FIG. 13). As a result, the command processing module 112F can access the first SSD 32-1.

Specifically, the command processing module 112F may transmit, for example, a write command and user data to the first SSD 32-1 via the network I/F 115. The write command is a command for writing the user data into the user area 172 in the NAND flash memory 17 of the first SSD 32-1.

Further, the command processing module 112F may transmit, for example, a read command to the first SSD 32-1 via the network I/F 115. The read command is a command for reading user data from the user area 172.

Through the access application operation as described above, the user SSD 31 and the first SSD 32-1 can control the access to the first SSD 32-1.

More specifically, when the first account for accessing the user SSD 31 is successfully authenticated, the user SSD 31 permits the first account to access at least a partial storage area of the NAND flash memory 13, and transmits the ninth data, the tenth data, and the fifth signature data to the first SSD 32-1. The ninth data includes the access application command. The tenth data includes the encrypted account information.

When the authenticity of the ninth data and the tenth data is confirmed using the fifth signature data, and the second account for accessing the first SSD 32-1 is successfully authenticated using the tenth data, the first SSD 32-1 permits the second account to access at least a partial storage area of the NAND flash memory 17. Then, the first SSD 32-1 transmits the eleventh data and the sixth signature data to the user SSD 31. The eleventh data includes the access permission notification.

When the authenticity of the eleventh data is confirmed using the sixth signature data, the user SSD 31 can access the at least partial storage area of the NAND flash memory 17 with the second account.

As described above, the account information transmitted from the user SSD 31 to the first SSD 32-1 is encrypted. Further, the account information stored in each of the account management tables 41 and 45 is also encrypted. As a result, it is possible to prevent leakage of the account information in plain text.

For example, the user may carry the user SSD 31 and connect the user SSD 31 to any client 2. The user inputs account information to be used for authentication of the first account for accessing the user SSD 31 on the client 2 to which the user SSD 31 is connected, thereby enabling to access not only at least a partial storage area of the NAND flash memory 13 with the first account but also at least a partial storage area of the NAND flash memory 17 with the second account.

That is, the user can easily access the user SSD 31 and the first SSD 32-1 from the client 2 only by managing the account information of the first account. Therefore, it is possible to enable the user to manage the account information easily.

Next, transmission of user data in the information processing system 1 will be described. Here, a case where the user SSD 31 is connected to the client 2 via the host I/F 111 and is connected to the network 7 via the network I/F 115 will be explained. The network SSD 32 is connected to the network 7 via the network I/F 155.

Further, it is assumed that an account for accessing the user SSD 31 is successfully authenticated and access to the user SSD 31 (more specifically, at least a partial storage area of the NAND flash memory 13) is permitted, and then an account for accessing the network SSD 32 is successfully authenticated and access to the network SSD 32 (more specifically, at least a partial storage area of the NAND flash memory 17) is permitted.

(Reading of User Data)

Figure 14:
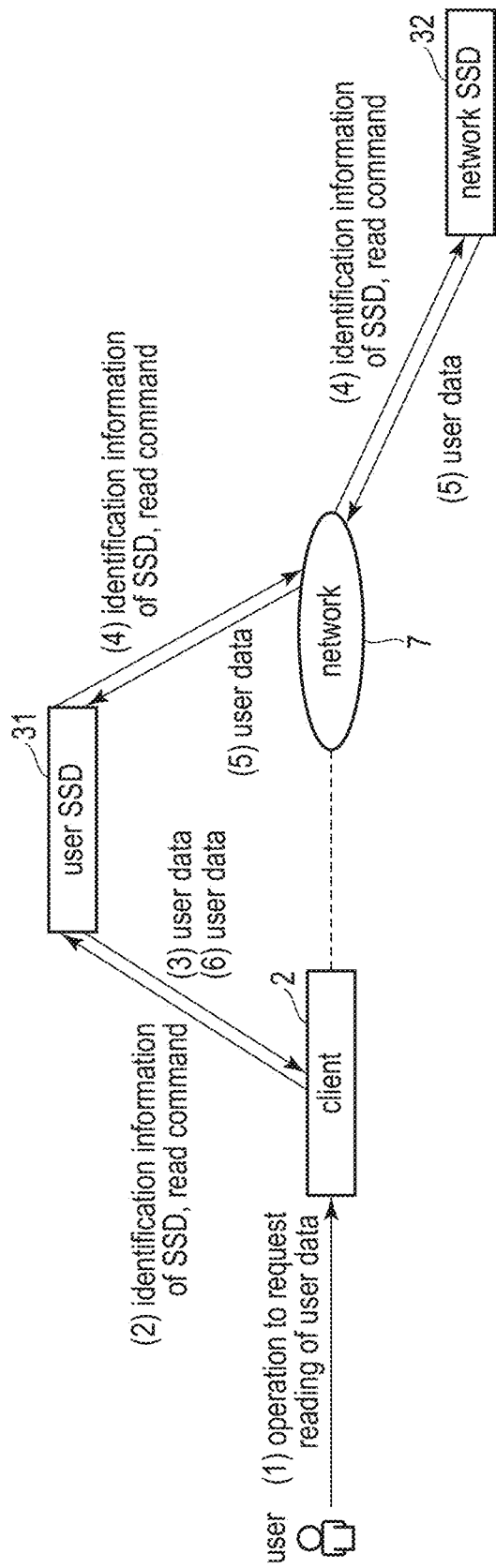
FIG. 14 is a view illustrating an example of a flow of data in a case where user data is read in the information processing system according to the embodiment.

FIG. 14 illustrates an example of a flow of data in a case where user data is read from the user SSD 31 or the network SSD 32 in the information processing system 1.

The user requests reading of user data by an operation using the client 2 ((1) in FIG. 14). In accordance with this request, the client 2 transmits the identification information of an SSD and a read command to the user SSD 31 ((2) in FIG. 14). The identification information of the SSD indicates an SSD in which user data to be read is stored (e.g., the user SSD 31 or the network SSD 32). The read command includes information that is capable of identifying the user data to be read. The information that is capable of identifying the user data to be read is, for example, an LBA.

For example, the client 2 manages a relationship between the SSD in which the user data to be read is stored and the information that is capable of identifying the user data to be read.

The user SSD 31 receives the identification information of the SSD and the read command transmitted from the client 2. When the received identification information of the SSD is identification to the identification information of the user SSD 31, the user SSD 31 reads the user data from the NAND flash memory 13 in accordance with the received read command. Then, the user SSD 31 transmits the read user data to the client 2 ((3) in FIG. 14).

On the other hand, when the received identification information of the SSD is identification to the identification information of the network SSD 32, the user SSD 31 transmits the received identification information of the SSD and the read command to the network SSD 32 through the network 7 ((4) in FIG. 14).

The network SSD 32 receives the identification information of the SSD and the read command transmitted from the user SSD 31. When the received identification information of the SSD is same as the identification information of the network SSD 32, the network SSD 32 reads the user data from the NAND flash memory 17 in accordance with the read command. Then, the network SSD 32 transmits the read user data to the user SSD 31 through the network 7 ((5) in FIG. 14).

The user SSD 31 receives the user data transmitted from the network SSD 32. Then, the user SSD 31 transmits the received user data to the client 2 ((6) in FIG. 14).

In this manner, the client 2 can read user data not only from the NAND flash memory 13 of the user SSD 31 but also from the NAND flash memory 17 of the network SSD 32.

Figure 15:
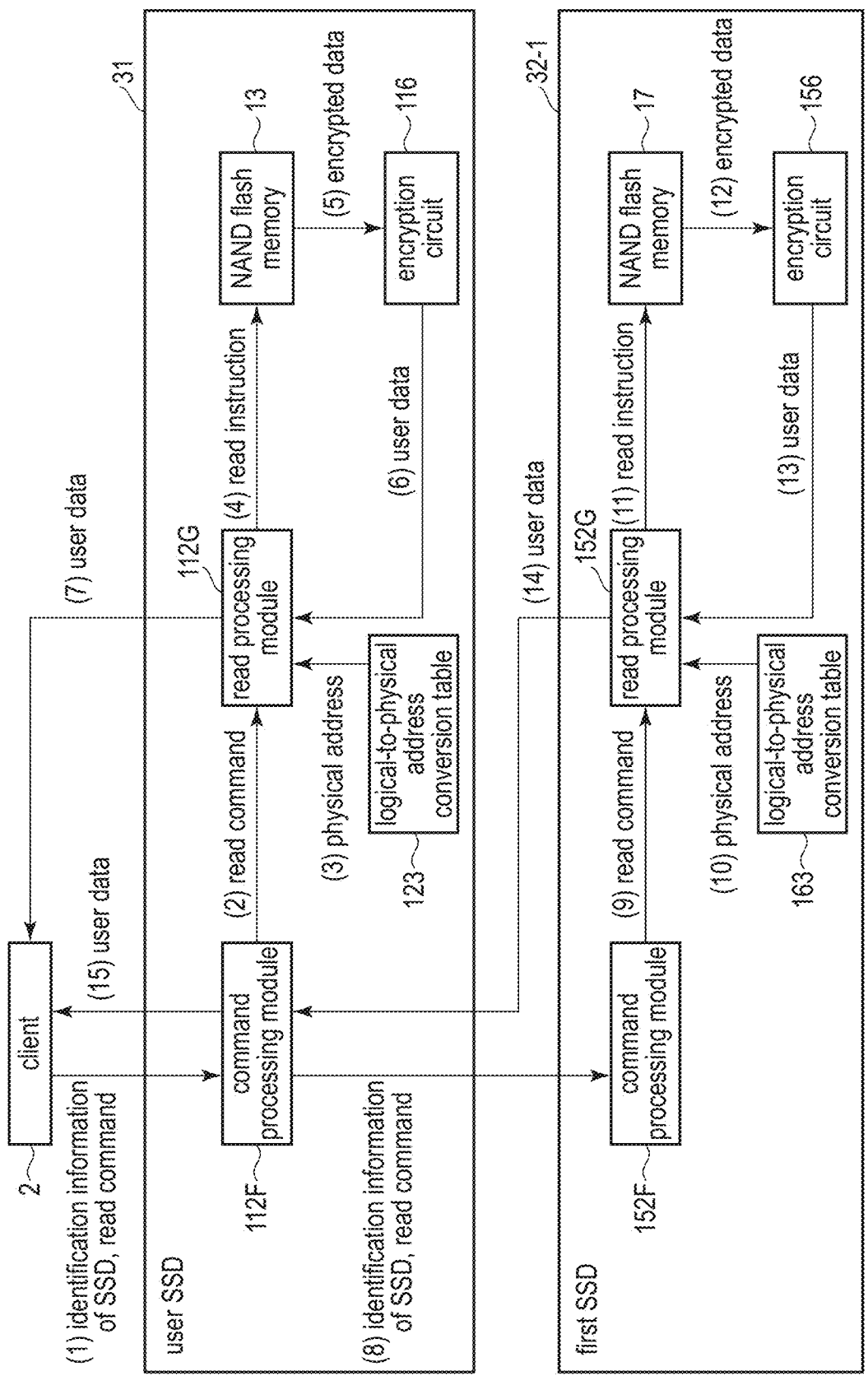
FIG. 15 is a view illustrating an example of a read operation in the information processing system according to the embodiment.

With reference to FIG. 15, an example of a read operation in the information processing system 1 will be specifically described. Here, as an example, a case where the client 2 reads user data from the NAND flash memory 13 of the user SSD 31 and a case where the client 2 reads user data from the NAND flash memory 17 of the first SSD 32-1 will be described.

First, in accordance with an operation performed by the user to request reading of user data, the client 2 transmits the identification information of an SSD and a read command that correspond to the request, to the user SSD 31 ((1) in FIG. 15).

In the user SSD 31, the command processing module 112F receives the identification information of the SSD and the read command transmitted from the client 2. The command processing module 112F determines whether the received identification information of the SSD is same as the identification information of the user SSD 31.

When the received identification information of the SSD is same as the identification information of the user SSD 31, the command processing module 112F sends the received read command to the read processing module 112G ((2) in FIG. 15).

The read processing module 112G identifies a physical address that corresponds to an LBA designated in the read command by using the logical-to-physical address conversion table 123 ((3) in FIG. 15). Then, the read processing module 112G instructs the NAND flash memory 13 to read data from the identified physical address, via the NAND I/F 113 ((4) in FIG. 15). The NAND flash memory 13 reads encrypted data from the identified physical address and sends the read encrypted data to the encryption circuit 116 ((5) in FIG. 15).

The encryption circuit 116 decrypts the encrypted data with a set DEK, thereby obtaining user data. The encryption circuit 116 sends the user data to the read processing module 112G ((6) in FIG. 15). The read processing module 112G transmits the user data to the client 2 via the host I/F 111 ((7) in FIG. 15).

On the other hand, when the received identification information of the SSD is same as the identification information of the first SSD 32-1, the command processing module 112F transmits the received identification information of the SSD and the read command to the first SSD 32-1 via the network I/F 115 ((8) in FIG. 15).

In the first SSD 32-1, the command processing module 152F receives the identification information of the SSD and the read command transmitted from the user SSD 31. The command processing module 152F determines whether the received identification information of the SSD is same as the identification information of the first SSD 32-1.

When the received identification information of the SSD is same as the identification information of the first SSD 32-1, the command processing module 152F sends the received read command to the read processing module 152G ((9) in FIG. 15).

The read processing module 152G identifies a physical address that corresponds to an LBA designated in the read command by using the logical-to-physical address conversion table 163 ((10) in FIG. 15). Then, the read processing module 152G instructs the NAND flash memory 17 to read data from the identified physical address, via the memory I/F 153 ((11) in FIG. 15). The NAND flash memory 17 reads encrypted data from the identified physical address and sends the read encrypted data to the encryption circuit 156 ((12) in FIG. 15).

The encryption circuit 156 decrypts the encrypted data with a set DEK, thereby obtaining user data. The encryption circuit 156 sends the user data to the read processing module 152G ((13) in FIG. 15). The read processing module 152G transmits the user data to the user SSD 31 via the network I/F 155 ((14) in FIG. 15).

In the user SSD 31, the command processing module 112F receives the user data transmitted from the first SSD 32-1. The command processing module 112F transmits the received user data to the client 2 ((15) in FIG. 15).

Through the read operation described as above, the client 2 can read user data not only from the user SSD 31 directly connected to the client 2 but also from the first SSD 32-1 connected to the user SSD 31 through the network 7.

(Writing of User Data)

FIG. 16 illustrates an example of a flow of data in a case where user data is written to the user SSD 31 or the network SSD 32 in the information processing system 1.

The user requests writing of user data by an operation using the client 2 ((1) in FIG. 16). In accordance with this request, the client 2 transmits the identification information of an SSD, a write command, and the user data to the user SSD 31 ((2) in FIG. 16). The identification information of the SSD indicates an SSD (the user SSD 31 or the network SSD 32) into which the user data is to be written. The write command includes, for example, an LBA associated with the user data. The client 2 determines, for example, the SSD and the LBA into which the user data is to be written.

The user SSD 31 receives the identification information of the SSD, the write command, and the user data that are transmitted from the client 2. When the received identification information of the SSD is same as the identification information of the user SSD 31, the user SSD 31 writes the user data into the NAND flash memory 13 in accordance with the write command.

On the other hand, when the received identification information of the SSD is same as the identification information of the network SSD 32, the user SSD 31 transmits the received identification information of the SSD, the write command, and the user data to the network SSD 32 through the network 7 ((3) in FIG. 16).

The network SSD 32 receives the identification information of the SSD, the write command, and the user data transmitted from the user SSD 31. When the received identification information of the SSD is same as the identification information of the network SSD 32, the network SSD 32 writes the user data into the NAND flash memory 17 in accordance with the write command.

In this manner, the client 2 can write user data not only into the NAND flash memory 13 of the user SSD 31 but also into the NAND flash memory 17 of the network SSD 32.

With reference to FIG. 17, an example of a write operation in the information processing system 1 will be specifically described. Here, as an example, a case where the client 2 writes user data into the NAND flash memory 13 of the user SSD 31 and a case where the client 2 writes user data into the NAND flash memory 17 of the first SSD 32-1 will be described.

First, in accordance with an operation performed by the user to request writing of user data, the client 2 transmits the identification information of an SSD, a write command, and the user data that correspond to the request, to the user SSD 31 ((1) in FIG. 17).

In the user SSD 31, the command processing module 112F receives the identification information of the SSD, the write command, and the user data transmitted from the client 2. The command processing module 112F determines whether the received identification information of the SSD is same as the identification information of the user SSD 31.

When the received identification information of the SSD is same as the identification information of the user SSD 31, the command processing module 112F sends the received write command and user data to the write processing module 112H ((2) in FIG. 17). The write processing module 112H sends the user data to the encryption circuit 116 ((3) in FIG. 17).

The encryption circuit 116 encrypts the user data with a set DEK. As a result, the encrypted data is obtained. The encryption circuit 116 sends the encrypted data to the NAND flash memory 13 via the NAND I/F 113 ((4) in FIG. 17).

The write processing module 112H instructs the NAND flash memory 13 to write the encrypted data via the NAND I/F 113 ((5) in FIG. 17). As a result, the encrypted data is written into the NAND flash memory 13 (more particularly, at least a partial storage area of the user area 132 associated with the account being used). Then, the write processing module 112H updates the logical-to-physical address conversion table 123 so as to indicate a correspondence between a physical address in which the encrypted data has been written and an LBA ((6) in FIG. 17).

On the other hand, when the received identification information of the SSD is same as the identification information of the first SSD 32-1, the command processing module 112F transmits the received identification information of the SSD, write command, and user data to the first SSD 32-1 via the network I/F 115 ((7) in FIG. 17).

In the first SSD 32-1, the command processing module 152F receives the identification information of the SSD, the write command, and the user data transmitted from the user SSD 31. The command processing module 152F determines whether the received identification information of the SSD is same as the identification information of the first SSD 32-1.

When the received identification information of the SSD is same as the identification information of the first SSD 32-1, the command processing module 152F sends the received write command and user data to the write processing module 152H ((8) in FIG. 17). The write processing module 152H sends the user data to the encryption circuit 156 ((9) in FIG. 17).

The encryption circuit 156 encrypts the user data using a set DEK. As a result, the encrypted data is obtained. The encryption circuit 156 sends the encrypted data to the NAND flash memory 17 via the NAND I/F 153 ((10) in FIG. 17).

The write processing module 152H instructs the NAND flash memory 17 to write the encrypted data via the NAND I/F 153 ((11) in FIG. 17). As a result, the encrypted data is written into the NAND flash memory 17 (more particularly, at least a partial storage area of the user area 172 associated with the account being used). Then, the write processing module 152H updates the logical-to-physical address conversion table 163 so as to indicate a correspondence between a physical address in which the encrypted data has been written and an LBA ((12) in FIG. 17).

Through the write operation described above, the client 2 can write user data not only to the user SSD 31 directly connected to the client 2 but also to the first SSD 32-1 connected to the user SSD 31 through the network 7.

Next, with reference to flowcharts in FIGS. 18 to 27, processes executed in the user SSD 31 and in the network SSD 32 will be described. A case where the network SSD 32 is the first SSD 32-1 will be explained for easy understanding. Processes executed in the other network SSDs 32 (for example, the second SSD 32-2 or the nth SSD 32-n) are realized by replacing the first SSD 32-1 described in FIGS. 18 to 27 with the other network SSDs 32.

(Account Issuance Request Process)

Figure 18:
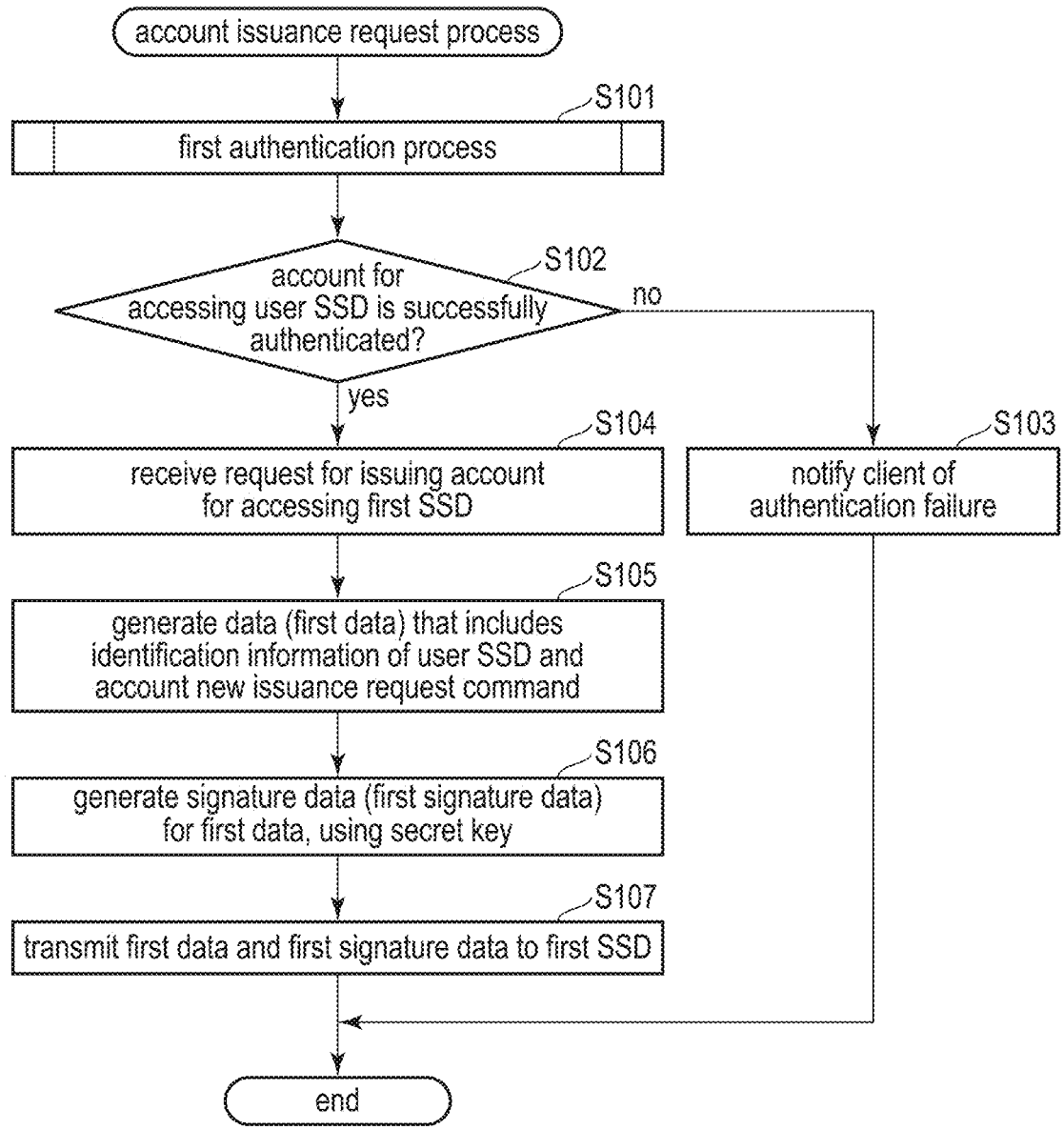
FIG. 18 is a flowchart illustrating an example of the procedure of an account issuance request process executed in the first-type memory system according to the embodiment.

FIG. 18 is a flowchart illustrating an example of the procedure of an account issuance request process executed by the CPU 112 of the user SSD 31. The account issuance request process is a process for requesting the first SSD 32-1 to newly issue an account for accessing the first SSD 32-1. For example, when receiving, from the client 2, a login ID and a login password for accessing the user SSD 31 and a request for issuing an account for accessing the first SSD 32-1, the CPU 112 executes the account issuance request process. The login ID (input login ID) received from the client 2 is a login ID input by the user on the client 2. The login password (input login password) received from the client 2 is a login password input by the user on the client 2.

First, the CPU 112 executes a first authentication process using the input login ID and the input login password (step S101). The first authentication process is a process of verifying the validation of the input login ID and the input login password in order to authenticate an account for accessing the user SSD 31.

More specifically, in the first authentication process, it is determined whether the input login ID matches the login ID to the user SSD 31 registered in the account management table 41 (first registration login ID) and the input login password matches the login password to the user SSD 31 registered in the account management table 41 (first registration login password).

When the input login ID matches the first registration login ID and the input login password matches the first registration login password, the CPU 112 obtains an authentication result indicating that the account for accessing the user SSD 31 is successfully authenticated. When the input login ID is different from the first registration login ID or when the input login password is different from the first registration login password, the CPU 112 obtains an authentication result indicating that the authentication of the account for accessing the user SSD 31 has failed. An example of the specific procedure of the first authentication process will be described later with reference to FIG. 19.

The CPU 112 determines whether the account for accessing the user SSD 31 is successfully authenticated on the basis of the authentication result of the first authentication process (step S102).

When the authentication of the account for accessing the user SSD 31 has failed (no in step S102), the CPU 112 notifies the client 2 of the authentication failure via the host I/F 111 (step S103), and ends the account issuance request process.

When the account for accessing the user SSD 31 is successfully authenticated (yes in step S102), the CPU 112 receives the request for issuing an account for accessing the first SSD 32-1 (step S104).

In accordance with the received issuance request, the CPU 112 generates data (first data) that includes the identification information of the user SSD 31 and an account new issuance request command (step S105).

The CPU 112 generates signature data (first signature data) for the first data by using the secret key 421 of the user SSD 31 (step S106).

The CPU 112 transmits the first data and the first signature data to the first SSD 32-1 via the network I/F 115 (step S107), and ends the account issuance request process.

Through the account issuance request process described as above, when the account for accessing the user SSD 31 is successfully authenticated, the CPU 112 can request the first SSD 32-1 to issue an account for accessing the first SSD 32-1.

More specifically, the CPU 112 can transmit the first data for requesting issuance of an account for accessing the first SSD 32-1 and the first signature data for guaranteeing the authenticity of the first data, to the first SSD 32-1.

(First Authentication Process)

Figure 19:
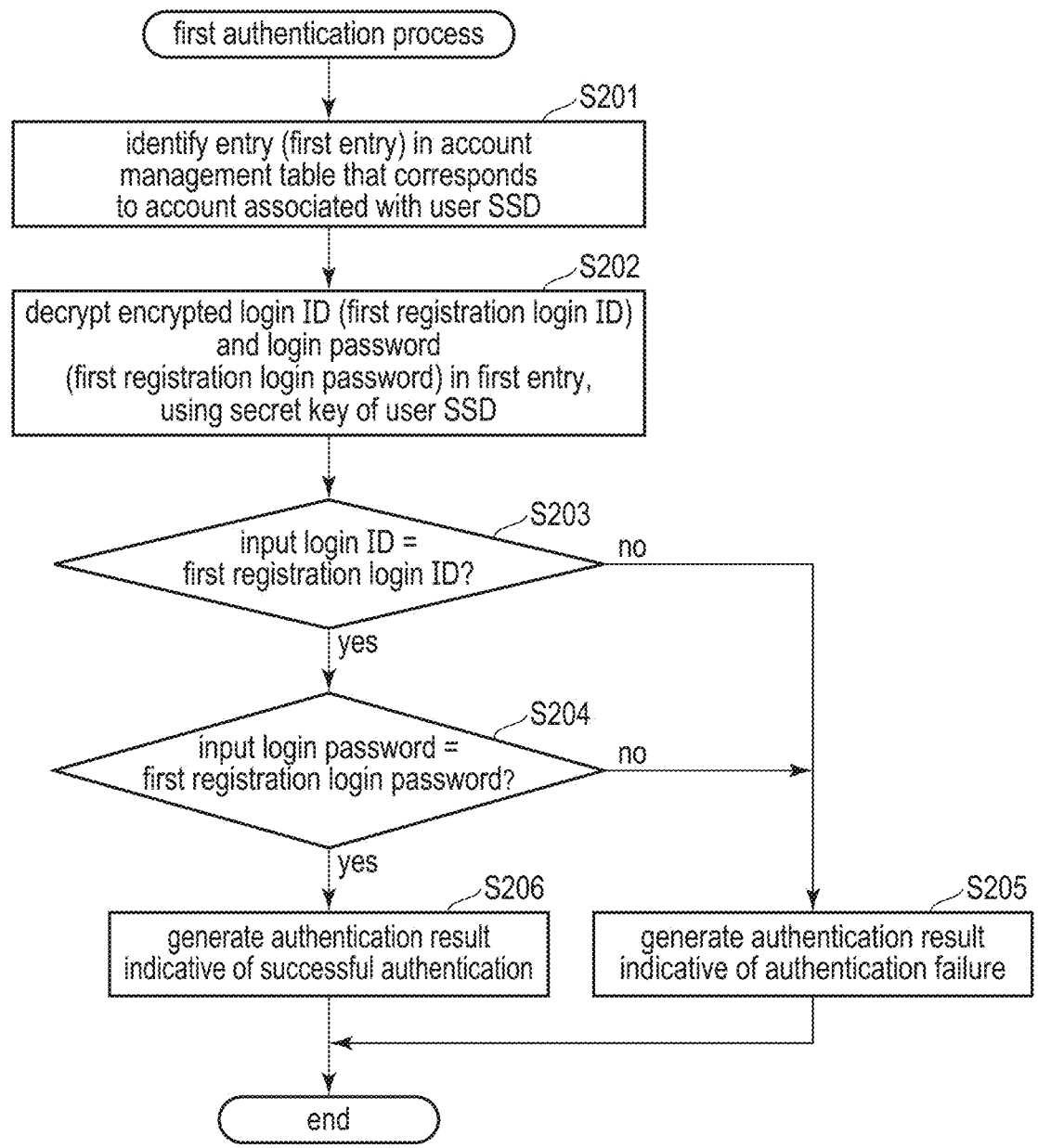
FIG. 19 is a flowchart illustrating an example of the procedure of a first authentication process executed in the first-type memory system according to the embodiment.

FIG. 19 is a flowchart illustrating an example of the procedure of the first authentication process executed by the CPU 112 of the user SSD 31. The first authentication process is a process of verifying the validation of a login ID (input login ID) and a login password (input login password) received from the client 2 in order to authenticate an account for accessing the user SSD 31. The first authentication process corresponds to step S101 of the account issuance request process described above with reference to FIG. 18.

First, the CPU 112 identifies an entry (hereinafter, referred to as a first entry) in the account management table 41 that corresponds to an account associated with the user SSD 31 (step S201). The first entry is an entry in which the identification information of the user SSD 31 is set in the SSD identification information field. The first entry includes a login ID and a login password that are encrypted with the public key 422 of the user SSD 31.

The CPU 112 decrypts the encrypted login ID (first registration login ID) and login password (first registration login password) in the first entry with the secret key 421 of the user SSD 31 (step S202).

Next, the CPU 112 determines whether the input login ID matches the first registration login ID (step S203).

When the input login ID is different from the first registration login ID (no in step S203), the CPU 112 generates the authentication result indicating that the authentication of the account for accessing the user SSD 31 has failed (step S205), and ends the first authentication process.

When the input login ID matches the first registration login ID (yes in step S203), the CPU 112 determines whether the input login password matches the first registration login password (step S204).

When the input login password is different from the first registration login password (no in step S204), the CPU 112 generates the authentication result indicating that the authentication of the account for accessing the user SSD 31 has failed (step S205), and ends the first authentication process.

When the input login password matches the first registration login password (yes in step S204), the CPU 112 generates the authentication result indicating that the account for accessing the user SSD 31 is successfully authenticated (step S206), and ends the first authentication process.

Through the first authentication process described as above, the CPU 112 verifies the validation of the input login ID and the input login password, and generates the authentication result indicating the success or failure of authentication of the account for accessing the user SSD 31.

(Account Issuance Process)

Figure 20:
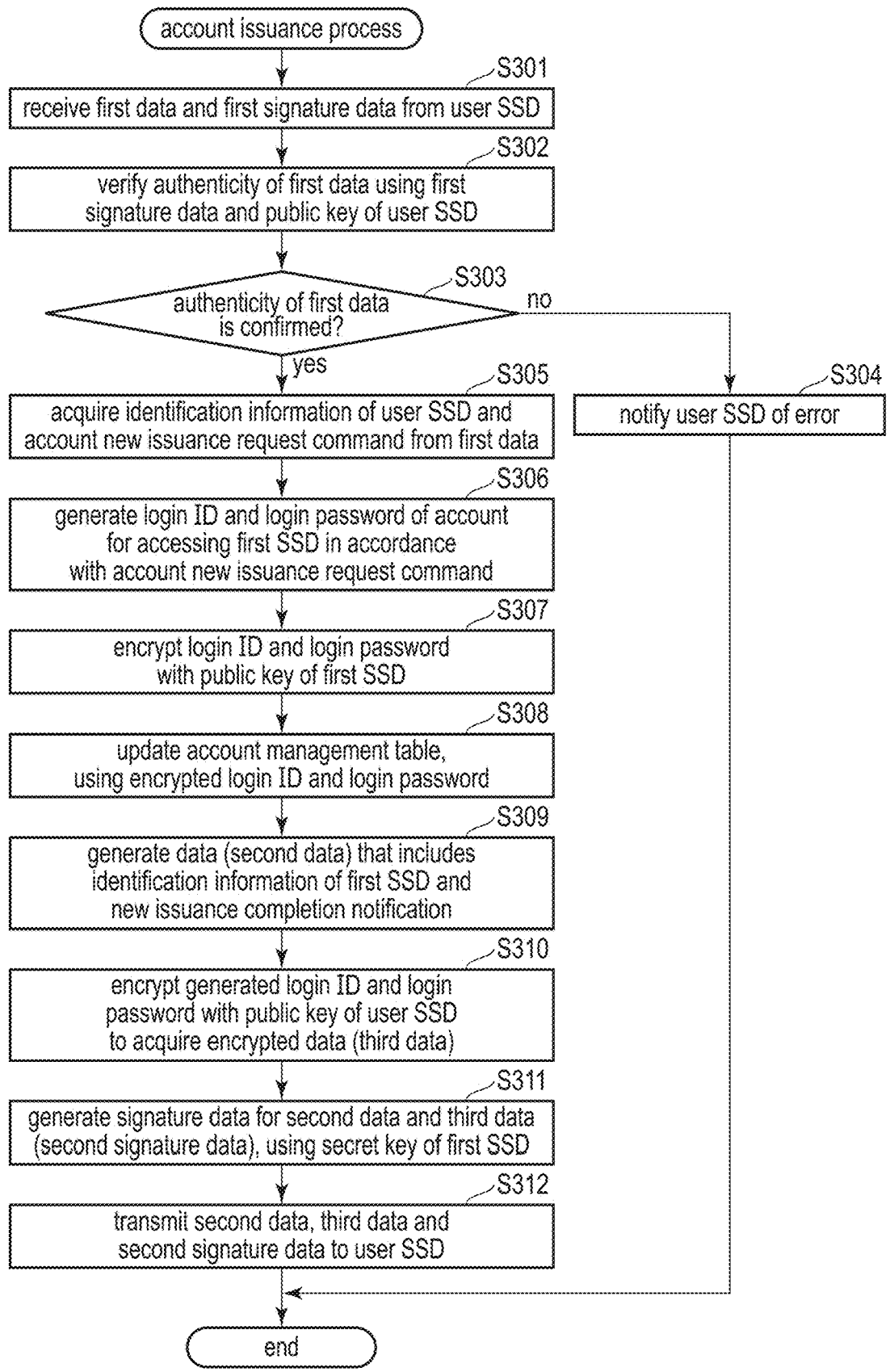
FIG. 20 is a flowchart illustrating an example of the procedure of an account issuance process executed in the second-type memory system according to the embodiment.

FIG. 20 is a flowchart illustrating an example of the procedure of an account issuance process executed by the CPU 152 of the first SSD 32-1. The account issuance process is a process for newly issuing an account for accessing the first SSD 32-1.

First, the CPU 152 receives the first data and the first signature data from the user SSD 31 (step S301). The first data includes the identification information of the user SSD 31 and an account new issuance request command. The first signature data is signature data for the first data.

The CPU 152 verifies the authenticity of the first data by using the first signature data and the public key 422 of the user SSD 31 (step S302).

Specifically, the CPU 152 calculates a hash value of the first data (hereinafter, referred to as a first hash value) by using a specific hash function.

Further, the CPU 152 identifies an entry in the account management table 45 that corresponds to an account associated with the user SSD 31. The entry that corresponds to the account associated with the user SSD 31 is an entry in which the identification information of the user SSD 31 is set in the SSD identification information field. The CPU 152 acquires the public key 422 of the user SSD 31 from the identified entry. Then, the CPU 152 decrypts the first signature data with the public key 422 of the user SSD 31, thereby acquiring a hash value (hereinafter, referred to as a second hash value).

When the first hash value matches the second hash value, the CPU 152 determines that the authenticity of the first data is confirmed. When the first hash value is different from the second hash value, the CPU 152 determines that the authenticity of the first data is not confirmed.

The CPU 152 determines whether the authenticity of the first data is confirmed on the basis of a verification result of the authenticity of the first data (step S303).

When the authenticity of the first data is not confirmed (no in step S303), the CPU 152 notifies the user SSD 31 of an error indicating that the authenticity of the first data is not confirmed via the network I/F 155 (step S304), and ends the account issuance process.

When the authenticity of the first data is confirmed (yes in step S303), the CPU 152 acquires the identification information of the user SSD 31 and the account new issuance request command from the first data (step S305).

In accordance with the acquired account new issuance request command, the CPU 152 generates a login ID and a login password of an account for accessing the first SSD 32-1 (step S306).

The CPU 152 encrypts the generated login ID and login password with the public key 462 of the first SSD 32-1 (step S307).

The CPU 152 updates the account management table 45 by using the encrypted login ID and login password (step S308). Specifically, the CPU 152 identifies an entry in the account management table 45 that corresponds to the account associated with the user SSD 31. The CPU 152 sets the encrypted login ID in the login ID field of the identified entry. Further, the CPU 152 sets the encrypted login password in the login password field of the identified entry.

Next, the CPU 152 generates data (second data) that includes the identification information of the first SSD 32-1 and a new issuance completion notification (step S309).

The CPU 152 encrypts the login ID and the login password generated in step S306 with the public key 422 of the user SSD 31, thereby acquiring encrypted data (third data) (step S310).

The CPU 152 generates signature data (second signature data) for the second data and the third data by using the secret key 461 of the first SSD 32-1 (step S311). Specifically, the CPU 152 calculates a hash value of the second data and the third data, using a specific hash function. Then, the CPU 152 encrypts the calculated hash value with the secret key 461 of the first SSD 32-1, thereby generating the second signature data.

The CPU 152 transmits the second data, the third data, and the second signature data to the user SSD 31 via the network I/F 155 (step S312), and ends the account issuance process.

Through the account issuance process described as above, when the authenticity of the first data is confirmed, the CPU 152 can newly issue the account for accessing the first SSD 32-1 to the user SSD 31.

More specifically, the CPU 152 can transmit the login ID and the login password of the account for accessing the first SSD 32-1, to the user SSD 31. The CPU 152 can register the login ID and the login password of the account for accessing the first SSD 32-1 in the account management table 45.

The login ID and the login password transmitted from the first SSD 32-1 to the user SSD 31 are encrypted with the public key 422 of the user SSD 31. The login ID and the login password registered in the account management table 45 are encrypted with the public key 462 of the first SSD 32-1, for example. Such encryption can prevent leakage of the login IDs and the login passwords.

(Account Information Registration Process)

Figure 21:
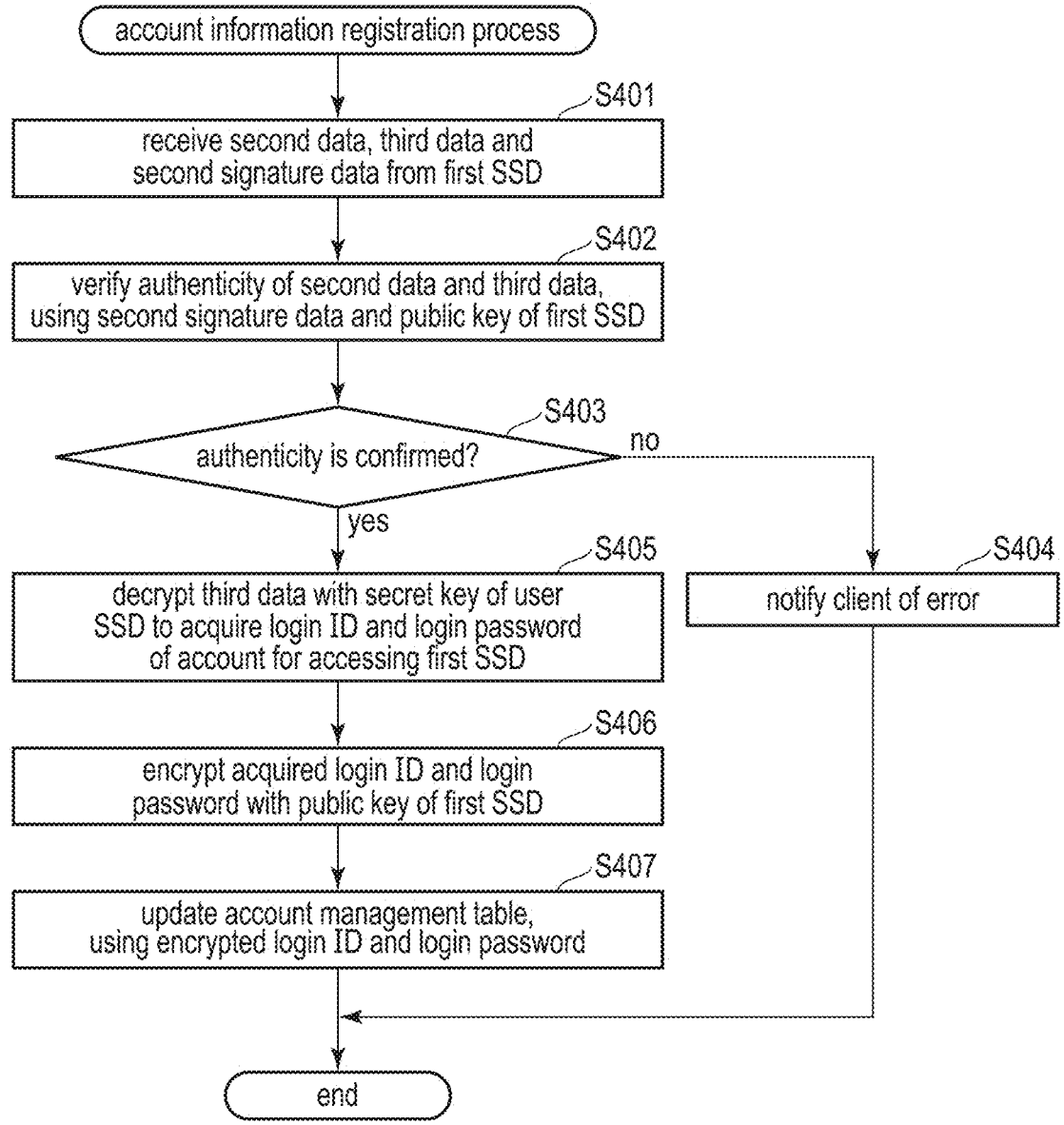
FIG. 21 is a flowchart illustrating an example of the procedure of an account information registration process executed in the first-type memory system according to the embodiment.

FIG. 21 is a flowchart illustrating an example of the procedure of an account information registration process executed by the CPU 112 of the user SSD 31. The account information registration process is a process for registering information of an account newly issued by the first SSD 32-1 to the account management table 41 in the user SSD 31.

First, the CPU 112 receives the second data, third data, and second signature data from the first SSD 32-1 (step S401). The second data includes the identification information of the first SSD 32-1 and a new issuance completion notification. The third data includes a login ID and a login password that are encrypted with the public key 422 of the user SSD 31. The second signature data is signature data for the second data and the third data.

The CPU 112 verifies the authenticity of the second data and the third data by using the second signature data and the public key 462 of the first SSD 32-1 (step S402).

Specifically, the CPU 152 calculates a hash value (hereinafter, referred to as a third hash value) of the second data and the third data by using a specific hash function.

Further, the CPU 112 identifies an entry in the account management table 41 that corresponds to an account associated with the first SSD 32-1. The entry that corresponds to the account associated with the first SSD 32-1 is, for example, an entry in which the identification information of the first SSD 32-1 is set in the SSD identification information field. The CPU 112 acquires the public key 462 of the first SSD 32-1 from the identified entry. Then, the CPU 112 decrypts the second signature data with the public key 462 of the first SSD 32-1, thereby acquiring a hash value (hereinafter, referred to as a fourth hash value).

When the third hash value matches the fourth hash value, the CPU 112 determines that the authenticity of the second data and the third data is confirmed. When the third hash value is different from the fourth hash value, the CPU 112 determines that the authenticity of the second data and the third data is not confirmed.

The CPU 112 determines whether the authenticity of the second data and the third data is confirmed on the basis of a verification result of the authenticity of the second data and the third data (step S403).

When the authenticity of the second data and the third data is not confirmed (no in step S403), the CPU 112 notifies the client 2 of an error indicating that the account for accessing the first SSD 32-1 is not properly issued, via the host I/F 111 (step S404), and ends the account information registration process.

When the authenticity of the second data and the third data is confirmed (yes in step S403), the CPU 112 decrypts the third data with the secret key 421 of the user SSD 31, thereby acquiring the login ID and the login password of the account for accessing the first SSD 32-1 (step S405).

The CPU 112 encrypts the acquired login ID and login password with the public key 462 of the first SSD 32-1 (step S406). The CPU 112 may encrypt the acquired login ID and login password with the public key 422 of the user SSD 31.

The CPU 112 updates the account management table 41 by using the encrypted login ID and login password (step S407), and ends the account information registration process. Specifically, the CPU 112 identifies an entry in the account management table 41 that corresponds to the account associated with the first SSD 32-1. The CPU 112 sets the encrypted login ID in the login ID field of the identified entry. Further, the CPU 112 sets the encrypted login password in the login password field of the identified entry.

Through the account information registration process described as above, when the authenticity of the second data and the third data is confirmed, the CPU 112 can register information about the newly issued account for accessing the first SSD 32-1 to the account management table 41.

More specifically, the CPU 112 can register the login ID and the login password of the account for accessing the first SSD 32-1 to the account management table 41. The registered login ID and login password are encrypted with, for example, the public key 462 of the first SSD 32-1 or the public key 422 of the user SSD 31. The encryption can prevent the leakage of the login IDs and the login passwords.

(Account Change Request Process)

Figure 22:
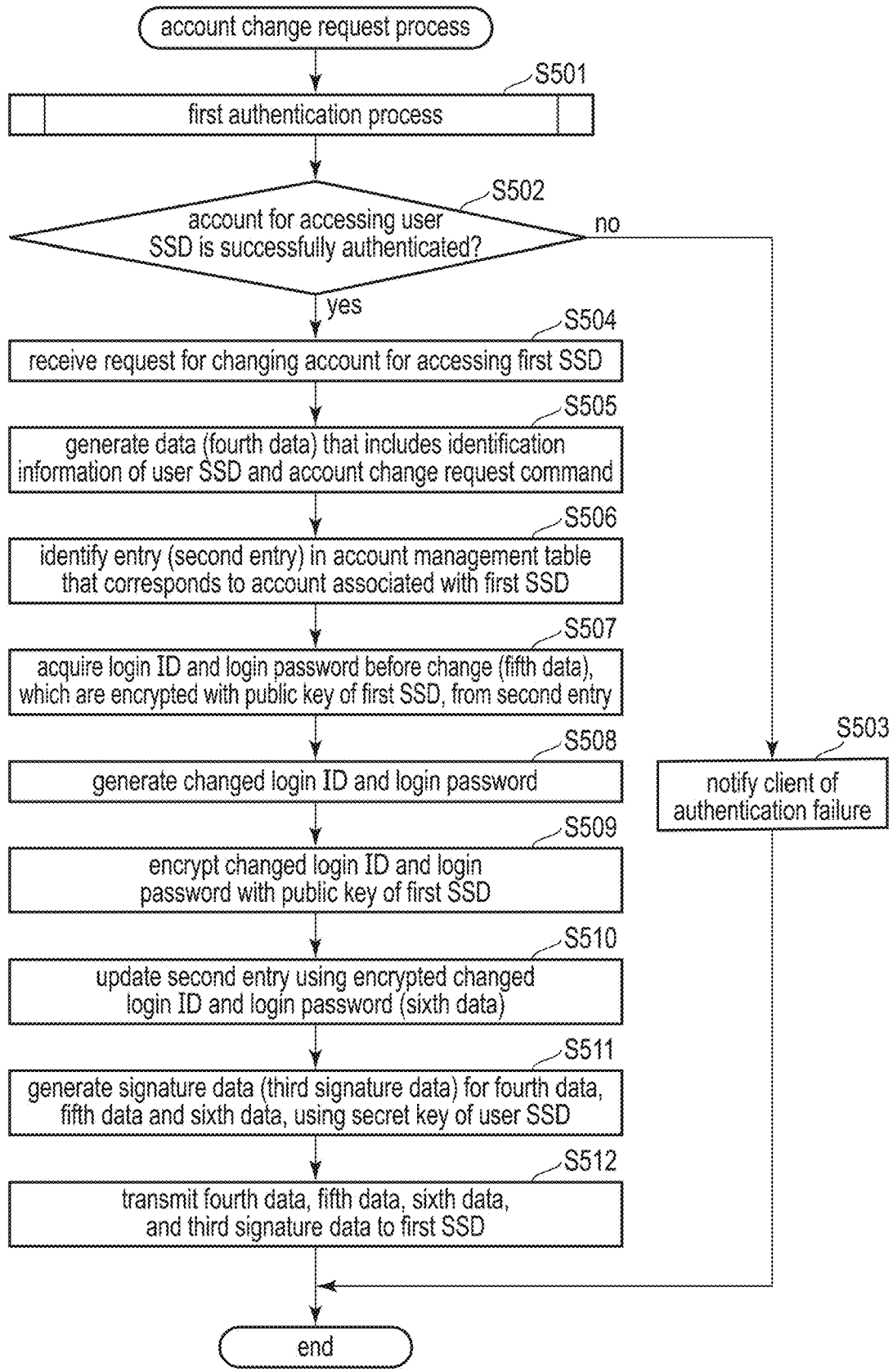
FIG. 22 is a flowchart illustrating an example of the procedure of an account change request process executed in the first-type memory system according to the embodiment.

FIG. 22 is a flowchart illustrating an example of the procedure of an account change request process executed by the CPU 112 of the user SSD 31. The account change request process is a process for requesting the first SSD 32-1 to change an account for accessing the first SSD 32-1.

The procedures of steps S501 and S502 of FIG. 22 are similar to the procedures of steps S101 and S102 in the account issuance request process described above with reference to FIG. 18. That is, the CPU 112 determines whether an account for accessing the user SSD 31 is successfully authenticated by using the account management table 41 and a login ID and a login password input by the user on the client 2.

When the authentication of the account for accessing the user SSD 31 has failed (no in step S502), the CPU 112 notifies the client 2 of the authentication failure via the host I/F 111 (step S503), and ends the account change request process.

When the account for accessing the user SSD 31 is successfully authenticated (yes in step S502), the CPU 112 receives a request for changing the account for accessing the first SSD 32-1, from the client 2 (step S504).

In accordance with the received change request, the CPU 112 generates data (fourth data) that includes the identification information of the user SSD 31 and an account change request command (step S505).

Next, the CPU 112 identifies an entry (hereinafter, referred to as a second entry) in the account management table 41 that corresponds to the account associated with the first SSD 32-1 (step S506). The second entry is an entry in which the identification information of the first SSD 32-1 is set in the SSD identification information field.

The CPU 112 acquires the login ID and the login password before the change (fifth data), which are encrypted with the public key 462 of the first SSD 32-1, from the second entry (step S507).

The CPU 112 generates changed login ID and login password (step S508). For example, the CPU 112 generates two random numbers and uses the two random numbers as the changed login ID and login password, respectively.

The CPU 112 encrypts the changed login ID and login password with the public key 462 of the first SSD 32-1 (step S509). The CPU 112 acquires the public key 462 of the first SSD 32-1 from the second entry.

Then, the CPU 112 updates the second entry by using the encrypted changed login ID and login password (sixth data) (step S510). Specifically, the CPU 112 replaces the encrypted login ID before the change set in the login ID field of the second entry with the encrypted changed login ID. The CPU 112 replaces the encrypted login password before the change set in the login password field of the second entry with the encrypted changed login password.

Next, the CPU 112 generates signature data (third signature data) for the fourth data, the fifth data, and the sixth data by using the secret key 421 of the user SSD 31 (step S511).

Then, the CPU 112 transmits the fourth data, the fifth data, the sixth data, and the third signature data to the first SSD 32-1 via the network I/F 115 (step S512), and ends the account change request process.

Through the account change request process described as above, when the account for accessing the user SSD 31 is successfully authenticated, the CPU 112 can request the first SSD 32-1 to change the account for accessing the first SSD 32-1.

More specifically, the CPU 112 can transmit, to the first SSD 32-1, the fourth data for requesting the change of the account for accessing the first SSD 32-1, the fifth data including the encrypted login ID and login password before the change, the sixth data including the encrypted changed login ID and login password, and the third signature data for guaranteeing the authenticity of the fourth data, the fifth data, and the sixth data.

The login ID and login password before the change and the changed login ID and login password that are transmitted from the user SSD 31 to the first SSD 32-1 are encrypted with the public key 462 of the first SSD 32-1. The encryption can prevent the leakage of the login IDs and the login passwords.

(Account Change Process)

Figure 23:
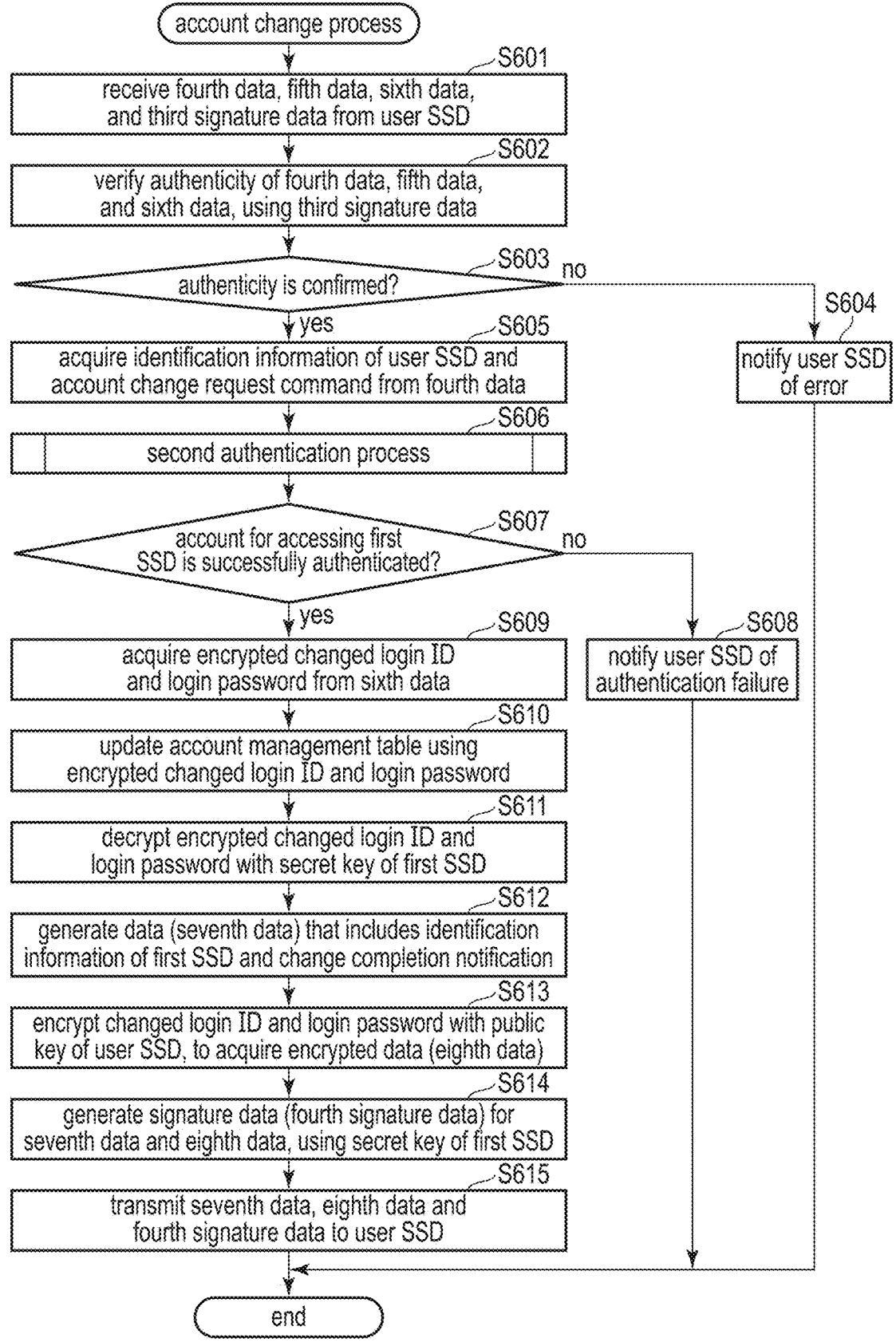
FIG. 23 is a flowchart illustrating an example of the procedure of an account change process executed in the second-type memory system according to the embodiment.

FIG. 23 is a flowchart illustrating an example of the procedure of an account change process executed by the CPU 152 of the first SSD 32-1. The account change process is a process for changing an issued account for accessing the first SSD 32-1.

First, the CPU 152 receives the fourth data, the fifth data, the sixth data, and the third signature data from the user SSD 31 (step S601). The fourth data includes the identification information of the user SSD 31 and the account change request command. The fifth data includes the login ID and login password before the change that are encrypted with the public key 462 of the first SSD 32-1. The sixth data includes the changed login ID and login password that are encrypted with the public key 462 of the first SSD 32-1. The third signature data is signature data for the fourth data, the fifth data, and the sixth data.

The CPU 152 verifies the authenticity of the fourth data, the fifth data, and the sixth data by using the third signature data and the public key 422 of the user SSD 31 (step S602).

The CPU 152 determines whether the authenticity of the fourth data, the fifth data, and the sixth data is confirmed on the basis of a verification result of the authenticity of the fourth data, the fifth data, and the sixth data (step S603).

When the authenticity of the fourth data, the fifth data, and the sixth data is not confirmed (no in step S603), the CPU 152 notifies the user SSD 31 of an error indicating that the authenticity of the fourth data, the fifth data, and the sixth data is not confirmed via the network I/F 155 (step S604), and ends the account change process.

When the authenticity of the fourth data, the fifth data, and the sixth data is confirmed (yes in step S603), the CPU 152 acquires the identification information of the user SSD 31 and the account change request command from the fourth data (step S605).

In accordance with the acquired account change request command, the CPU 152 executes a second authentication process using the fifth data (step S606). The second authentication process is a process of verifying the validation of the login ID and the login password included in data (here, the fifth data) in order to authenticate the account for accessing the first SSD 32-1. The specific procedure of the second authentication process will be described later with reference to FIG. 24.

The CPU 152 determines whether the account for accessing the first SSD 32-1 is successfully authenticated on the basis of an authentication result of the second authentication process (step S607).

When the authentication of the account for accessing the first SSD 32-1 has failed (no in step S607), the CPU 152 notifies the user SSD 31 of the authentication failure via the network I/F 155 (step S608), and ends the account change process.

When the account for accessing the first SSD 32-1 is successfully authenticated (yes in step S607), the CPU 152 acquires the encrypted changed login ID and login password from the sixth data (step S609).

The CPU 152 updates the account management table 45 by using the encrypted changed login ID and login password (step S610). Specifically, in an entry in the account management table 45 that corresponds to the user SSD 31, the CPU 152 sets the encrypted changed login ID in the login ID field and sets the encrypted changed login password in the login password field.

Then, the CPU 152 decrypts the encrypted changed login ID and login password with the secret key 461 of the first SSD 32-1 (step S611).

Next, the CPU 152 generates data (seventh data) that includes the identification information of the first SSD 32-1 and a change completion notification (step S612).

The CPU 152 encrypts the changed login ID and login password, which have been decrypted in step S611, with the public key 422 of the user SSD 31, thereby acquiring encrypted data (eighth data) (step S613).

The CPU 152 generates signature data (fourth signature data) for the seventh data and the eighth data by using the secret key 461 of the first SSD 32-1 (step S614).

Then, the CPU 152 transmits the seventh data, the eighth data, and the fourth signature data to the user SSD 31 via the network I/F 155 (step S615), and ends the account change process.

Through the account change process described as above, the CPU 152 can change the account for accessing the first SSD 32-1 when the authenticity of the fourth data, the fifth data, and the sixth data is confirmed and the authentication of the account for accessing the first SSD 32-1 using the fifth data has succeeded.

More specifically, the CPU 152 can change the login ID and the login password of the account for accessing the first SSD 32-1 registered in the account management table 45 to the changed login ID and login password in the sixth data. Further, the CPU 152 can transmit, to the user SSD 31, the seventh data including the change completion notification, the eighth data including the encrypted changed login ID and login password, and the fourth signature data for guaranteeing the authenticity of the seventh data and the eighth data.

The changed login ID and login password transmitted from the first SSD 32-1 to the user SSD 31 are encrypted with the public key 422 of the user SSD 31. The encryption can prevent the leakage of the login ID and the login password.

(Second Authentication Process)

Figure 24:
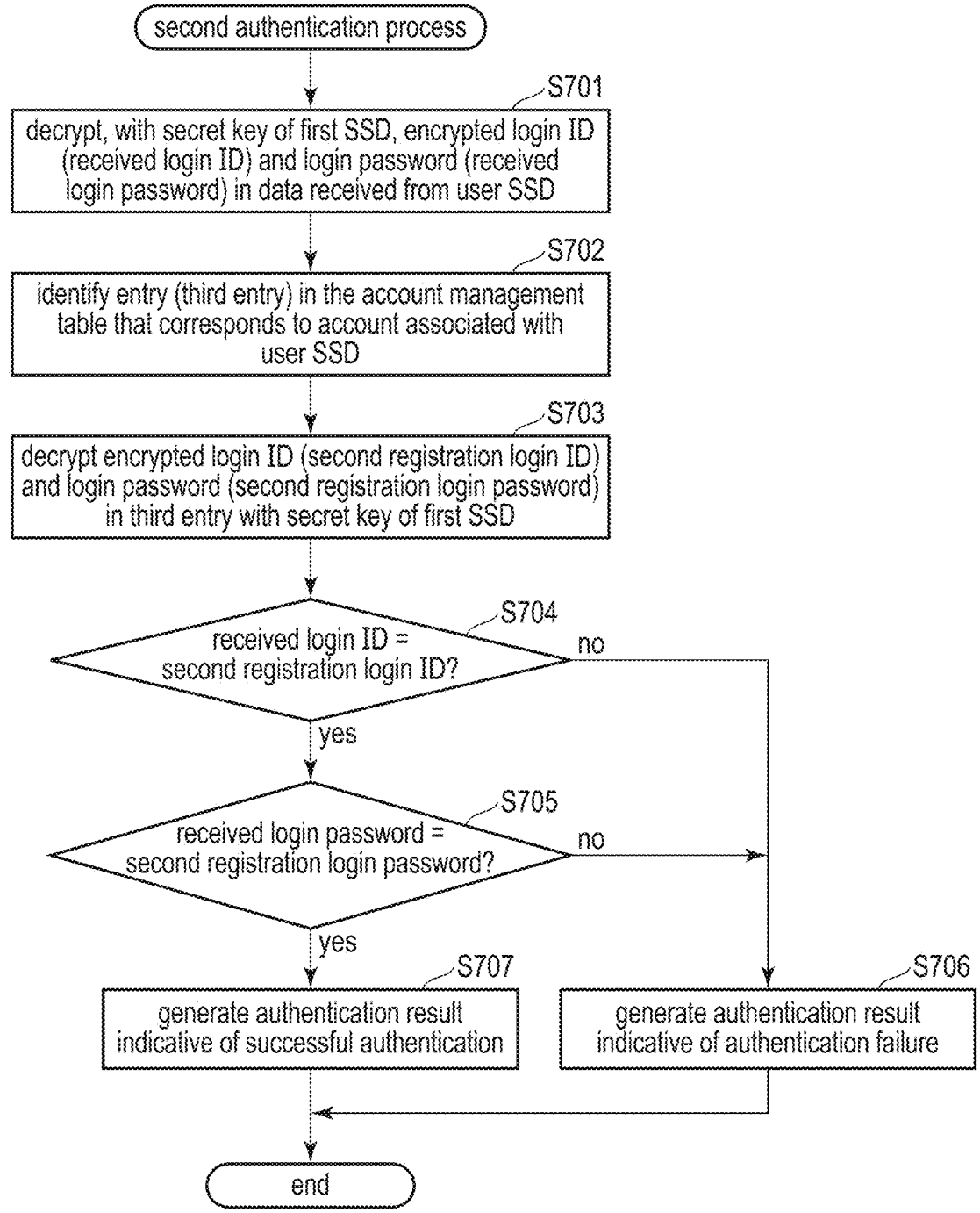
FIG. 24 is a flowchart illustrating an example of the procedure of a second authentication process executed in the second-type memory system according to the embodiment.

FIG. 24 is a flowchart illustrating an example of the procedure of the second authentication process executed by the CPU 152 of the first SSD 32-1. The second authentication process is a process of verifying the validation of a login ID and a login password that are obtained from data received from the user SSD 31 in order to authenticate an account for accessing the first SSD 32-1. The data received from the user SSD 31 (fifth data) includes the login ID (received login ID) and the login password (received login password) that are encrypted with the public key 462 of the first SSD 32-1. The second authentication process corresponds to step S606 of the second authentication process described above with reference to FIG. 23.

First, the CPU 152 decrypts the encrypted received login ID and received login password in the data received from the user SSD 31, with the secret key 461 of the first SSD 32-1 (step S701). With this decryption, the received login ID and the received login password are obtained.

The CPU 152 identifies an entry (hereinafter, referred to as a third entry) in the account management table 45 that corresponds to an account associated with the user SSD 31 (step S702). The third entry is an entry in which the identification information of the user SSD 31 is set in the SSD identification information field.

The CPU 152 decrypts the encrypted login ID and login password in the third entry, with the secret key 461 of the first SSD 32-1 (step S703). The login ID obtained by the decryption in step S703 is referred to as the second registration login ID. The login password obtained by the decryption in step S703 is referred to as the second registration login password.

Next, the CPU 152 determines whether the received login ID matches the second registration login ID (step S704).

When the received login ID is different from the second registration login ID (no in step S704), the CPU 152 generates an authentication result indicating that the authentication of the account for accessing the first SSD 32-1 has failed (step S706), and ends the second authentication process.

When the received login ID matches the second registration login ID (yes in step S704), the CPU 152 determines whether the received login password matches the second registration login password (step S705).

When the received login password is different from the second registration login password (no in step S705), the CPU 152 generates the authentication result indicating that the authentication of the account for accessing the first SSD 32-1 has failed (step S706), and ends the second authentication process.

When the received login password matches the second registration login password (yes in step S705), the CPU 152 generates an authentication result indicating that the account for accessing the first SSD 32-1 is successfully authenticated (step S707), and ends the second authentication process.

Through the second authentication process described as above, the CPU 152 verifies the validation of the received login ID and the received login password, and can generate the authentication result indicative of the success or failure of authentication of the account for accessing the first SSD 32-1.

(Access Application Process)

FIG. 25 is a flowchart illustrating an example of the procedure of an access application process executed by the CPU 112 of the user SSD 31. The access application process is a process for applying to the first SSD 32-1 for access to the first SSD 32-1.

The procedures of steps S801 and S802 of FIG. 25 are similar to the procedures of steps S101 and S102 in the account issuance request process described above with reference to FIG. 18. That is, the CPU 112 determines whether an account for accessing the user SSD 31 is successfully authenticated by using the account management table 41 and a login ID and a login password input by the user on the client 2.

When the authentication of the account for accessing the user SSD 31 has failed (no in step S802), the CPU 112 notifies the client 2 of the authentication failure via the host I/F 111 (step S803), and ends the access application process.

When the account for accessing the user SSD 31 is successfully authenticated (yes in step S802), the CPU 112 receives the access application request for the first SSD 32-1 from the client 2 (step S804).

In accordance with the received access application request, the CPU 112 generates data (ninth data) that includes the identification information of the user SSD 31 and the access application command (step S805).

Next, the CPU 112 identifies an entry (hereinafter, referred to as a fourth entry) in the account management table 41 that corresponds to the account associated with the first SSD 32-1 (step S806). The fourth entry is an entry in which the identification information of the first SSD 32-1 is set in the SSD identification information field.

The CPU 112 acquires the encrypted login ID and login password (tenth data) from the fourth entry (step S807).

The CPU 112 generates signature data (fifth signature data) for the ninth data and the tenth data by using the secret key 421 of the user SSD 31 (step S808).

Then, the CPU 112 transmits the ninth data, the tenth data, and the fifth signature data to the first SSD 32-1 via the network I/F 115 (step S809), and ends the access application process.

Through the access application process described as above, the CPU 112 can apply for access to the first SSD 32-1 when the account for accessing the user SSD 31 is successfully authenticated.

More specifically, the CPU 112 can transmit, to the first SSD 32-1, the ninth data for applying for access to the first SSD 32-1, the tenth data that corresponds to the account for accessing the first SSD 32-1 and includes the encrypted login ID and login password, and the fifth signature data for guaranteeing the authenticity of the ninth data and the tenth data.

The login ID and the login password transmitted from the user SSD 31 to the first SSD 32-1 are encrypted with the public key 462 of the first SSD 32-1. The encryption can prevent the leakage of the login ID and the login password.

(Access Control Process)

Figure 26:
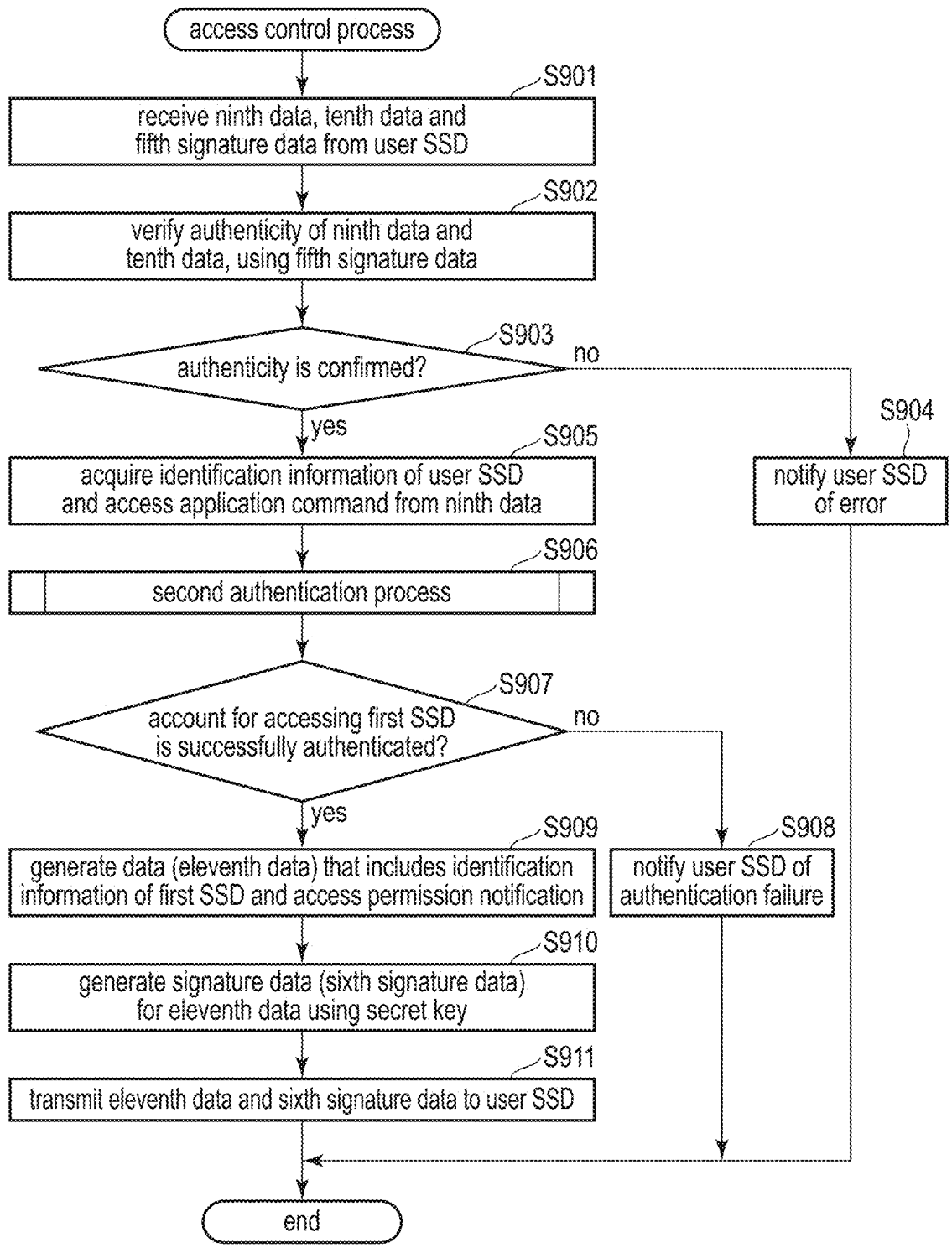
FIG. 26 is a flowchart illustrating an example of the procedure of an access control process executed in the second-type memory system according to the embodiment.

FIG. 26 is a flowchart illustrating an example of the procedure of an access control process executed by the CPU 152 of the first SSD 32-1. The access control process is a process for controlling access to the first SSD 32-1.

First, the CPU 152 receives the ninth data, the tenth data, and the fifth signature data from the user SSD 31 (step S901). The ninth data includes the identification information of the user SSD 31 and the access application command. The tenth data includes the login ID and login password that are encrypted with the public key 462 of the first SSD 32-1. The fifth signature data is signature data for the ninth data and the tenth data.

The CPU 152 verifies the authenticity of the ninth data and the tenth data by using the fifth signature data and the public key 422 of the user SSD 31 (step S902).

The CPU 152 determines whether the authenticity of the ninth data and the tenth data is confirmed on the basis of a verification result of the authenticity of the ninth data and the tenth data (step S903).

When the authenticity of the ninth data and the tenth data is not confirmed (no in step S903), the CPU 152 notifies the user SSD 31 of an error indicating that the authenticity of the ninth data and the tenth data is not confirmed via the network I/F 155 (step S904), and ends the access control process.

When the authenticity of the ninth data and the tenth data is confirmed (yes in step S903), the CPU 152 acquires the identification information of the user SSD 31 and the access application command from the ninth data (step S905).

In accordance with the acquired access application command, the CPU 152 executes the second authentication process using the tenth data (step S906). The specific procedures of the second authentication process have been described as above with reference to FIG. 24.

The CPU 152 determines whether the account for accessing the first SSD 32-1 is successfully authenticated on the basis of an authentication result of the second authentication process (step S907).

When the authentication of the account for accessing the first SSD 32-1 has failed (no in step S907), the CPU 152 notifies the user SSD 31 of the authentication failure via the network I/F 155 (step S908), and ends the access control process.

When the account for accessing the first SSD 32-1 is successfully authenticated (yes in step S907), the CPU 152 generates data (eleventh data) that includes the identification information of the first SSD 32-1 and the access permission notification (step S909).

The CPU 152 generates signature data (sixth signature data) for the eleventh data by using the secret key 461 of the first SSD 32-1 (step S910).

Then, the CPU 152 transmits the eleventh data and the sixth signature data to the user SSD 31 via the network I/F 155 (step S911), and ends the access control process.

Through the access control process described as above, when the authenticity of the ninth data and the tenth data is confirmed and the authentication of the account for accessing the first SSD 32-1 using the tenth data has succeeded, the CPU 152 can permit the user SSD 31 to access the first SSD 32-1. More specifically, the CPU 152 can transmit the eleventh data including the access permission notification and the sixth signature data corresponding to the eleventh data, to the user SSD 31.

(Access Permission Confirmation Process)

FIG. 27 is a flowchart illustrating an example of the procedure of an access permission confirmation process executed by the CPU 112 of the user SSD 31. The access permission confirmation process is a process for confirming that access to the first SSD 32-1 is permitted.

First, the CPU 112 receives the eleventh data and the sixth signature data from the first SSD 32-1 (step S1001). The eleventh data includes the identification information of the first SSD 32-1 and the access permission notification. The sixth signature data is signature data for the eleventh data.

The CPU 112 verifies the authenticity of the eleventh data by using the sixth signature data and the public key 462 of the first SSD 32-1 (step S1002).

The CPU 112 determines whether the authenticity of the eleventh data is confirmed on the basis of a verification result of the authenticity of the eleventh data (step S1003).

When the authenticity of the eleventh data is not confirmed (no in step S1003), the CPU 112 notifies the client 2 of an error indicating that the permission of the access to the first SSD 32-1 has not been obtained, via the host I/F 111 (step S1004), and ends the access permission confirmation process.

When the authenticity of the eleventh data is confirmed (yes in step S1003), the CPU 112 acquires the identification information of the first SSD 32-1 and the access permission notification from the eleventh data (step S1005).

The CPU 112 starts the access to the first SSD 32-1 in accordance with the acquired access permission notification (step S1006), and ends the access permission confirmation process.

According to the access permission confirmation process as described above, the CPU 112 can start the access to the first SSD 32-1 when the authenticity of the eleventh data is confirmed. Specifically, the CPU 112 can transmit, for example, a write command and user data to be written into the first SSD 32-1 after the access permission notification is acquired. Further, the CPU 112 can transmit, for example, a read command to the first SSD 32-1 after the access permission notification is acquired.

Modification Example

Figure 28:
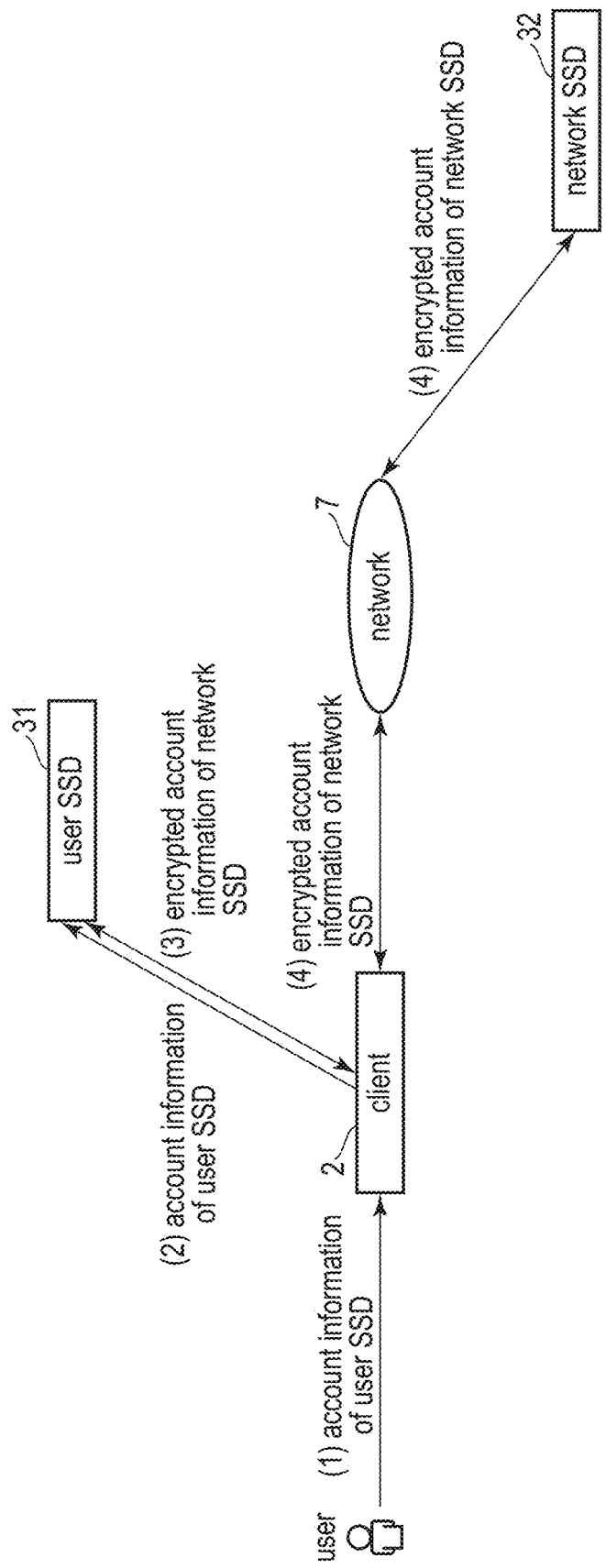
FIG. 28 is a view illustrating another example of the flow of account information in the information processing system according to the embodiment.

With reference to FIGS. 28 to 30, a modification example of the information processing system 1 will be described. In the information processing system 1 according to the modification example, the user SSD 31 is connected to the client 2 via the host I/F 111 but is not connected to the network 7. The client 2 is connected to the network 7 via the network I/F 24. Further, the network SSD 32 is connected to the network 7 via the network I/F 155. Therefore, the client 2 and the network SSD 32 is capable of communicating with each other through the network 7.

FIG. 28 illustrates an example of a flow of account information in the information processing system 1 according to the modification example.

A user inputs account information to be used for authentication of an account for accessing the user SSD 31 by an operation using the client 2 ((1) in FIG. 28). The client 2 transmits the account information input by the user to the user SSD 31 ((2) in FIG. 28). The account information in plain text is transmitted from the client 2 to the user SSD 31.

The client 2 and the user SSD 31 transfer encrypted account information to be used for authentication of an account for accessing the network SSD 32 (that is, encrypted account information of the network SSD 32) ((3) in FIG. 28). Further, the client 2 and the network SSD 32 transfer the encrypted account information of the network SSD 32 through the network 7 ((4) in FIG. 28).

In the information processing system 1 of the modification example, the client 2 has a function of relaying the encrypted account information of the network SSD 32 transferred between the user SSD 31 and the network SSD 32. That is, the client 2 has a function of transmitting the encrypted account information of the network SSD 32 that is received from the user SSD 31, to the network SSD 32 through the network 7. Further, the client 2 has a function of transmitting the encrypted account information of the network SSD 32 that is received from the network SSD 32 through the network 7, to the user SSD 31.

More specifically, for example, when newly having issued an account, the network SSD 32 transmits encrypted account information of the network SSD 32 to the client 2 through the network 7. The client 2 receives the encrypted account information from the network SSD 32. Then, the client 2 transmits the received encrypted account information to the user SSD 31. In this manner, the network SSD 32 transmits the encrypted account information to the user SSD 31 via the client 2. In other words, the user SSD 31 receives the encrypted account information from the network SSD 32 via the client 2.

Further, for example, when requesting authentication of the account for accessing the network SSD 32, the user SSD 31 transmits the encrypted account information of the network SSD 32 to the client 2. The client 2 receives the encrypted account information from the user SSD 31. Then, the client 2 transmits the received encrypted account information to the network SSD 32 through the network 7. In this manner, the user SSD 31 transmits the encrypted account information to the network SSD 32 via the client 2. In other words, the network SSD 32 receives the encrypted account information from the user SSD 31 via the client 2.

As described above, the account information for accessing the user SSD 31 is transmitted from the client 2 to the user SSD 31 in plain text. On the other hand, the account information for accessing the network SSD 32 is encrypted and transferred through the network 7. Since the account information transferred through the network 7 is encrypted, it is possible to prevent leakage and tampering of the account information.

Next, with reference to FIGS. 29 and 30, transfer of user data in the information processing system 1 according to the modification example will be described. Here, it is assumed that the account for accessing the user SSD 31 is successfully authenticated and access to the user SSD 31 (more specifically, the user area 132 of the NAND flash memory 13) is permitted, and then the account for accessing the network SSD 32 is successfully authenticated and access to the network SSD 32 (more specifically, the user area 172 of the NAND flash memory 17) is permitted.

(Reading of User Data)

FIG. 29 illustrates an example of a flow of data in a case where user data is read from the user SSD 31 or the network SSD 32 in the information processing system 1 according to the modification example.

The user requests reading of user data by an operation using the client 2 ((1) in FIG. 29). When an SSD in which the user data to be read is stored is the user SSD 31, the client 2 transmits a read command to the user SSD 31 in accordance with this request ((2) in FIG. 29).

The user SSD 31 receives the read command transmitted from the client 2. The user SSD 31 reads the user data from the NAND flash memory 13 in accordance with the received read command. Then, the user SSD 31 transmits the read user data to the client 2 ((3) in FIG. 29).

On the other hand, when an SSD in which the user data to be read is stored is the network SSD 32, the client 2 transmits a read command to the network SSD 32 through the network 7 ((4) in FIG. 29).

The network SSD 32 receives the read command transmitted from the client 2. The network SSD 32 reads the user data from the NAND flash memory 17 in accordance with the received read command. Then, the network SSD 32 transmits the read user data to the client 2 through the network 7 ((5) in FIG. 29).

In this manner, the client 2 can read user data not only from the NAND flash memory 13 of the user SSD 31 but also from the NAND flash memory 17 of the network SSD 32.

(Writing of User Data)

FIG. 30 illustrates an example of a flow of data in a case where user data is written into the user SSD 31 or the network SSD 32 in the information processing system 1 according to the modification example.

The user requests writing of user data by an operation using the client 2 ((1) in FIG. 30). In accordance with this request, when an SSD into which the user data is to be written is the user SSD 31, the client 2 transmits a write command and the user data to the user SSD 31 ((2) in FIG. 30).

The user SSD 31 receives the write command and the user data transmitted from the client 2. The user SSD 31 writes the user data into the NAND flash memory 13 in accordance with the write command.

On the other hand, when an SSD into which the user data is to be written is the network SSD 32, the client 2 transmits a write command and the user data to the network SSD 32 through the network 7 ((3) in FIG. 30).

The network SSD 32 receives the write command and the user data transmitted from the client 2. The network SSD 32 writes the user data into the NAND flash memory 17 in accordance with the write command.

In this manner, the client 2 can write user data not only into the NAND flash memory 13 of the user SSD 31 but also into the NAND flash memory 17 of the network SSD 32.

Comparative Example

Figure 31:
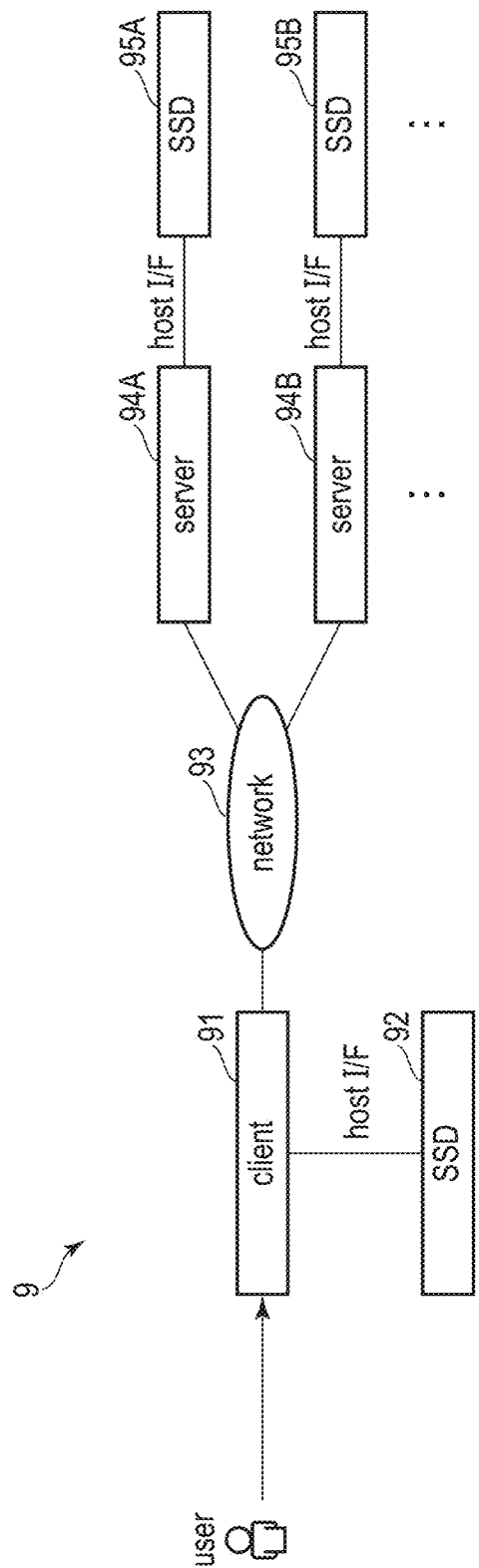
FIG. 31 is a block diagram illustrating a configuration of an information processing system according to a comparative example.

With reference to FIG. 31, a configuration of an information processing system 9 according to a comparative example will be described. The information processing system 9 includes a client device 91 (hereinafter, referred to as a client 91), multiple servers 94A and 94B, and multiple SSDs 92, 95A and 95B. The client 91 and the multiple servers 94A and 94B are connectable to each other via a network 93. The SSD 92 is connected to the client 91 via a host I/F. The SSD 95A is connected to the server 94A via a host I/F. The SSD 95B is connected to the server 94B via a host I/F.

When the client 91 accesses the SSD 95A, the server 94A performs authentication of an account for accessing the server 94A and authentication of an account for accessing the SSD 95A. Therefore, a user who uses the client 91 needs to manage account information for accessing the server 94A and account information for accessing the SSD 95A.

Further, when the client 91 accesses the SSD 95B, the server 94B performs authentication of an account for accessing the server 94B and authentication of an account for accessing the SSD 95B. Therefore, the user who uses the client 91 needs to manage account information for accessing the server 94B and account information for accessing the SSD 95B.

In this manner, in the information processing system 9 of the comparative example, the number of pieces of account information that needs to be managed by the user increases as the number of SSDs to be accessed increases. It is troublesome for the user to manage a large number of pieces of account information. Further, in a case where the user forgets the account information, there is a possibility that the user is no longer accessible to data stored in the SSD. Further, in a case where the account information is known to a third party, there is a possibility that data stored in the SSD is leaked or tampered with.

In the information processing system 1 according to the embodiment, however, the user SSD 31 manages the first account information to be used for authentication of the first account and the second account information to be used for authentication of the second account. The user SSD 31 receives the third account information from the client 2 and then authenticates the first account. When the first account is successfully authenticated, that is, when the third account information matches the first account information, the user SSD 31 permits access to at least a partial storage area of the NAND flash memory 13 in the user SSD 31 based on a request from the client 2, and transmits data including the managed second account information to the network SSD 32.

The network SSD 32 receives the data including the second account information transmitted from the user SSD 31, and then authenticates the second account. The network SSD 32 manages the fourth account information to be used for authentication of the second account. When the second account is successfully authenticated, that is, when the second account information matches the fourth account information, the network SSD 32 permits access to at least a partial storage area of the NAND flash memory 17 in the network SSD 32.

In this manner, since the user SSD 31 transmits the managed second account information of the network SSD 32 to the network SSD 32 when the first account is successfully authenticated, the user does not need to manage the second account information. That is, the user can access the user SSD 31 and the network SSD 32 only by managing the account information for accessing the user SSD 31.

Therefore, the information processing system 1 of the embodiment can enable the user to manage the account information easily as compared with the information processing system 9 of the comparative example.

As described above, according to the present embodiment, it is possible to enable the user to manage the account information easily.

In the user SSD 31, the controller 11 communicates with the network SSD 32 via a first interface (for example, the network I/F 115) that conforms to a first standard, and communicates with the client 2 via a second interface (for example, the host I/F 111) that conforms to a second standard different from the first standard. The controller 11 manages first account information to be used for authentication of a first account and second account information to be used for authentication of a second account. The controller 11 receives third account information from the client 2. When the third account information matches the first account information, the controller 11 permits access to at least a partial storage area (for example, the user area 132) of the NAND flash memory 13 based on a request from the client 2 and transmits first data that includes the second account information to the network SSD 32.

In the network SSD 32, the controller 15 communicates with the user SSD 31 via the first interface (for example, the network I/F 155) that conforms to the first standard. The controller 15 manages fourth account information to be used for authentication of the second account. The controller 15 receives the first data transmitted from the user SSD 31. When the second account information included in the first data matches the fourth account information, the controller 15 permits access to at least a partial storage area of the NAND flash memory 17.

In this manner, when the third account information matches the first account information, the user SSD 31 permits access to at least a partial storage area of the NAND flash memory 13 based on the request from the client 2 and transmits the first data that includes the second account information to the network SSD 32. Then, the network SSD 32 permits access to at least a partial storage area of the NAND flash memory 17 when the second account information matches the fourth account information. That is, not only access to at least a partial storage area of the NAND flash memory 13 but also access to at least a partial storage area of the NAND flash memory 17 is permitted when the third account information matches the first account information.

In this manner, it is sufficient for the user who uses the client 2 to manage only the third account information to be used for authentication of the first account for accessing the user SSD 31 in order to access the user SSD 31 and the network SSD 32. Therefore, it is possible to enable the user to manage the account information easily.

Each of various functions described in the embodiment may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiment may be realized in a processing circuit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
 a memory; and
 a controller connectable to a network via a first interface and configured to:
  communicate with a first memory system via the first interface through the network, the first interface conforming to a first standard, wherein
 the controller is configured to:
  manage first account information stored in the memory, the first account information being used for authentication of a first account of the first memory system;
  receive first data that includes second account information from the first memory system; and
  permit the first memory system to access the memory when the second account information included in the first data matches the first account information.

2. The memory system according to claim 1, wherein the controller is further configured to:
 when the first memory system is permitted to access the memory system,
  write data received from the first memory system into the memory system, or
  transmit data read from the memory of the memory system to the first memory system.

3. The memory system according to claim 1, wherein the controller is further configured to:
 store the first account information, which is encrypted, in the memory system;
 receive first signature data for the first data;
 when authenticity of the first data is confirmed using the first signature data, decrypt the second account information that is encrypted and is included in the first data and decrypt the encrypted first account information; and
 when the decrypted second account information matches the decrypted first account information, permit the first memory system to access the memory system.

4. The memory system according to claim 1, wherein the controller is further configured to:
 receive second data for requesting issuance of the first account information from the first memory system; and
 transmit third data including the first account information to the first memory system in accordance with the second data.

5. The memory system according to claim 4, wherein the controller is further configured to:
 receive second signature data for the second data from the first memory system; and
 when authenticity of the second data is confirmed using the second signature data, transmit the third data including the first account information which is encrypted and third signature data for the third data to the first memory system in accordance with the second data.

6. The memory system according to claim 1, wherein the controller is further configured to:
 receive, from the first memory system, fourth data for requesting a change of the first account, fifth data including the second account information, and sixth data including third account information to be newly used for authentication of the first account; and
 when the second account information matches the first account information, transmit seventh data including the third account information to the first memory system in accordance with the fourth data.

7. The memory system according to claim 6, wherein the controller is further configured to:
 store the first account information, which is encrypted, in the memory system;
 receive, from the first memory system, the fourth data, the fifth data including the second account information that is encrypted, the sixth data including the third account information which is encrypted, and fourth signature data for the fourth data, the fifth data, and the sixth data;
 when authenticity of the fourth data, the fifth data, and the sixth data is confirmed using the fourth signature data, decrypt the encrypted second account information included in the fifth data and decrypt the encrypted first account information; and
 when the decrypted second account information matches the decrypted first account information, transmit the seventh data including the third account information that is encrypted and fifth signature data for the seventh data to the first memory system in accordance with the fourth data.

8. The memory system according to claim 1, wherein the controller is further configured to:
 communicate with a host device via a second interface that conforms to a second standard different from the first standard; and
 receive the first data from the first memory system via the host device.

9. The memory system according to claim 1, wherein a host device is configured to access the memory system via the first memory system.

10. A memory system comprising:
 a memory configured to store first account information; and
 a controller coupled to the memory and connectable to a network via a first interface, wherein
 the memory system is configured to:
  communicate with a first memory system via the first interface through the network, the first interface conforming to a first standard;
  manage the first account information to be used for authentication of a first account; and
  when first data associated with second account information is issued from the memory system, determine a permission to access data stored in the memory, based on a result of a comparison between the first account information and the second account information.

11. The memory system according to claim 10, wherein the first data associated with the second account information is encrypted.

12. The memory system according to claim 10, wherein a key is stored in the memory.

13. The memory system according to claim 12, wherein the key is a secret key and/or a public key.

14. The memory system according to claim 10, wherein the memory system includes both a network interface and a host interface, and
 the first interface is the network interface.

15. A control method of a memory system, the memory system comprising a memory configured to store first account information and a controller coupled to the memory and connectable to a network via a first interface, the method comprising:
- communicating with a first memory system via the first interface through the network, the first interface conforming to a first standard;
- managing the first account information to be used for authentication of a first account; and
- when first data associated with second account information is issued from the memory system, determining a permission to access data stored in the memory based on a result of a comparison between the first account information and the second account information.

* * * * *